(12) United States Patent
Heath

(10) Patent No.: US 11,293,179 B2
(45) Date of Patent: Apr. 5, 2022

(54) STRUCTURAL PANELS FOR BUILDINGS INTEGRATING 3D PRINTED SHELLS AND METHOD OF FABRICATION

(71) Applicant: Blue Planet Technologies, Inc., Hemet, CA (US)

(72) Inventor: Mark David Heath, Rigby, ID (US)

(73) Assignee: Blue Planet Technologies, Inc., Hemet, CA (US)

( * ) Notice: Subject to any disclaimer, the term of this patent is extended or adjusted under 35 U.S.C. 154(b) by 55 days.

(21) Appl. No.: 16/597,614

(22) Filed: Oct. 9, 2019

(65) Prior Publication Data
US 2021/0108412 A1    Apr. 15, 2021

(51) Int. Cl.
| | | |
|---|---|---|
| *E04C 2/06* | (2006.01) | |
| *B33Y 10/00* | (2015.01) | |
| *E04C 2/04* | (2006.01) | |

(52) U.S. Cl.
CPC ............... *E04C 2/06* (2013.01); *E04C 2/044* (2013.01); *E04C 2/049* (2013.01); *B33Y 10/00* (2014.12)

(58) Field of Classification Search
CPC . E04C 2/06; E04C 2/049; E04C 2/044; E04C 2/288; B29D 24/004; E04B 2/845; E04F 13/0733; E04F 13/0871
See application file for complete search history.

(56) References Cited

U.S. PATENT DOCUMENTS

| | | | | |
|---|---|---|---|---|
| 5,487,248 | A   * | 1/1996  | Artzer  | E04C 2/288 52/309.12 |
| 6,718,712 | B1 * | 4/2004  | Heath   | E04C 2/044 52/309.12 |
| 2005/0284088 | A1 * | 12/2005 | Heath   | E04B 2/845 52/741.1 |
| 2019/0301178 | A1 * | 10/2019 | Steffes | E04F 13/0733 |
| 2020/0398609 | A1 * | 12/2020 | Briggs  | E04F 13/0871 |
| 2021/0061495 | A1 * | 3/2021  | Aston   | B29D 24/004 |

* cited by examiner

*Primary Examiner* — Lee A Holly
(74) *Attorney, Agent, or Firm* — Kelly & Kelly, LLP

(57) ABSTRACT

A structural panel is manufactured from at least two generally parallel and spaced-apart thin-shell cementitious skins that are joined by a truss matrix. The elements creating the truss matrix, being the truss, the face mesh, and the insulating core, are selected to meet the structural loads to be placed thereon. The thickness of each cementitious skin is selected to meet the structural loads to be placed thereon.

24 Claims, 27 Drawing Sheets

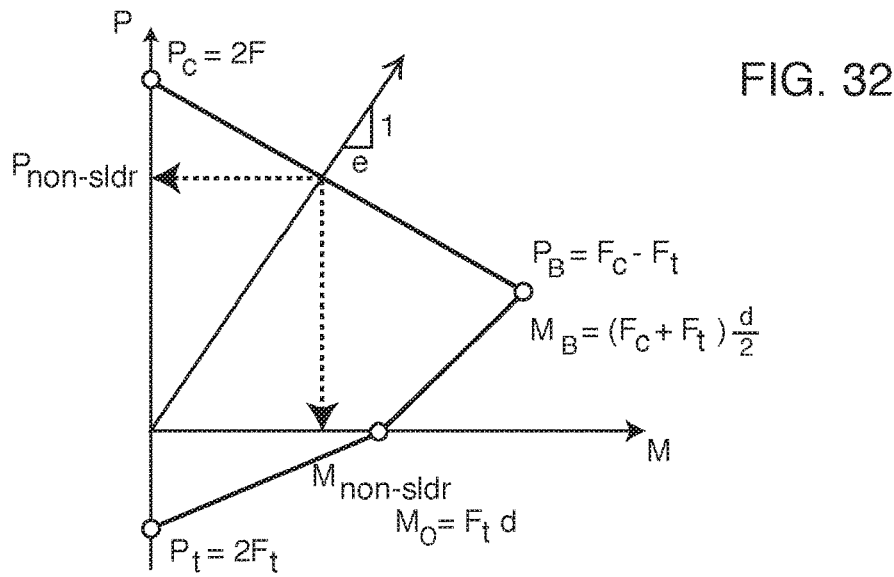
FIG. 32
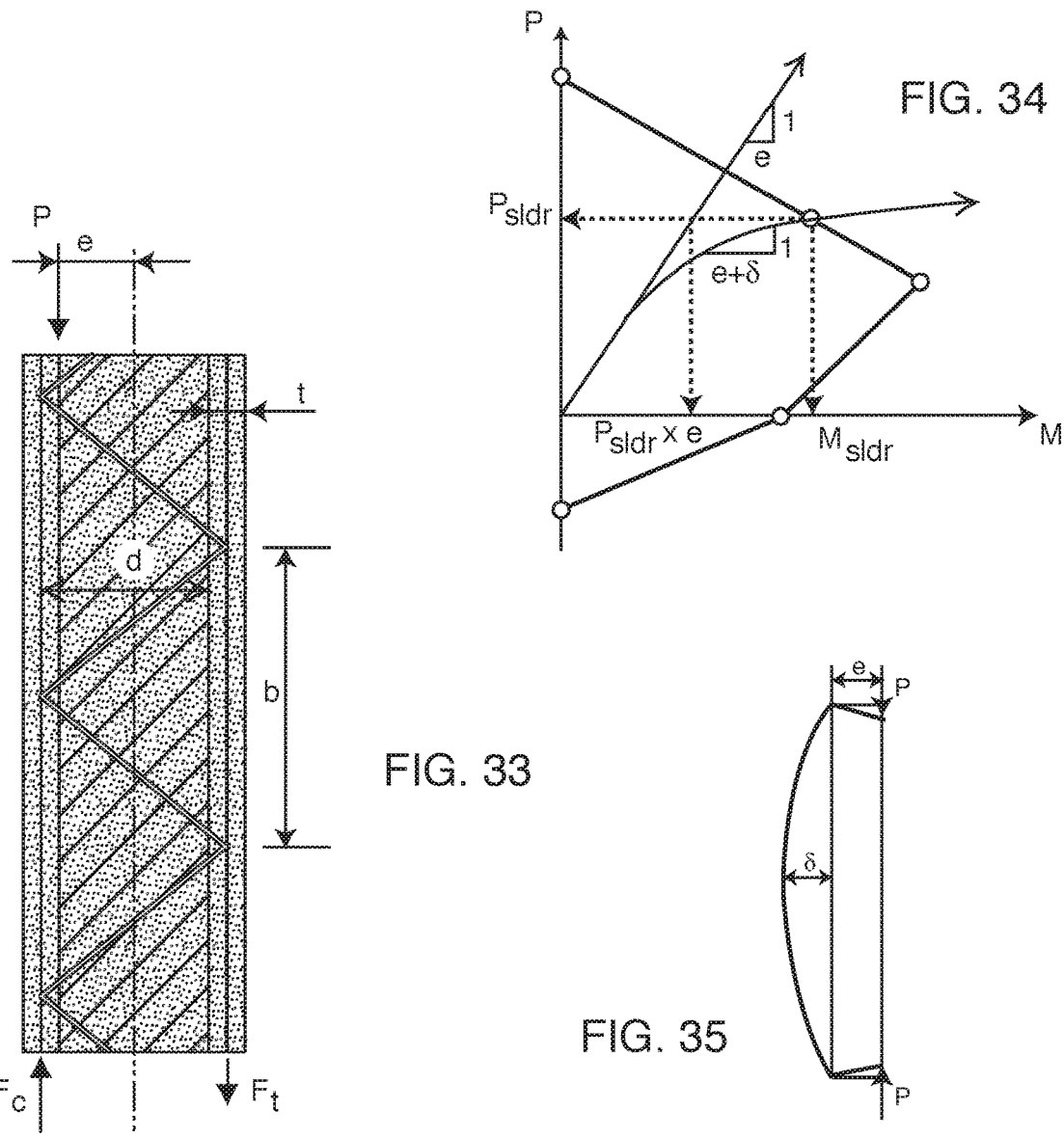
FIG. 33
FIG. 34
FIG. 35

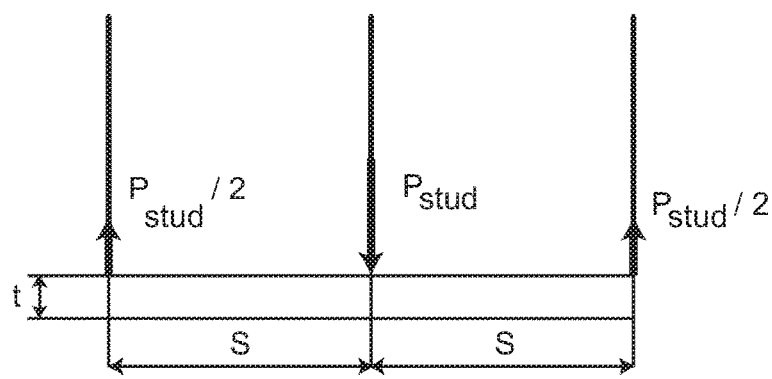
FIG. 38
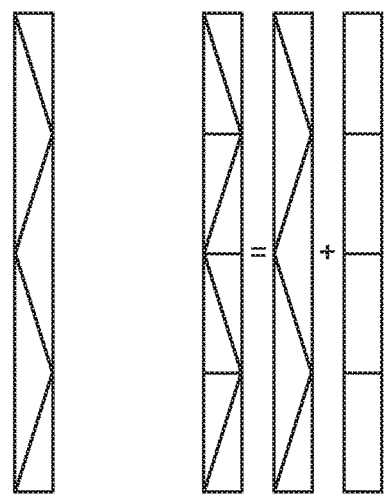
FIG. 36
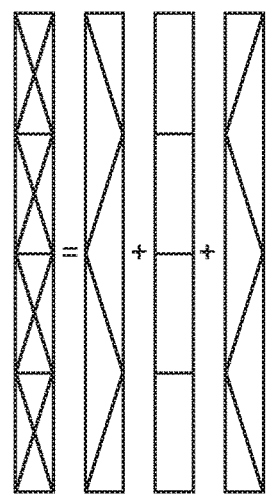
FIG. 37
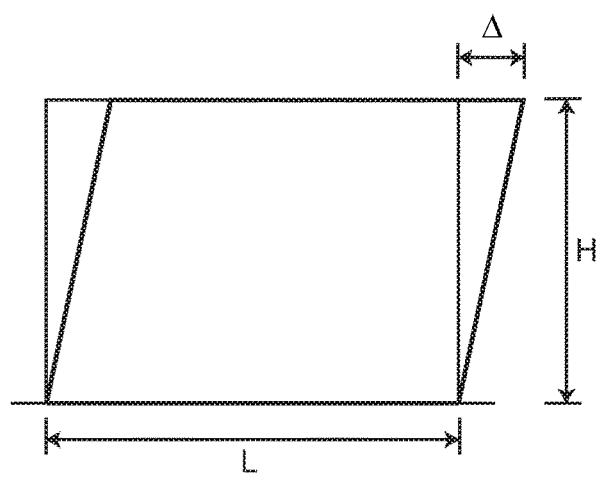
FIG. 40
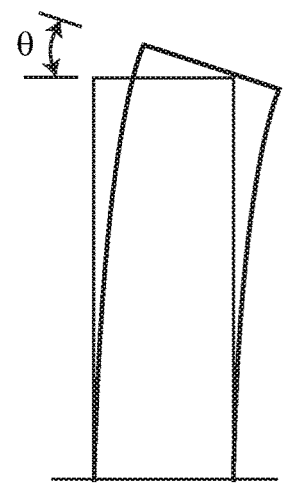
FIG. 39
FIG. 41

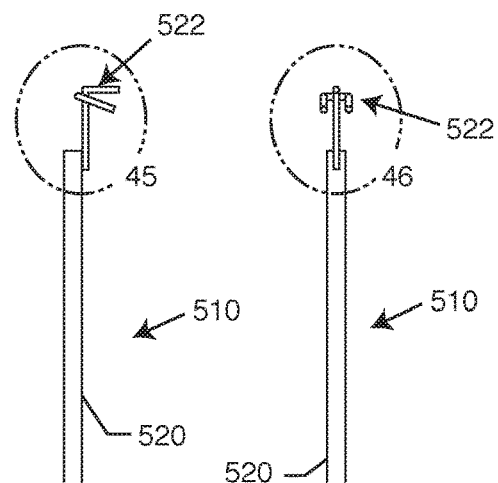
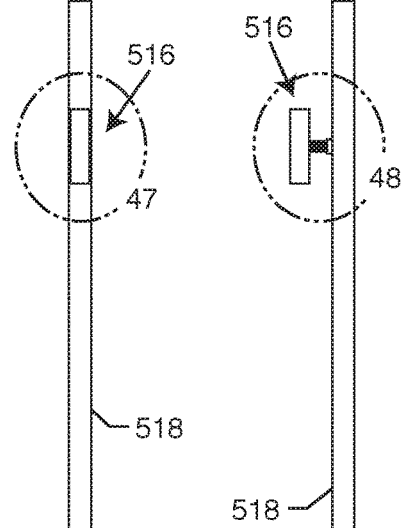
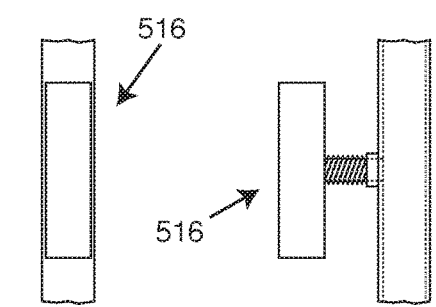
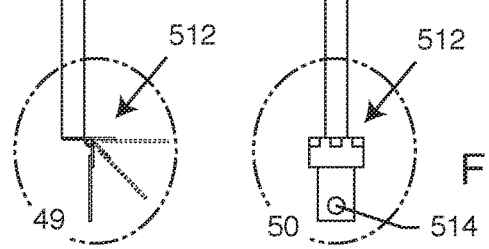
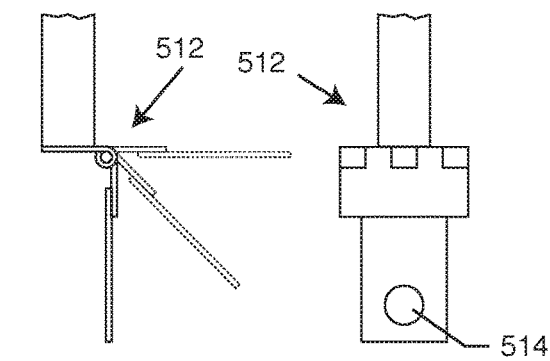
FIG. 43    FIG. 44    FIG. 45    FIG. 46    FIG. 47    FIG. 48    FIG. 49    FIG. 50

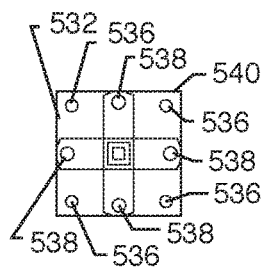
FIG. 55
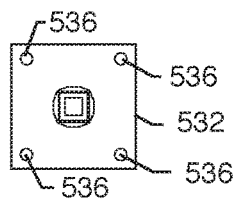
FIG. 57
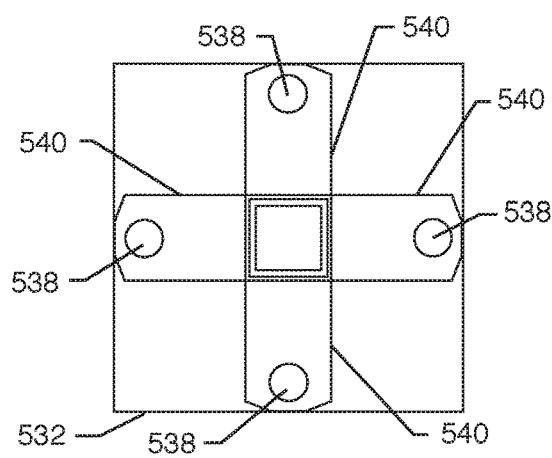
FIG. 60
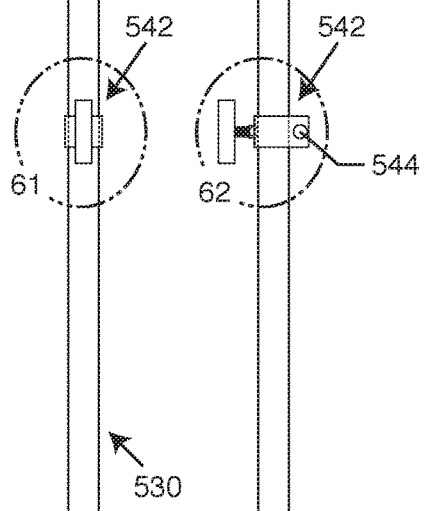
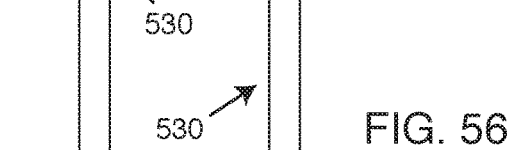
FIG. 56
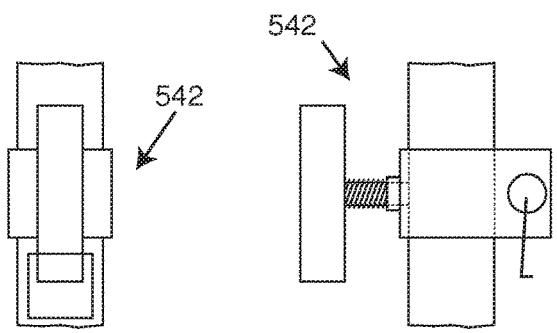
FIG. 61   FIG. 62
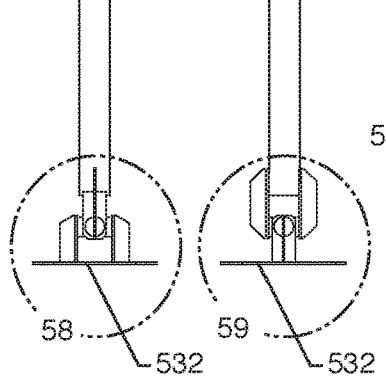
FIG. 54
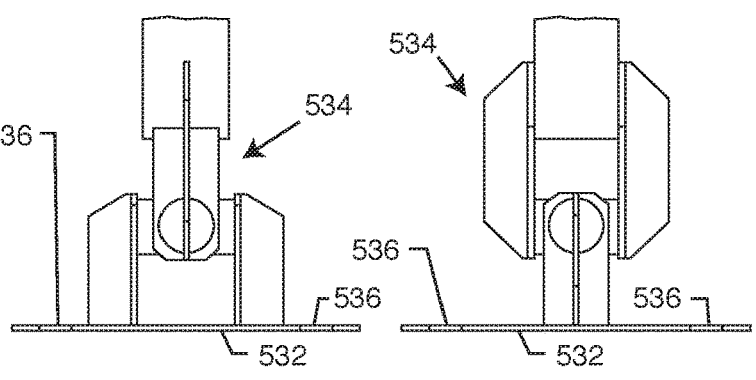
FIG. 58   FIG. 59

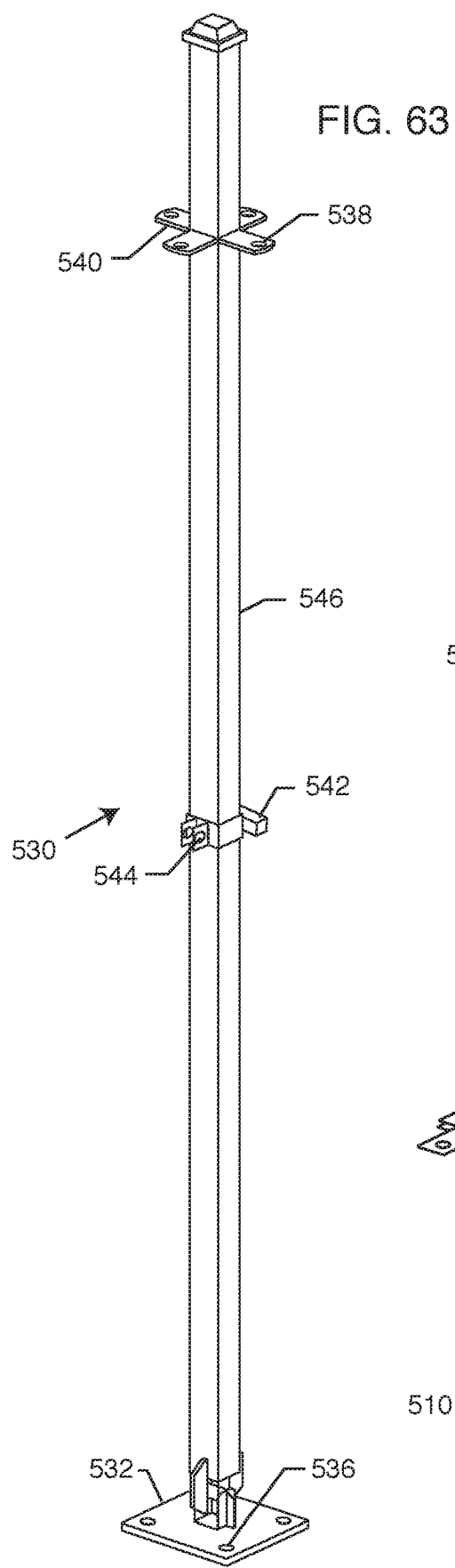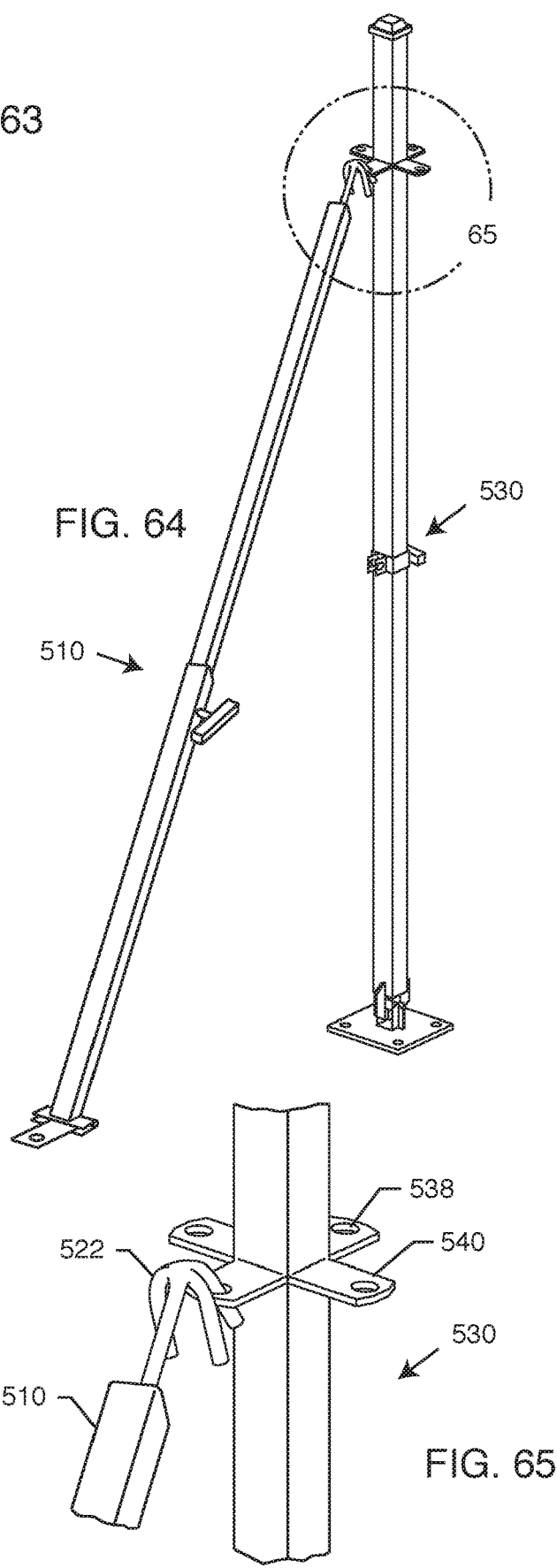

STRUCTURAL PANELS FOR BUILDINGS INTEGRATING 3D PRINTED SHELLS AND METHOD OF FABRICATION

BACKGROUND OF THE INVENTION

The present invention relates generally to construction materials. More particularly, the invention concerns structural panels and methods for their manufacture which employ fillers, together with a reinforcing structure comprised of commercially available components, which when assembled and faced with a durable covering provides a building component.

Prefabricated structural building panels are utilized in the construction of structures such as houses and commercial, industrial and institutional buildings. They are also utilized in the construction of non-building structures such as retaining walls, fences, and cisterns. The pre-manufacturing of the panels allows for lower costs and faster construction than available with conventional, in-situ piecemeal construction.

Prefabricated structural concrete insulating panels are typically comprised of a filler medium reinforced with metal lattice structures and surrounded by a metal mesh or cage. A coating, such as stucco, air blown cementitious mixtures or the like, is applied to the face surfaces to complete the building process. While these structural panels have been useful in the construction industry, they have had the disadvantage of being costly and sometimes unavailable in rural areas. They also have the disadvantage of not being able to be custom engineered and fabricated to meet the load demands of a particular structure and are only available in a few, structurally limited, configurations.

Lightweight plastic materials, including many different types of foamed synthetic resins and expanded plastic foams such as urethanes, polystyrenes, and the like, have a number of properties that are highly desired in building materials for various types of structures such as walls, roofs and the like, and these plastic materials have been the customary filler material utilized in structural panels. However, such materials are manufactured from petrochemical substances and have potential environmental damage issues associated with them. There is also the increasing price of these fillers due to the finite quantity of petroleum resources and their depletion. Additionally, there is the difficulty in obtaining plastic foams in developing countries and remote locations as well as the high cost of shipping to these locations due to plastic foam volume to weight ratio.

Companies which provide structural panels produce their own specialized metal lattice or truss structures and metal meshes having various wire gauges and wire bends which deviate from industry standards. For example, industry standard masonry reinforcement trusses use a zigzag configuration having approximately thirty degree (30°) bends or a ladder truss with straight web members rather than zigzag members. At least one company produces lattice structures having forty-five degree (45°) bends for use in their structural panels, a configuration that is more structurally sound but which also increases the cost of the structural panel due to production economics. Typically, such structural panels are limited to only one thickness option. The wire gauges of the wire mesh are often altered at key structural points to reinforce the structural panel. While structurally superior, these designs result in increased expense passed to the end consumer. The design of the structural panel may also be complicated which further increases production costs. For example, the structural panel of U.S. Pat. No. 5,487,248 (incorporated by reference herein) utilizes preformed plastic foamed filler elements that create chambers when brought together for the later insertion of wires, pipes, etc., used within the building. In rural areas and foreign countries many of these specialized materials are not available and must be shipped, further increasing expense or prohibiting the area from using pre-fabricated structural panels altogether.

Previous methods of fabricating panels with a wire truss structure and a wire face mesh have been made utilizing machines and techniques which resulted in panels being limited in the dimensions of the components employed. This effectively stopped a panel from being an engineered panel in that the fabrication methods and machines were so inflexible in their nature and function that the nature of the machine determined the outcome of the panel. If a different panel was desired, a new machine was needed to make the new panel type or, at least, extensive, time consuming, and costly modifications or re-fabrication of the machine, was required.

The manufacture of all structural concrete insulating panels to date has involved significant capital investment due to the complexity of the machinery required, or, in the case of low-cost methods, it has been very limited in breadth of capacity in terms of sizes of panels able to be produced. In addition, most methods of production have required high levels of technical skill to operate as well as utility (electrical and water) and other support not readily available in developing nations. Also, all other systems have a linear manufacturing path which results in the entire operation being shut down if any part of it fails.

Various types of presses are generally described in U.S. Pat. Nos. 4,226,067 and 5,487,248. These presses are typically a combination of manual and pneumatic operation, manually loaded, and then, pneumatically applied pressure to compress the panel stack. They have been mounted on factory floors as well as on transportable platforms, such as tow-able trailers.

A significant drawback to this design is the linear product flow. The panel stack is typically stacked at one end of the apparatus and the stack passes forward to the compression area of the apparatus. In the compression area the work of attaching the face mesh is performed. This serves to connect the interdigitally arranged trusses to one another, trapping the core filler members between them, and maintaining the panel in a compressed condition. Once this face mesh is attached, the panel may move forward, leaving the apparatus, and freeing the apparatus for the next panel.

While the panel is in the compression area the apparatus is essentially idle and the work of stacking the next panel must await completion of the attachment work and for the panel to vacate the apparatus, freeing space for the next panel and another stack to be prepared.

These machines typically produced a maximum panel size of twenty feet long and four feet wide. The length of the machines compression segment dictated the length of the panel and the width was a normal construction unit as well as a practical height limit for pre-stacking the trusses and core material.

Longer panel lengths are of great value in taller walls and longer span floors and roofs in order to avoid the costly, cumbersome and time-consuming splicing of shorter panels, otherwise required. While longer apparatus' could be fabricated, allowing for longer panels, this compounds the problem of other work halting while the panel is in the compression section of the apparatus. This results from there being much more surface to affix the face mesh to, thereby lengthening the time that other, shorter duration tasks would be idle.

While these idleness problems might be overcome through task realignment of the crew, a more significant problem is that all previous machines were limited in their capacity to accept a wide variety of panel thicknesses. These early apparatus' also had as inability to change the position of the core relative to the face of the panel. These problems result from the nature of the apparatus'. From the means used to hold the stack of foam and truss in correct alignment during compression and the means for attachment of the face mesh while under compression.

These two problems are significant because the ability to employ deeper trusses allows for greater panel strength and greater spans. The ability to align the core material in an eccentric configuration, rather than always centric, relative to the panel face is important in floor and roof applications as well as in eccentrically loaded walls, such as retaining walls. When used as a floor or roof, the panels are performing an engineering function akin to a continuous beam. Consequently, the upper surface is in compression while the lower surface is in tension. This routinely results in the need for the upper concrete skin to be thicker than the lower skin. Because the best performance of the thin shell concrete skin is achieved with the reinforcement centered in the concrete, it is of great structural value to be able to move the core material to an eccentric configuration, relative to the panel face so that the reinforcement in both the thicker upper concrete skin and the thinner lower concrete skin are both in the center of their respective thin shell skins.

The linear nature of the apparatus also limits the maximum number of persons that can productively work the apparatus, thereby resulting in a fixed maximum output. Both the linear work flow and the limited thickness flexibility result in the means of increasing product output being the addition of entire machines. This is a relatively high-cost solution.

The nature of the apparatus' in the gauge and depth of the wires in the trusses and the gauge and density of the wires in the face mesh also limited previous panel manufacturers. This is a significant problem and demonstrates a need that, if the load on the structure increases, increasing the gauge or depth of the truss and/or increasing the gauge and density of the mesh allows for a panel to be produced that can resist this increased load.

No previous concrete panel manufacturer has undertaken an engineering approach to the design of a concrete panel. This is principally because their output was limited in variation. Rather than take an engineering approach, the manufacturer was better served, practically and financially, by taking a tested product approach. This approach entails the testing of the product and generating a graph or table showing the structural capability of the product. Since prior concrete panel products are very few in number from any particular manufacturer, about five different configurations, the testing so very few products is relatively inexpensive. Since each different configuration was very fixed, having a table or graph for the structural capacity of each of the few configurations was adequate.

The current invention also relates to concrete construction in general. Concrete is one of the most widely available building materials in the world. It is widely used because of its attributes of significant durability, strength, fire resistance, and resistance to such things as mold, mildew, and destruction by pests and vermin. However, concrete is typically made from a mixture of Portland cement and aggregate. Portland cement is a commodity that is relatively expensive. It is costly to produce, transport, store and has steadily risen in price over time. Concrete construction also typically requires the use of reinforcing steel to enhance the performance of the concrete. Unreinforced concrete has excellent compressive strength but comparatively poor tensile strength. The placement of reinforcing steel within the concrete mass greatly improves the structural performance of concrete. However, reinforcing steel is a commodity that is relatively expensive. Reinforcing steel is costly to produce and it has steadily risen in price over time. Reinforcing steel is also very heavy and as a result costly and dangerous to install. Reinforced concrete has, as it's single largest drawback, it's own mass. It is very heavy, typically weighing over 150 pounds per cubic foot. In fact, it is so heavy that a significant percentage of the total reinforcing steel required in concrete structures is there to overcome the loads imposed by the mass of the concrete itself, commonly known as the dead load.

Lastly there is a very high cost in forming concrete. Concrete is typically placed in a wet, viscous state, inside of formwork. The formwork must be installed accurately because it will determine the final shape and appearance of the concrete. The formwork must also be very strong to withstand the load of the reinforcing steel, the wet concrete and the live load of the workers installing the steel and concrete. This formwork is also temporary. Once the plastic concrete and dried and cured and achieved the designed strength to hold its own weight and the other loads imposed on it, the formwork is disassembled and removed. The result is that the formwork is very costly. It is routine that the cost of formwork is more than the cost of the concrete and reinforcing steel, combined. Hence, this temporary structure is the most costly element of a concrete structure.

All of the above combine to result in a construction process that is slow and costly. A typical sequence of reinforced concrete construction is a) lay out and install the formwork, b) lay out and install the reinforcing steel, c) place the concrete, d) wait for the concrete to cure and reach it's designed strength (28 days is the standard to reach design strength), e) remove the formwork. All of the work in concrete construction requires skilled craftsmen. The formwork is critical, the placement of the reinforcing steel is critical, and the proper handling and finishing of the wet, plastic concrete is critical.

The demand for affordable housing is growing and is generally unmet, except with very poor quality products, such as "HUD Code" mobile units. The use of three-dimensional (3D) printing is growing in the construction industry. 3D printing appears to offer the opportunity to create affordable housing by increasing speed of construction and reducing the quantity of labor required.

To date, 3D printing has always produced solid walls of a thicker-than-framing wall system. This increased thickness has been needed to provide the strength to support the walls. Walls constructed of 3D printing are typically concrete, meaning some blend of cement and aggregates, or adobe, meaning a mix of clay soils with aggregate and other materials to create a stable material. For ease of discussion, we will simply refer to all of these as "concrete". The comparatively thick walls (compared to framed walls) has also been seen to offer "thermal mass" to make a more "livable" structure. However, this intent and perceived benefit is only true in moderate climates with regular swings, within a narrow range, of ambient temperatures. In very hot climates, very cold climates, and in climates where the temperature does not swing on a regular basis, then this thermal mass benefit is not available. In fact, the exact opposite is true. The walls become very hot and do not cool down, creating "oven-like" interiors, or the walls become very cold, do not warm up, creating "refrigerator or freezer-like" interiors.

The current use of 3D printing only addresses walls, and often only the exterior walls. 3D printing, alone, cannot be used to print roofs or floors. The thick walls generated by 3D printing makes use for interior walls or partitions problematic because of the amount of floor space consumed by these thick 3D printed walls.

Accordingly, there is a need for a structural panel that is designed is to overcome the above limitations. There is a further need for SCIP panels that can be manufactured by developing nations as well as inner-city business development. There is an additional need to provide a composite structural concrete panel that avoids or minimizes the above-mentioned problems. There is a further need for a means for manufacturing concrete panels that is low cost, requires little or no technical skills or experience and minimal utilities. There is a need for a process of constructing panels that avoids the cost of producing a new machine or remodeling an existing machine for each design of panel. There is an additional need for a process of constructing panels that employs a machine dimensionally adjustable for different panel designs. There is a further need for engineering theories, mathematics and processes that allow an engineer to design structures built with panels of such a breadth of configurations. There is also a need for processes, engineering, methods and products combining to reduce or eliminate the disadvantages of reinforced concrete construction while retaining the great advantages of reinforced concrete construction. There is also a need for overcoming the drawbacks and disadvantages of current 3D printing of building panels. The present invention fulfills these needs and provides other related advantages.

SUMMARY OF THE INVENTION

The present invention relates to pre-fabricated structural panels which utilize commercially available materials, and a cost-efficient and simple method of construction. Accordingly, an objective of this invention is a novel and improved structural panel, which can be constructed in a wide variety of thicknesses, widths and lengths without dependence on limited source and costly materials.

A process for manufacturing a structural panel, in accordance with the present invention, generally comprises the steps of aligning a plurality of fillers with a plurality of masonry reinforcement trusses in an alternating sequence. The masonry reinforcement trusses comprise two substantially parallel rods interconnected by a wire bent around the rods in a zig-zag configuration. The zig-zag configuration of the wires may comprise approximately thirty degree bends.

The fillers may be comprised of solid foamed material filler, stabilized organic material fillers, wattels containing filler material, a bio-mass, and/or cloth. A lathing member may be embedded within the panel.

The aligned trusses and fillers are pressed to form a panel core. Wire mesh is overlaid over opposing side surfaces of the panel core. The wire mesh is attached to the trusses to hold the panel core together. This may be done, for example, by using bailing wire tied to connection points of the wire mesh and trusses to hold the panel core together. Upholstery clamps may alternatively, or also, be clamped to the connection points of the wire mesh and trusses to hold the panel core together.

Two generally spaced apart 3D printed thin shells comprised of a durable material are attached at generally opposite sides of the panel. Each side of the panel core may be coated with durable material using 3D printing equipment. The shells may be comprised of a cementitious material. The shells are typically up to approximately three inches in thickness or less. The shell on one side of the panel may be thicker than the shell on the opposite side of the panel. Moreover, the 3D printing step may include the step of varying the thickness of at least one of the shells. The thickness of each shell may be selected to meet the structural loads to be placed thereon. Each shell may be shaped to center reinforcement in the shell.

The fillers may be removed after applying the shells in certain embodiments.

The process for manufacturing a structural panel may also include determining structural loads to be placed upon the structural panel. The structural panel is manufactured from at least two generally parallel and spaced-apart thin-shell cementitious skins that are joined by a truss.

The load data is collected and the physical characteristics of the panels are selected. The collected load data includes longitudinal, shear and bending loads upon the structural panel. The thickness of each cementitious skin is selected to meet the structural loads to be placed thereon.

The components of the structural panel are sized to meet the loads to be placed thereon. The components of the structural panel are varied to meet the loads.

During manufacture of the structural panel, a plurality of fillers is aligned with a plurality of trusses in an alternating sequence. The aligned trusses and fillers are pressed to form a panel core. Commercially available wire mesh is overlaid over opposing side surfaces of the panel core and the wire mesh is attached to the trusses by attaching commercially available metal ties to connection points of the wire mesh and trusses to hold the panel core together.

Masonry reinforcement trusses may be provided that have two substantially parallel rods interconnected by a wire bent around the rods in a zigzag configuration having approximately 30° bends.

A durable coating is applied to the panel core and attached wire mesh. The durable coating comprises the cementitious skins. The fillers can be removed after applying the durable coating. The durable coating is preferably applied using automated tools and equipment for 3D printing. During application of the durable coating, the thickness of the durable coating can be varied. In this regard, the durable coating on one side of a structural panel is thicker than the durable coating on an opposite side thereof.

Upholstery clamps may be clamped to the connection points of the wire mesh and trusses to hold the panel core together. Alternatively, re-bar tie wire may be tied to the connection points of the wire mesh and trusses to hold the panel core together.

A plurality of the structural panels can be combined to form a structure.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIGS. 32 and 33 illustrate gravity loading on a non-slender wall formed by a panel of the present invention as seen in, respectively, a Force-Moment (P-M) curve and a panel embodying the present invention with tensile and compressive forces applied to the panel;

FIGS. 34 and 35 illustrate gravity loading on a slender wall formed by a panel of the present invention as seen in, respectively, a Force-Moment (P-M) curve and a panel embodying the present invention with tensile and compressive forces applied to the panel;

FIG. 36 shows a warren truss of a type used in panels embodying the present invention;

FIGS. 37 and 38 illustrate, respectively, a truss combination of a type used in panels embodying the present invention and out-of-plane loading on a panel using that truss combination;

FIG. 39 illustrates another truss combination of a type used in panels embodying the present invention;

FIG. 40 illustrates in-plane loading on a squat wall;

FIG. 41 illustrates in-plane loading on a tall wall;

FIGS. 43-50 are various views of a brace stick embodying the present invention;

FIGS. 54-62 are various views of a corner alignment pole embodying the present invention;

FIG. 63 is a perspective view of the corner alignment pole of FIGS. 54-62;

FIG. 64 is a perspective view of the brace stick of FIGS. 43-50 engaging the corner alignment pole of FIGS. 54-62;

FIG. 65 is an enlarged perspective view of the brace stick engaging the corner alignment pole in FIG. 64;

DETAILED DESCRIPTION OF THE PREFERRED EMBODIMENTS

Figure 1:
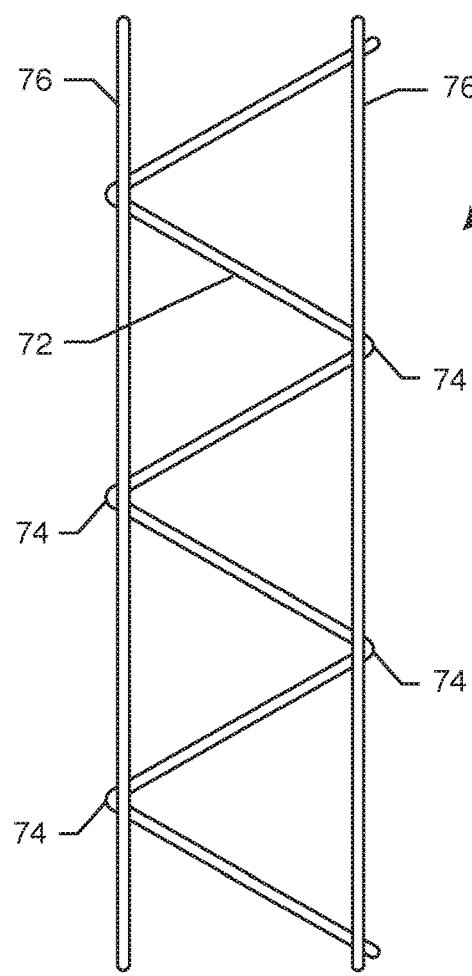
FIG. 1 is an elevation view of a commercially available truss used in accordance with the present invention.

In accordance with the present invention, an exemplary commercially available truss 70 is illustrated in FIG. 1. The truss 70 generally comprises a wire 72 having a series of bends 74 around a pair of mutually spaced apart side rods 76. The rods 76 are laid in parallel fashion along the bends 74 of wire 72 and welded or otherwise attached to the wire 72 to provide a generally planar configuration. The trusses 70 are constructed and sold in varying widths which can be utilized for the creation of different thicknesses of structural panels. Such trusses 70 include commonly available masonry reinforcement trusses and space frame trusses, although other commercially available trusses may be used.

As is common in the industry, center wire 72 is bent in a zigzag configuration to provide strength to the truss 70. The angle of the bends 74 may be varied depending on structural loading imposed on the panel, for example masonry reinforcement trusses traditionally have approximately either 30° or 60° wire bends as shown in the drawings to form triangles within the trusses 70. Of course, other commercially available trusses may have different angles within the bent wire. The gauge of the side rods 76 and the bent wire 72 may be varied to resist varying loads. For example, a ten gauge wire may be used for heavier load applications and a twelve gauge wire for lighter load applications. The side rods 76 and the bent wire 72 may be smooth wire or deformed. The use of deformed wire creates greater mechanical adhesion between the wires 72 and a cementitious coating as will be further described.

Figure 2:
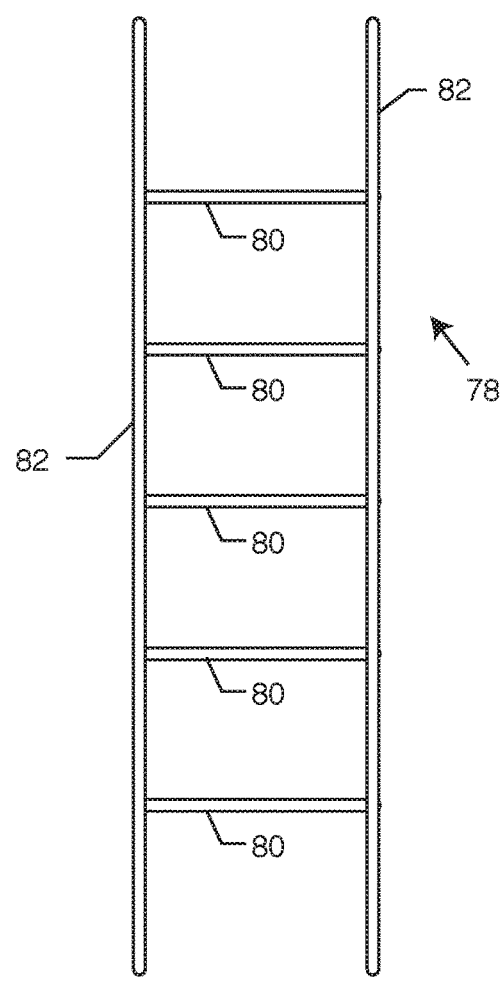
FIG. 2 is an elevation view of another commercially available truss used in accordance with the present invention.

Another exemplary commercially available truss 78 is illustrated in FIG. 2. The truss 78 generally comprises a wire 80 that is linearly disposed between a pair of mutually spaced apart side rods 82. The rods 82 are laid in parallel fashion and welded or otherwise attached to the wire 80 to provide a generally planar configuration. The trusses 80 are constructed and sold in varying widths which can be utilized for the creation of different thicknesses of structural panels. Such trusses 80 include commonly available masonry reinforcement trusses and space frame trusses, although other commercially available trusses may be used. The gauge of the side rods 82 and the wire 80 may be varied to resist varying loads, as outlined above. The side rods 82 and the wire 80 may be smooth wire or deformed. Other commercial trusses may be combinations of trusses 70, 78 that include bent wire 72 and linear wire 80.

Figure 3:
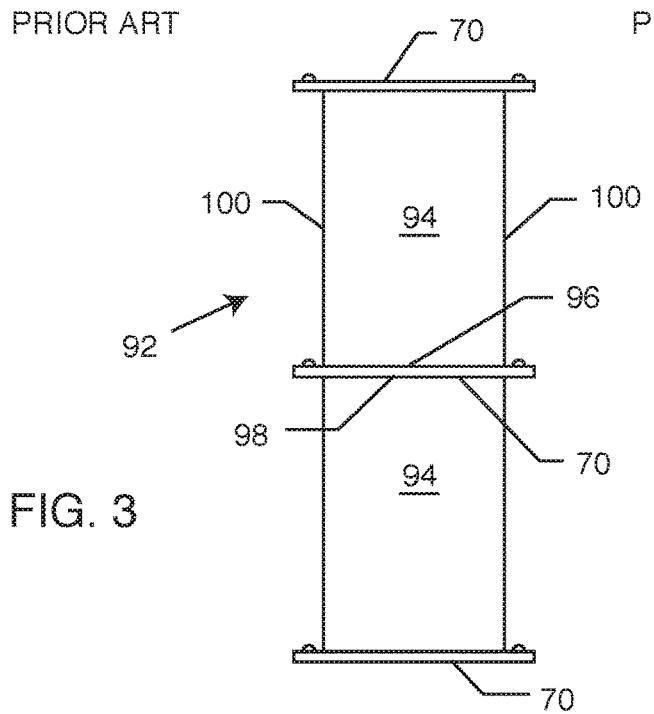
FIG. 3 is an elevation view of a panel core having alternating trusses and fillers.

As shown in FIGS. 3 through 6, a structural panel 90 of this invention has a panel core 92 that includes a plurality of elongated filler members 94 in face-to-face contact at surfaces 96 and 98 with the trusses 70 interdigitated with the filler members 94. The plurality of elongated filler members 94 lay in a mutually contiguous arrangement. Between opposed surfaces 96 and 98 of the filler members 94 are alternatingly placed trusses 70 of the type shown in FIG. 1 and aligned with the filler members 94. Each elongated filler member 94 has opposite side surfaces 100 extending generally normal to the opposed surfaces 96 and 98 as shown in FIG. 3. A rectilinear cross-section is the norm but not necessary. Trapezoidal shapes would allow for the construction of curvilinear panels.

The filler members 94 can be of a solid foamed type, such as solid plastic foamed material or glass foamed material. The elongated filler members 94 may also be made from a variety of organic materials comprising agricultural waste or biomass such as straw or wood chips hammer milled or otherwise broken and added to a stabilizer such as cement. The primary requirement is that the finished organic filler elements have sufficient physical strength to be useful over the period of time of manufacture and erection of the panels and resist the stresses of the application of the cementitious covering. The stabilizer should prevent the environment, insects, rodents and the like, from eating away or degrading the organic material. The foamed material or stabilized organic material is made into the required shape and dimensions to form a panel core sub-assembly. The organic material filler member 94 can be blown into plastic bags or combined with a polymer and poured, extruded or otherwise formed into free standing members as is known in the art.

The use of an organic filler material in the form of biomass or agricultural waste instead of the plastic filler material of the prior art allows for the panels to be made more readily in areas where plastic filler materials are not readily available or cost prohibitive. Wood chip concrete is a common material which could be employed as the filler material; however other organic materials which could be formed in the requisite shape would serve to accomplish the desired panel configuration. Examples include corn stocks, bamboo, kenaf, rice hulls, rice straw, orchard thinnings, grain straw, shredded paper, scrub brush, or any organic fibrous material (i.e., biomass or agricultural waste) which could be formed into the needed shape. The organic filler material can be formed to size or can be formed in panels or blocks of larger sizes for efficiency of manufacture and then cut to size. In addition to utilizing cement as a binder for the organic material, the use of plastic additives such as recycled PET bottles, the use of recycled tires, the use of asphalts, adhesives or binders generated by the plants under imposed conditions such as steam and pressure, can all be utilized to form the organic material into shapes which can be employed in the fabrication of the structural panels 10.

Figure 4:
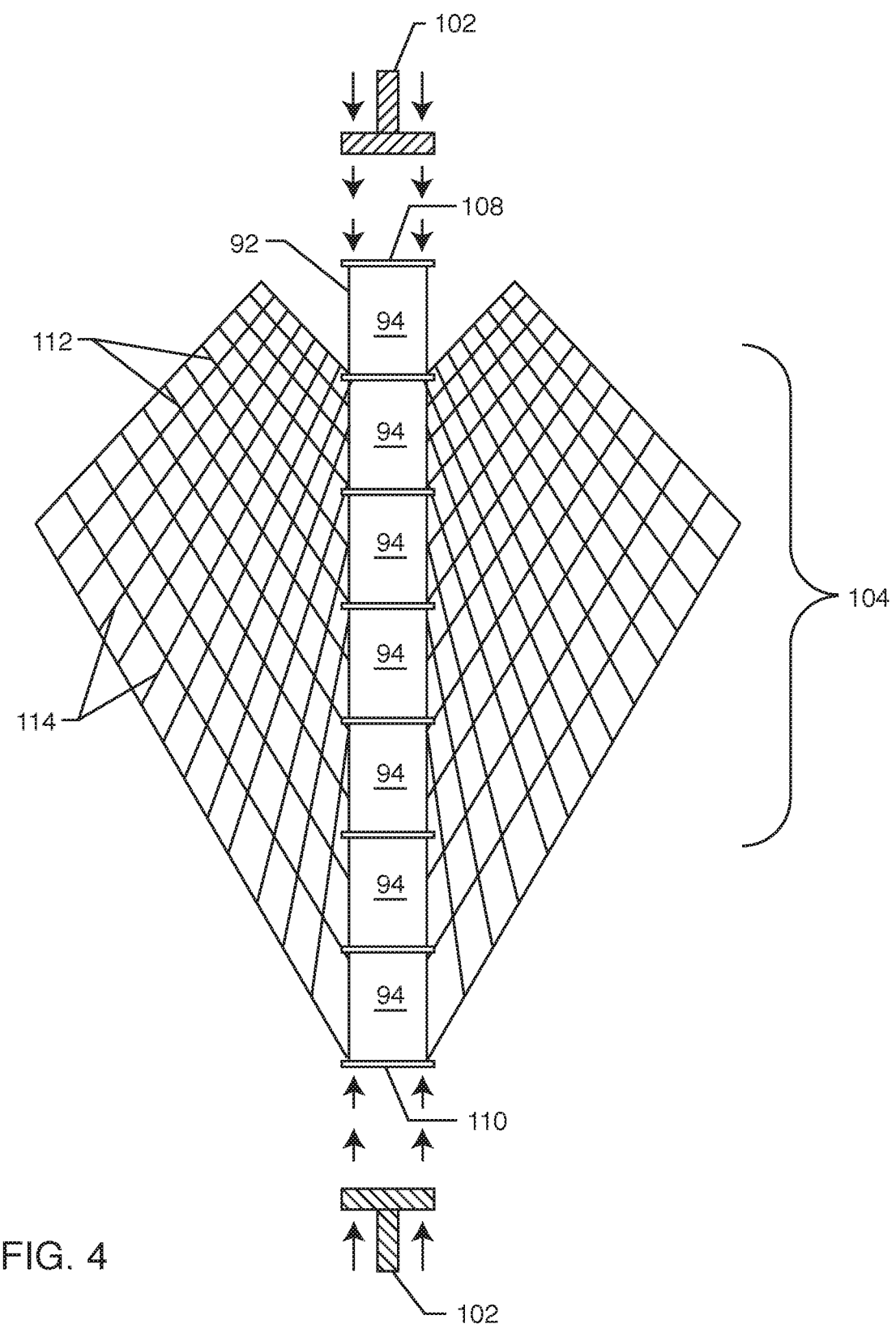
FIG. 4 is a schematic view illustrating the positioning of a wire mesh adjacent to opposing side surfaces of the panel core of FIG. 2 after compressing the panel core.
Figure 5:
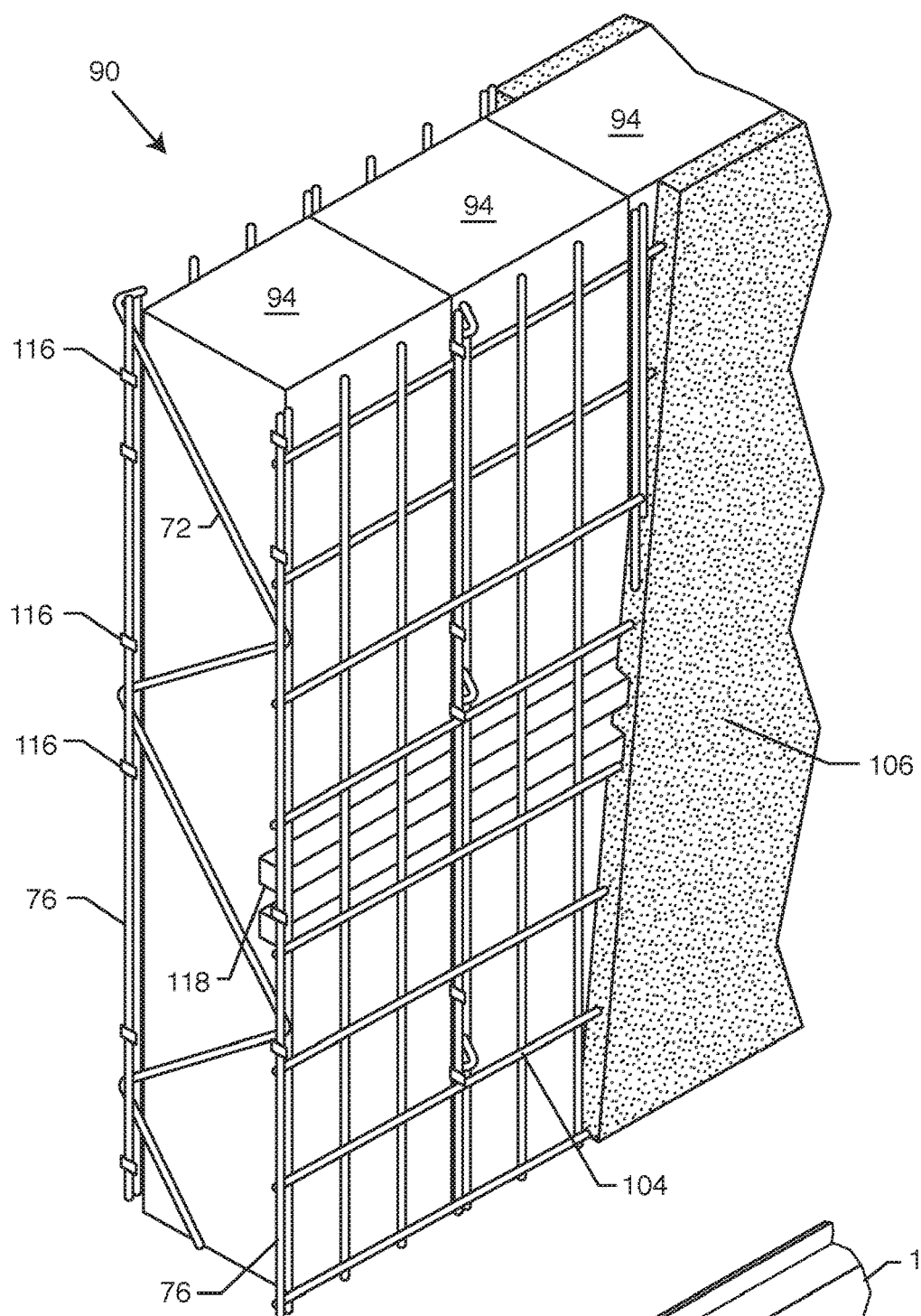
FIG. 5 is a partly fragmented perspective view of a fabricated structural panel embodying the present invention and having a durable coating applied thereto.
Figure 6:
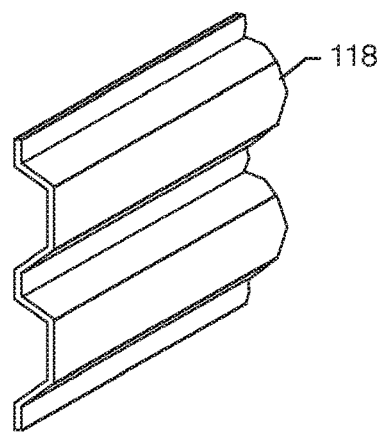
FIG. 6 is a partly fragment perspective view of a lathing member such as the one embedded in the panel of FIG. 5.

As shown in FIG. 4, lateral compressive pressure is applied to the layered filler members 94 and trusses 70 by a suitable press 102. Thus, the trusses 70 are sandwiched between the opposed surfaces 96 and 98 of each filler member 94 to form a solid core 92. Preferably, the resultant structure is a plurality of filler members 94 stacked together wherein the opposed surfaces 96 and 98 are held tightly together with the layers of trusses 70 imbedded in surfaces 96 and 98. However, only sufficient pressure to allow for the application of wire mesh 104 is required. Where less pressure is applied such that the completed panel is not rigid of itself, a straightening rod (not shown) may be temporarily applied in the field, so that sufficient rigidity is available for the application of a cementitious coating 106. Having a less rigid core panel 92 can also present some application advantages where curvilinear structures are desired. While the norm is for the press 102 to be a mechanical apparatus, it may be sufficient to have the press be nothing more than hand pressure. The press does not need to be bi-directional. There may be sufficient compression achieved with pressure generated from one side 108 of the stacked members against a fixed surface on the opposite side 110 of the stack.

The wire mesh 104, formed of lateral wires 112 and longitudinal wires 114, is laid against the side surfaces of the pressed core of trusses 70 and filler members 94 and attached to the rods 76 with commercially available metal ties 116, such as upholstery C-clamps, concrete reinforcement wires, or bailing wire cut to an appropriate length. The ties 116 are attached by hand, pliers or other appropriate tools. Alternatively, the wire mesh 104 can be spot-welded to the trusses 70. The wire mesh 104 is preferably applied to both sides of the trusses 70 so that the resulting structural panel 90 contains filler members 94 interdigitated with trusses 70, with overlays of wire mesh 104 on both sides. The wire mesh 104 can be comprised of a wire netting, such as chicken wire as is commonly used in plastering applications, as well as the pre-manufactured wire netting assemblies such as K-Lath™. Other commercially available wire meshes 104 may also be used as suits the demands of the structure to be built. These commercially available wire meshes 104 are typically of a single gauge of wire in both the latitudinal 112 and longitudinal 114 directions. In some cases, however, the latitudinal wire 112 will be of one gauge while the longitudinal wire 114 will be of a different gauge.

Commercially available anchoring plugs or lathing members 118 such as metal sheets or furring channels may be added to the structural panel 90, typically within the wire mesh 104, to act as a secure anchor for later attachment of drywall, gypsum board or the like.

Figure 7:
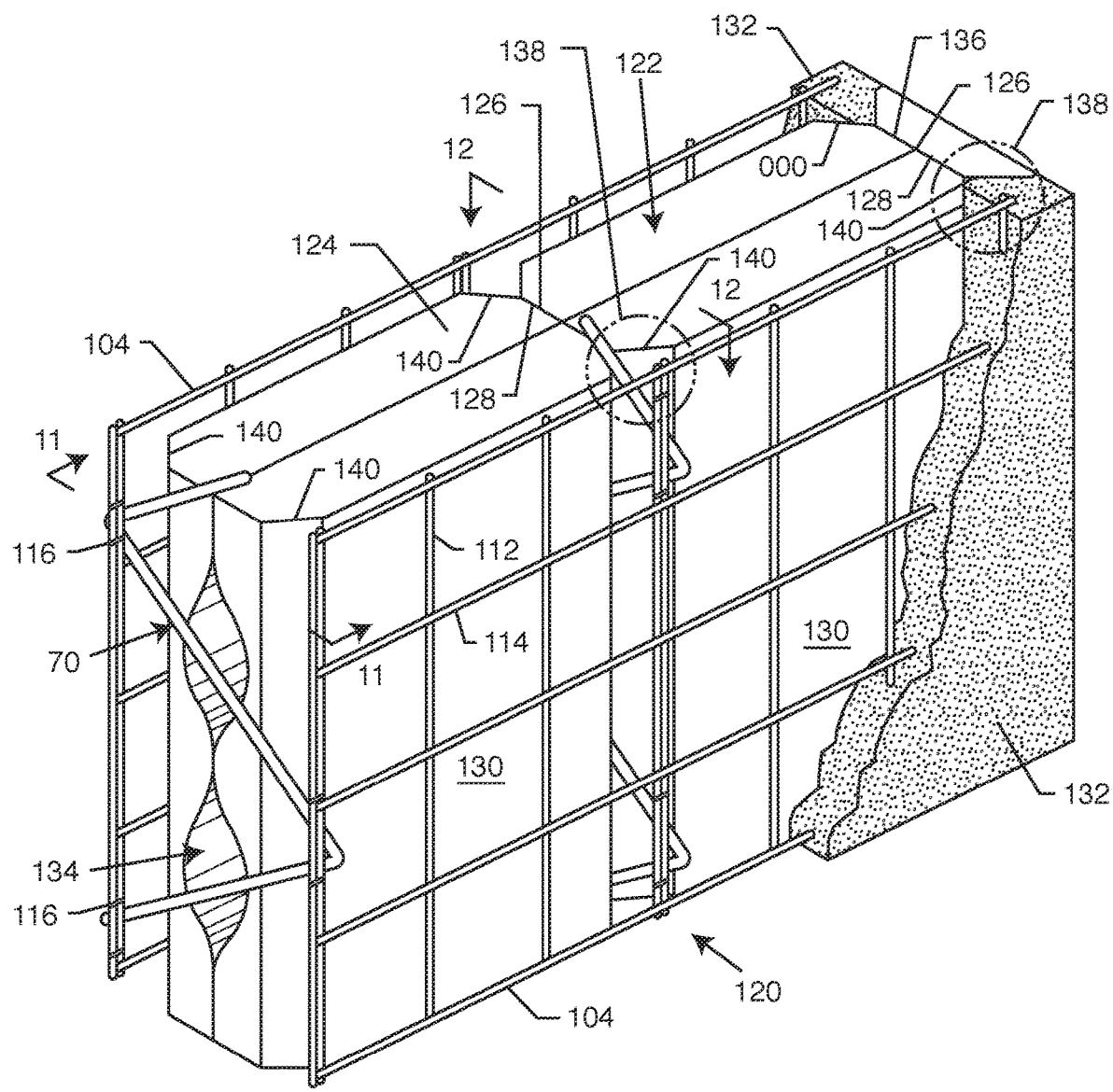
FIG. 7 is a partly fragmented perspective view of another fabricated structural panel embodying the present invention and illustrating the relation of lattice structure, core filler elements, wire mesh, C-ring connectors, durable coating, voids in the core and the shaping of core material at truss contact lines to create thicker concrete and resultant increased structural capacity.
Figure 8:
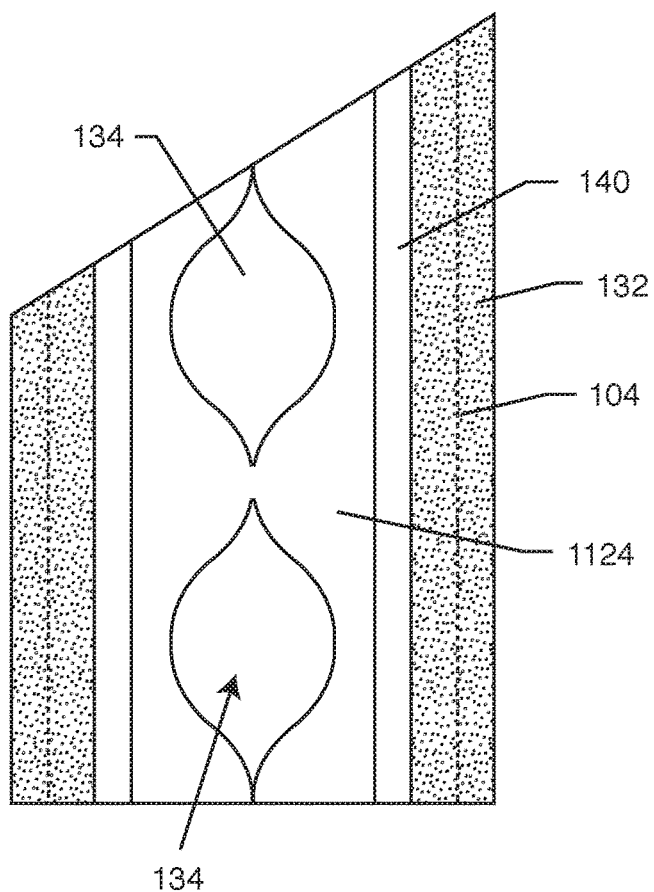
FIG. 8 is an elevation cross-sectional view of the panel of FIG. 8.
Figure 9:
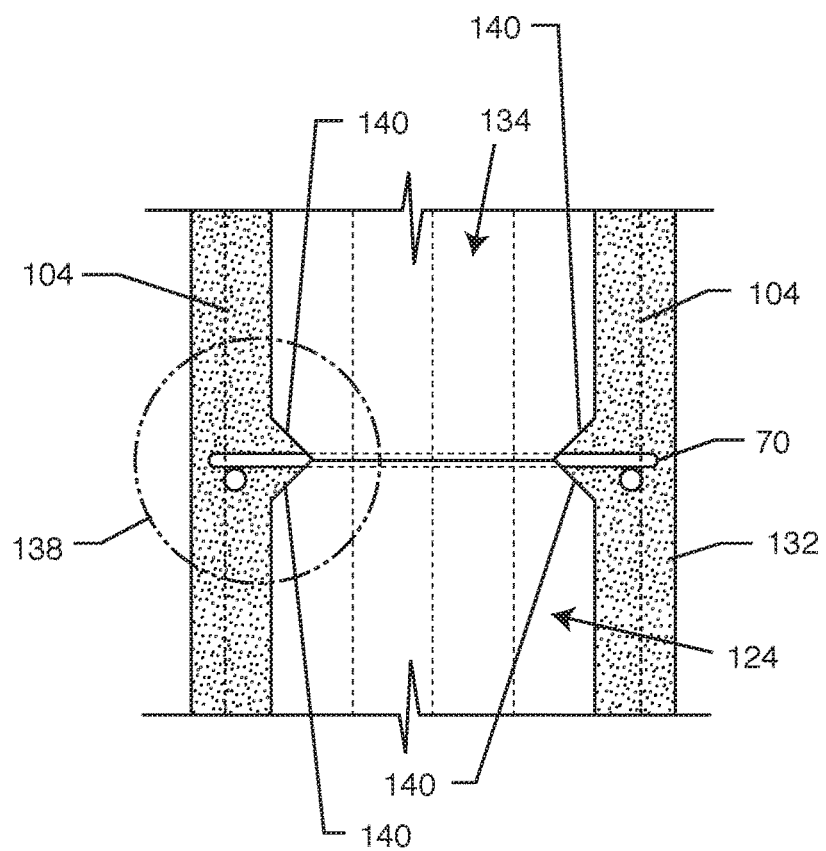
FIG. 9 is a top plan cross-sectional view of the panel of FIG. 7.

As shown in FIGS. 7-9, another structural panel 120 embodying the present invention includes a panel core 122 having a plurality of elongated filler members 124 in face-to-face contact at surfaces 126 and 128 with trusses 70 interdigitated with the filler members 124. The plurality of elongated filler members 124 lay in a mutually contiguous arrangement. Between opposed surfaces 126 and 128 of the filler members 124 are alternatingly placed trusses 70 of the type shown in FIG. 1 and aligned with the filler members 124. Each elongated filler member 124 has opposite side surfaces 130 extending generally normal to the opposed surfaces 126 and 128. A rectilinear cross-section is the norm but not necessary. Trapezoidal shapes would allow for the construction of curvilinear panels.

The filler members 124 can be of a solid foamed type, such as solid plastic foamed material or glass foamed material. The elongated filler members 124 may also be made from a variety of organic materials comprising agricultural waste or biomass such as straw or wood chips hammer milled or otherwise broken and added to a stabilizer such as cement. The primary requirement is that the finished organic filler elements have sufficient physical strength to be useful over the period of time of manufacture and erection of the panels and resist the stresses of the application of a cementitious covering or coating 132. The stabilizer should prevent the environment, insects, rodents and the like, from eating away or degrading the organic material. Naturally stable materials such as rice straw are also suitable. The foamed material or stabilized organic material is made into the required shape and dimensions to form a panel core sub-assembly. The organic material filler member 124 can be blown into plastic bags or combined with a polymer and poured, extruded or otherwise formed into free standing members as is known in the art.

The filler members 124 include utility chases or voids 134 in the core 122. The voids 134 allow electrical wiring and plumbing piping to be routed through the panels 120.

The material of the core 122 is shaped at truss contact lines 136 (i.e., where the trusses 70 contact the surfaces 126 and 128 of the filler members 124) to create thicker cementitious covering 132 (e.g., concrete) and resultant increased structural capacity. For example, from the top or bottom, the panel 120 includes an octagonal cross-section such that a structural T-section or notch 138 is created on either side of the panel 120 where the filler members 124 meet at the truss contact lines 136; allowing for a greater amount of the cementitious covering 132 to fill the area of the notch 138 and increase the structural capacity of the panel 120. For example, the corners 140 of the filler members 124 are cut at forty five degree angles such that a ninety degree angle is formed in the notch 138 on both sides 130 of the filler members 124 when two adjoining filler members 124 are pressed together to form the notches 138 on either side 130 of the panel 120.

Wire mesh 104, formed of lateral wires 112 and longitudinal wires 114, is laid against the side surfaces of the pressed core of trusses 70 and filler members 124 and attached to the rods 76 with commercially available metal ties 116, such as upholstery C-clamps, concrete reinforcement wires, or bailing wire cut to an appropriate length. The ties 116 are attached by hand, pliers or other appropriate tools. The wire mesh 104 is preferably applied to both sides of the trusses 70 so that the resulting structural panel 120 contains filler members 124 interdigitated with trusses 70, with overlays of wire mesh 104 on both sides.

Figure 10:
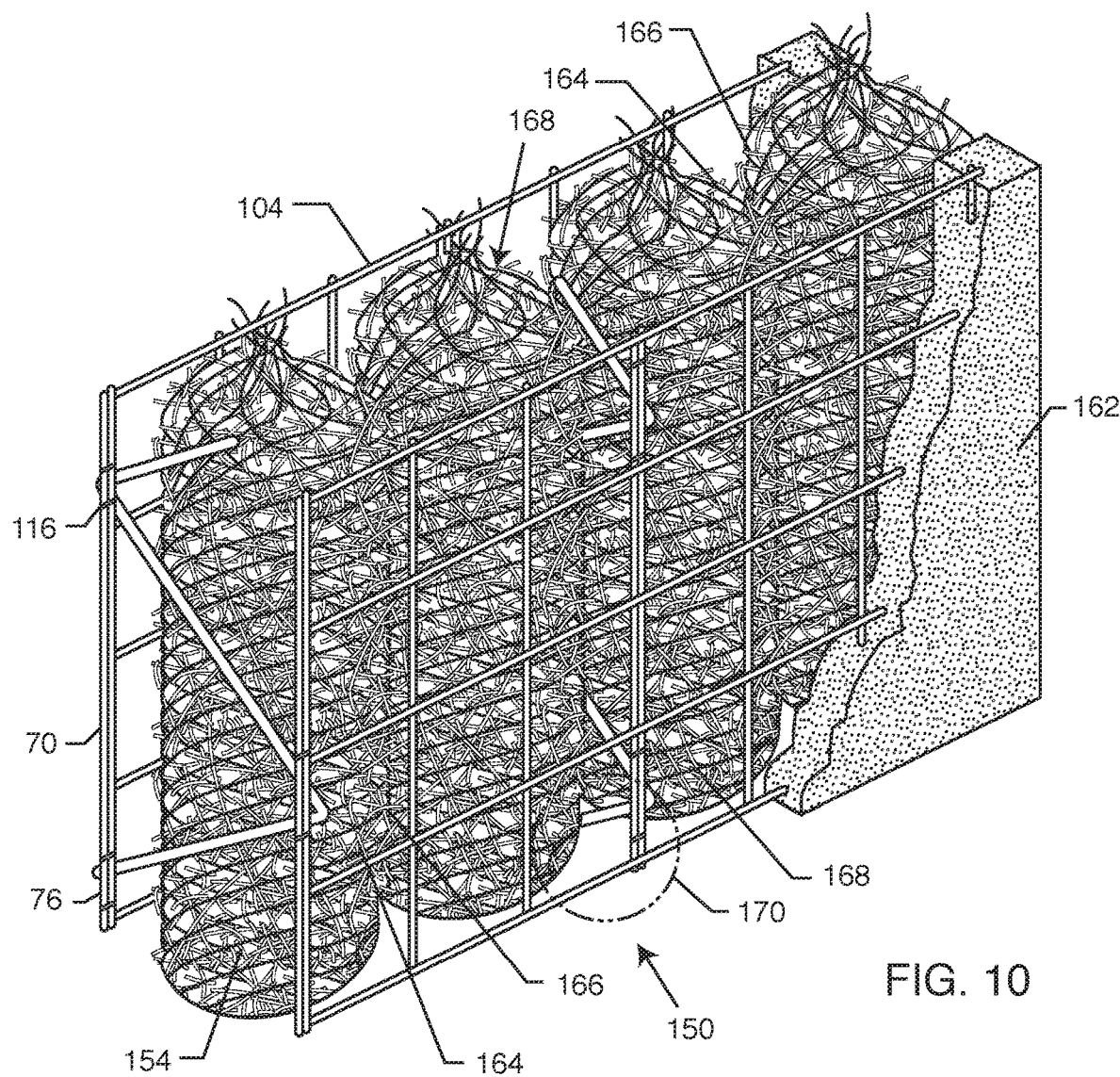
FIG. 10 is a partly fragmented perspective view of an additional fabricated structural panel embodying the present invention that uses wattles as filler members.
Figure 11:
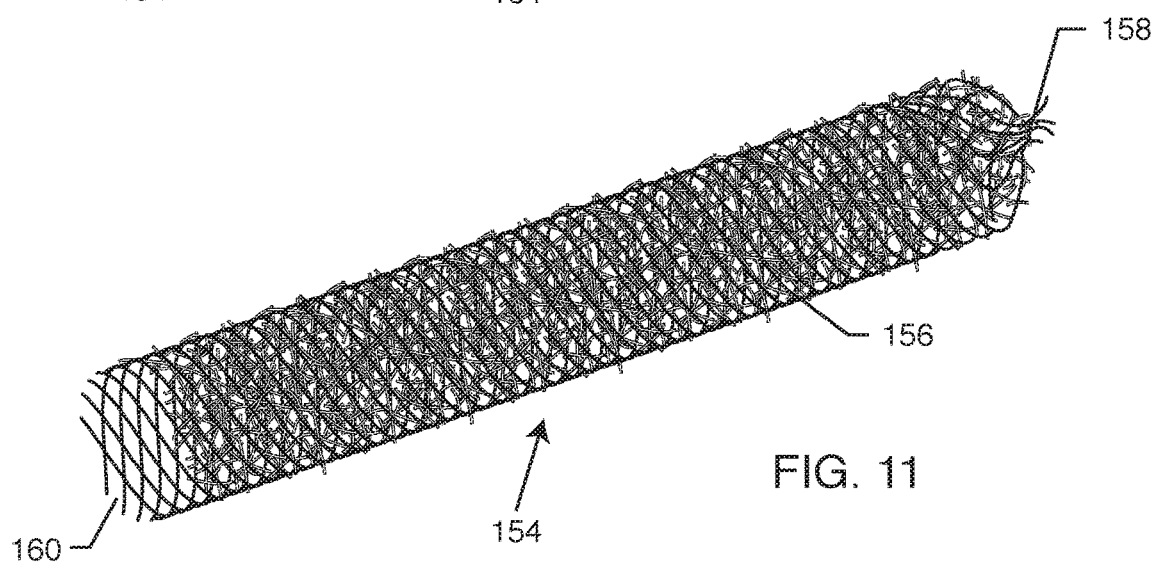
FIG. 11 is a perspective view of a wattle that serves as a filler member in the panel of FIG. 10.

As shown in FIGS. 10 and 11, another structural panel 150 embodying the present invention includes a panel core 152 having a plurality of elongated filler members 154 in the form of wattles. Each wattle 154 is formed by a tubular plastic mesh bag 156 that is closed on one end 158 and open on an opposite end 160. The open end 160 is then filled with a variety of materials including, without limitation, cloth, plastic bags, agricultural waste or biomass (e.g., straw or wood chips hammer milled or otherwise broken) and added to a stabilizer such as cement. The primary requirement is that the filler elements have sufficient physical strength to be useful over the period of time of manufacture and erection of the panels and resist the stresses of the application of a cementitious covering 162. The stabilizer should prevent the environment, insects, rodents and the like, from eating away or degrading the organic material. Naturally stable materials such as rice straw are also suitable. The bag 156 is generally hard packed as the bag 156 is filled. Once the bag 156 is filled, the end 160 is closed. Utility chases or voids (not shown), such as those described above, may be formed in the wattles that form the core 152. The filler members 154, generally cylindrical in shape, are side-to-side contact at surfaces 164 and 166 with trusses 70 interdigitated with the filler members 154. The plurality of elongated filler members 154 lay in a mutually contiguous arrangement. Between opposed surfaces 164 and 166 of the wattles 154 are alternatingly placed trusses 70 of the type shown in FIG. 1 and aligned with the wattles 154.

The generally cylindrical shape of the wattles at truss contact lines 168 (i.e., where the trusses 70 contact the surfaces 164 and 166 of the filler members 44) to create thicker cementitious covering 162 (e.g., concrete) and resultant increased structural capacity. For example, from the top or bottom, the panel 150 includes a circular cross-section such that a structural T-section or notch 170 is created on either side of the panel 150 where the wattles 154 meet at the truss contact lines 168; allowing for a greater amount of the cementitious covering 162 to fill the area of the notch 170 and increase the structural capacity of the panel 150.

A wire mesh 104, formed of lateral wires 112 and longitudinal wires 114, is laid against the side surfaces of the pressed core of trusses 70 and filler members 154 and attached to the rods 76 with commercially available metal ties 116, such as upholstery C-clamps, concrete reinforcement wires, or bailing wire cut to an appropriate length. The ties 116 are attached by hand, pliers or other appropriate tools. The wire mesh 104 is preferably applied to both sides of the trusses 70 so that the resulting structural panel 150 contains wattles 154 interdigitated with trusses 70, with overlays of wire mesh 104 on both sides.

Figure 12:
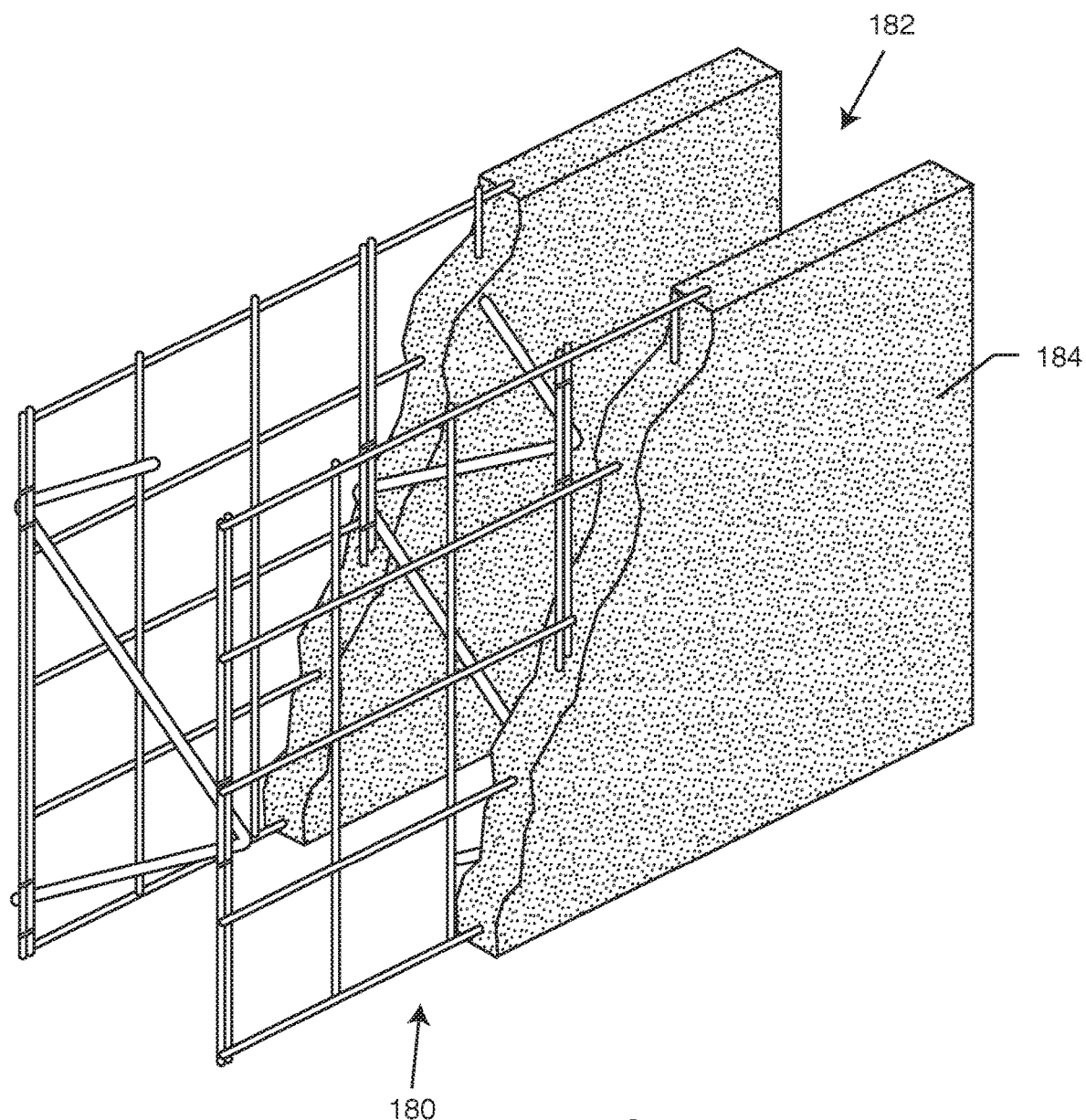
FIG. 12 is a partly fragmented perspective view of another fabricated structural panel embodying the present invention that uses a vanishing or removable core.
Figure 13:
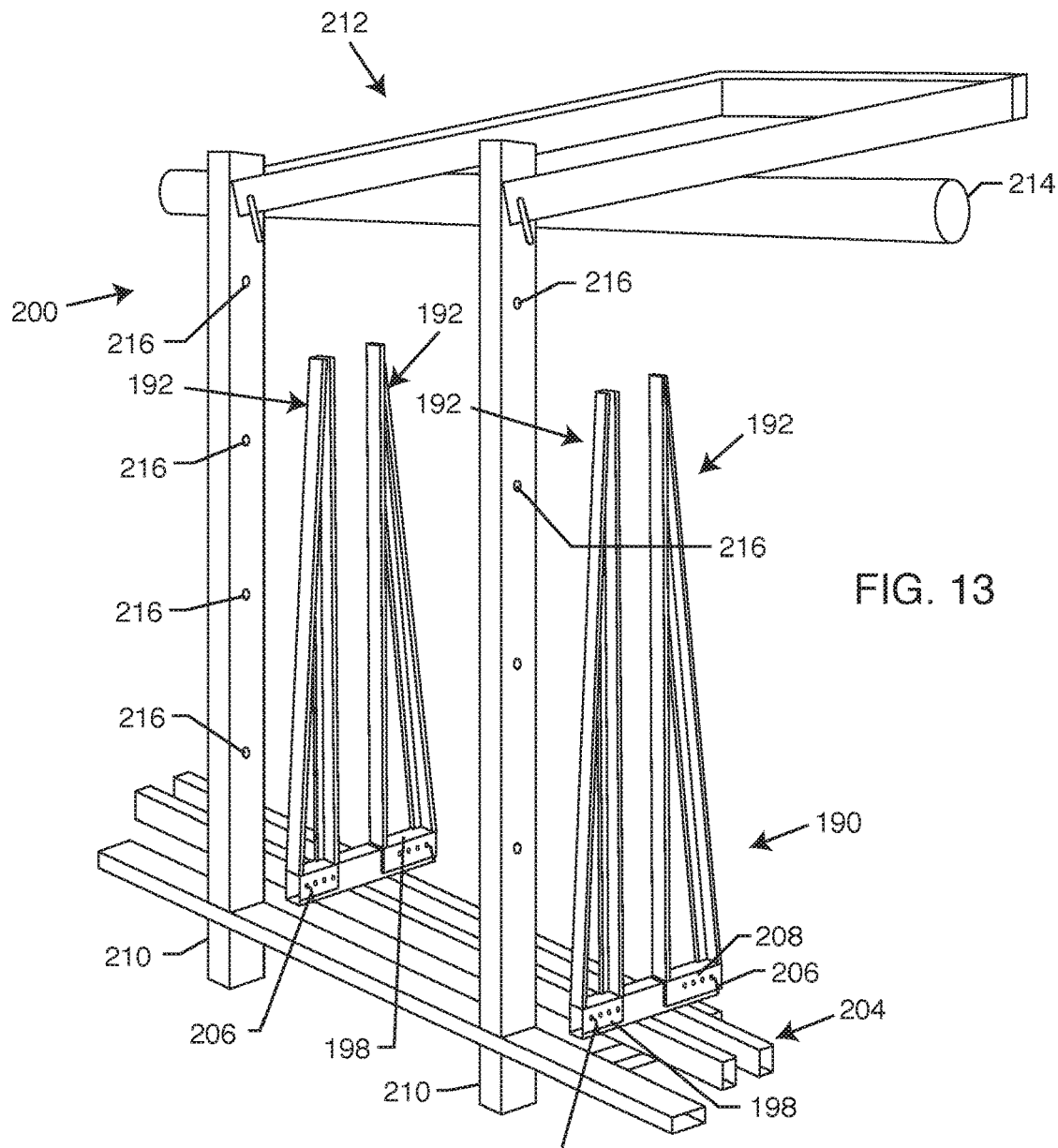
FIG. 13 is a perspective view of an embodiment of a mechanical press machine and a cart that can be quickly and easily adjusted to allow the fabrication of panels as specified by engineering requirements.
Figure 14:
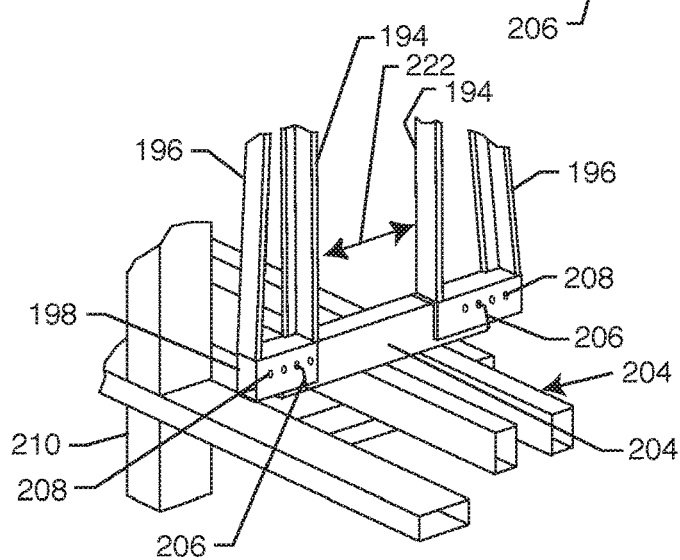
FIG. 14 is an enlarged perspective view of the cart of FIG. 13 showing the side arms laterally adjusted, moved apart from each other.
Figure 15:
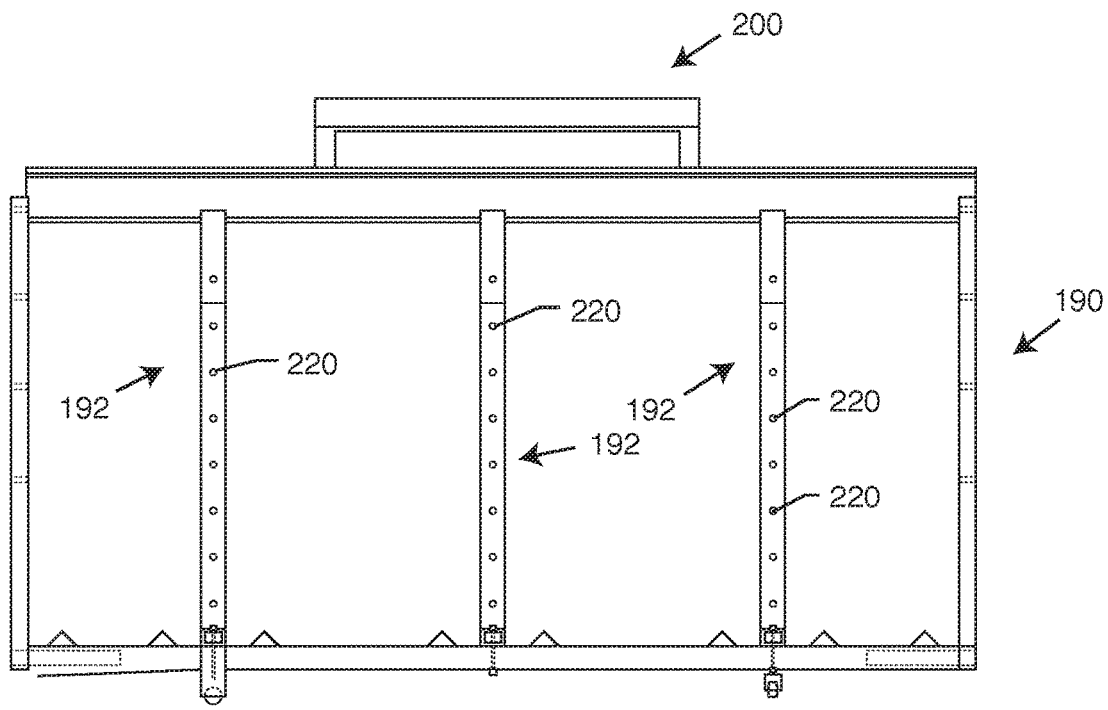
FIG. 15 is an elevation view of the cart of FIG. 13.
Figure 16:
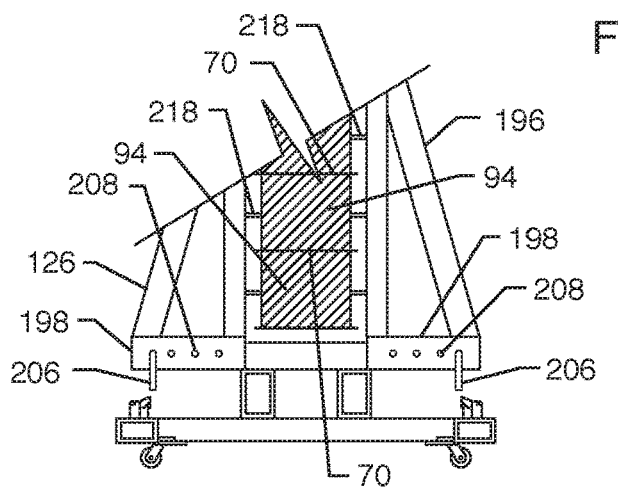
FIG. 16 is a cross-sectional view of the lower portion of the cart of FIG. 13.
Figure 18:
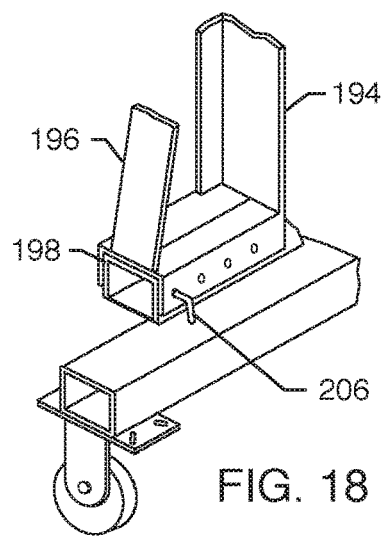
FIG. 18 is another partial orthogonal view of the lower portion of the cart of FIG. 13.
Figure 17:
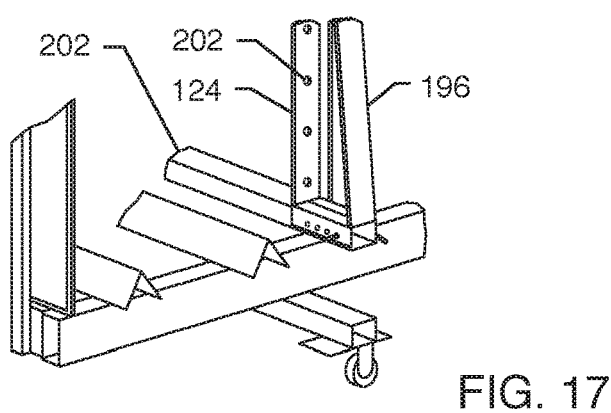
FIG. 17 is a partial orthogonal view of the lower portion of the cart of FIG. 13.
Figure 19:
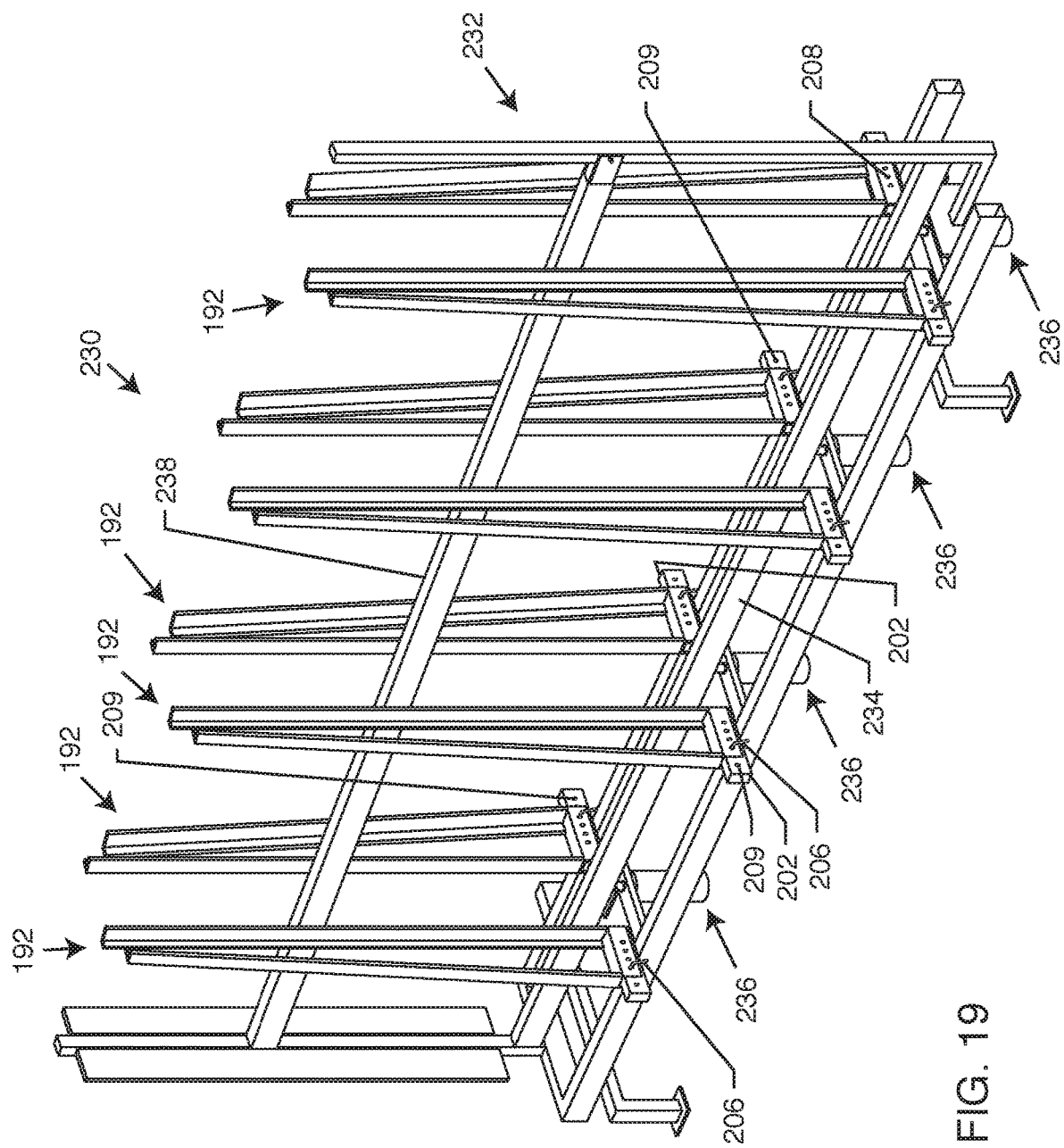
FIG. 19 is a perspective view of an embodiment of a pneumatic/hydraulic press machine and a cart that can be quickly and easily adjusted to allow the fabrication of panels as specified by engineering requirements, shown with the pressing bar in a lowered position.
Figure 20:
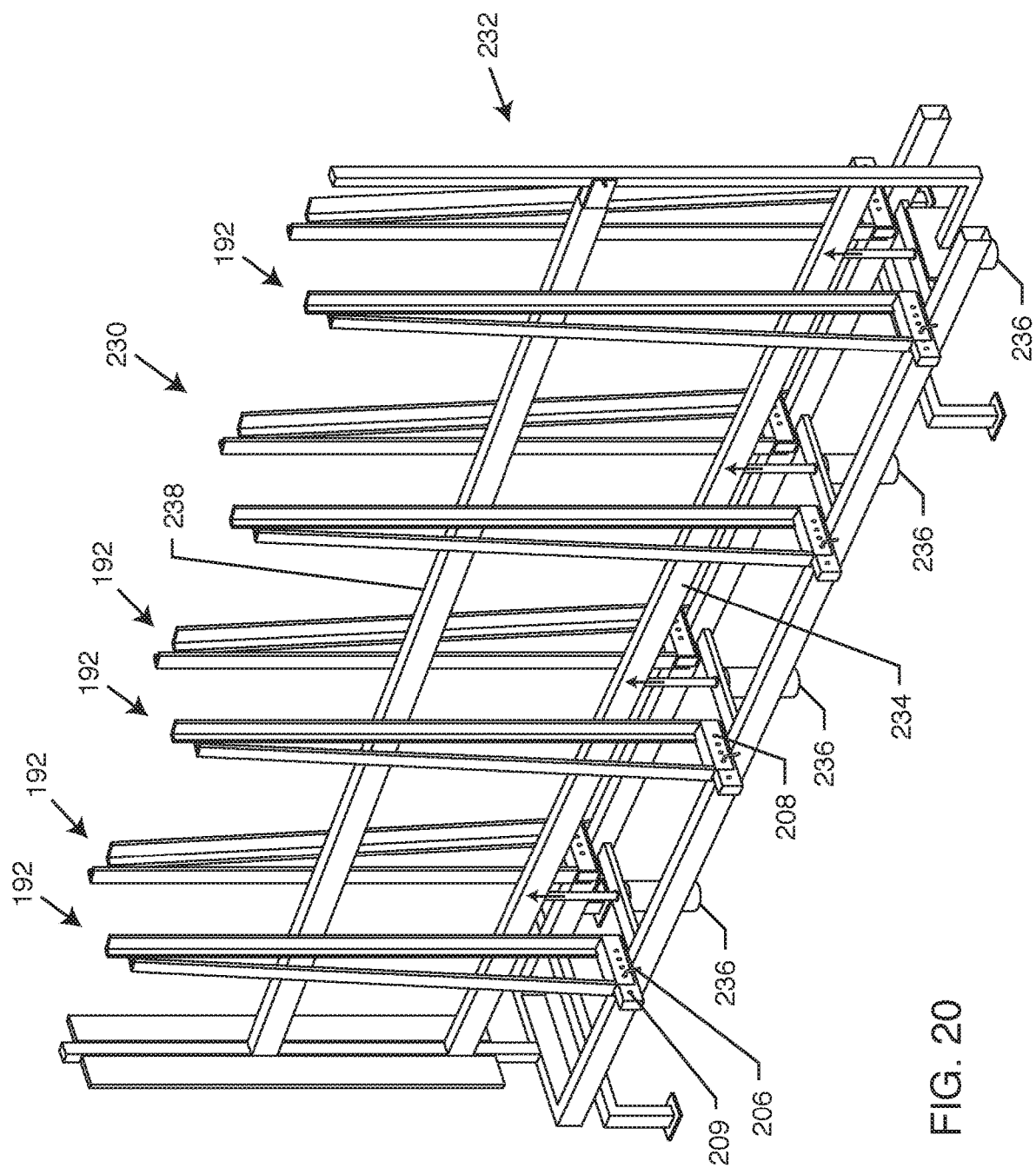
FIG. 20 is another perspective view of the press machine of FIG. 19, shown with the pressing bar in a raised/pressing position.

As shown in FIG. 12, another structural panel 180 embodying the present invention includes a vanishing or removable panel core 182. The core 182 is vanishing or removable in that filler members (not shown) forming the core 182 are extracted from the panel 180 once the panel 180 is complete. In other words, a core 182 that would "vanish" and leave the entire core of the panel 180 substantially open and available for other uses such as ventilation ducts, etc., would be of significant utility. A plurality of elongated filler members, similar to the filler members 94, 124, 154 described above, may be placed in face-to-face contact at surfaces (not shown, similar to surfaces 96, 98 or 126, 128 described above) with trusses 70 interdigitated with the filler members. The plurality of elongated filler members lay in a mutually contiguous arrangement. Between the opposed surfaces of the filler members are alternatingly placed trusses 70 of the type shown in FIG. 1 and aligned with the filler members. Each elongated filler member has opposite side surfaces (not shown) extending generally normal to the opposed surfaces. A rectilinear cross-section is the norm but not necessary. Trapezoidal shapes would allow for the construction of curvilinear panels.

The filler members can be of a solid foamed type, such as solid plastic foamed material or glass foamed material. The elongated filler members may also be made from a variety of organic materials comprising agricultural waste or biomass such as straw or wood chips hammer milled or otherwise broken and added to a stabilizer such as cement. The primary requirement is that the finished organic filler elements have sufficient physical strength to be useful over the period of time of manufacture and erection of the panels and resist the stresses of the application of a cementitious covering. The stabilizer should prevent the environment, insects, rodents and the like, from eating away or degrading the organic material. Naturally stable materials such as rice straw are also suitable. The foamed material or stabilized organic material is made into the required shape and dimensions to form a panel core sub-assembly. The organic material filler member can be blown into plastic bags or combined with a polymer and poured, extruded or otherwise formed into free standing members as is known in the art.

The filler members include utility chases or voids in the core. The voids allow electrical wiring and plumbing piping to be routed through the panels. In the alternative, the panel may be produced without the filler members.

The material of the core 182 is shaped at truss contact locations (i.e., where the trusses 70 contact the surfaces of the filler members) to create thicker cementitious covering or coating 184 (e.g., concrete) and resultant increased structural capacity. For example, from the top or bottom, the panel 180 includes an octagonal cross-section such that a structural T-section or notch (not shown) is created on either side of the panel 180 where the filler members meet at the truss contact locations; allowing for a greater amount of the cementitious covering 184 to fill the area of the notch and increase the structural capacity of the panel 180. For example, the corners (not shown) of the filler members are cut at forty five degree angles such that a ninety degree angle is formed in the notch on both sides of the filler members when two adjoining filler members are pressed together to form the notches on either side of the panel 180.

A wire mesh 104, formed of lateral wires 112 and longitudinal wires 114, is laid against the side surfaces of the pressed core 182 of trusses 70 and filler members and attached to the rods 76 with commercially available metal ties 116, such as upholstery C-clamps, concrete reinforcement wires, or bailing wire cut to an appropriate length. The ties 116 are attached by hand, pliers or other appropriate tools. The wire mesh 104 is preferably applied to both sides of the trusses 70 so that the resulting structural panel 180 contains filler members interdigitated with trusses 70, with overlays of wire mesh 104 on both sides.

Once the cementitious covering 184 has dried and the panel 180 formed, the filler members of the core 182 are removed. These filler members use a material that remains in place only temporarily until the cementitious coverings or skins 184 have been applied to the panel 180 This could be accomplished in several ways, including: melting cores; air-filled bags; and re-usable/removable bags.

A melting core could be formed from certain materials that are readily "melted" away by the application of a catalyst. For example, certain soy-based foams can be melted by the application of water and certain plastic foams can be melted by the application of both heat and certain chemicals, such as acetone. In another example, frozen materials including, without limitation, frozen water, could be used.

Air-filled or gas-filled bags could be used. Once the panel 180 was complete, the bags could be deflated or otherwise evacuated and removed from the panel 180. Even bags filled with solids which could readily be evacuated could be used. For example, sand or ice could fill a bag during construction of the panel 180 and the sand or ice evacuated once the panel 180 was complete. Likewise, plastic is readily formed into bag shapes that can hold air, sand or the like and resist the forces encountered in fabricating the panels. Bags of cloth, made of both natural and synthetic materials, can be formed to hold air, sand or the like and resist the forces encountered in fabricating the panels. Other materials, accomplishing the function of holding air, sand or other gas, could readily be employed to accomplish the same purpose. Another possibility is the use of bags which could be deflated or otherwise evacuated and either removed and re-used or left in place.

In use, the structural panels 90, 120, 150, 180 of the present invention are arranged horizontally or vertically, depending on the structural loads being imposed. The structural panel 90, 120, 150, 180 can be employed in the construction of structures by itself or it may be integrated with other building materials. Some examples would be: (1) employ the structural panel 90, 120, 150, 180 in the construction of roofs on masonry or adobe walls; (2) the construction of in-fill walls in steel or concrete post-and-beam framed structures; (3) the construction of floors in the aforementioned construction types; (4) retaining walls; (5) fences; and (6) hardscape features such as tables and benches. By selecting trusses 70, 78 of differing wire 72, 80 or rod 76, 82 gauges, or by changing the gauge of the wires 112 and/or 114 in the wire mesh 104, the strength of the structural panel 90, 120, 150, 180 can be varied. Additionally, multiples of trusses 70, 78 or multiple layers of wire mesh 104 may be used to vary the strength of the structural panel 90, 120, 150, 180.

After the completed structural panel 90, 120, 150, 180 is erected to form the desired structure or building, it is then covered with the durable cementitious coating 106, 132, 162, 184 resulting in a hard, durable and substantially planar finished surface. The norm is for this coating 106, 132, 162, 184 to be a sand-cement plaster mix but this coating 106, 132, 162, 184 could be any of the air-placed cementitious materials (shotcrete, gunnite, etc.) or could be an adobe material. Additionally, modern coating materials such as hybrid concretes, glass fiber reinforced concrete, cement-plastic, or foamed concrete materials could all be employed to meet specialized or customized needs. It is also possible to pre-cast the coatings 106, 132, 162, 184 on the structural panels 90, 120, 150, 180 and then erect the pre-coated structural panels. The structural panels 90, 120, 150, 180 can also be used to create an insulating and reinforcing core in form-and-pour concrete or form-and-pour earthen systems.

The integration of the technology of structural concrete insulating panel systems (SCIPs), as described herein, with 3D printing may offer a solution to many of the aforementioned problems of affordable housing and current 3D printing construction method drawbacks. SCIPs are, in general, a welded-wired reinforcing cage, enveloping an insulating core, typically made of foamed plastic and covered with a thin shell of concrete on each face of the SCIPs. The resultant panels show high levels of composite behavior between two concrete shells which allows for the shells to be thinner than conventional concrete walls would need to be and stronger than solid concrete walls of the same thickness would be. SCIPs can also be used for floors and roofs. As the two thin concrete shells are isolated from each other by the insulating core, the result is also a highly insulating system, which functions very well, in both hot and cold climates.

Using 3D Printing to create the two thin shells, with an interstitial space between them, and connecting the two shells with the welded-wire truss of the SCIPs and filling the interstitial void between them with the insulating core of the SCIPs now allows for less concrete to be used and it creates an insulated wall. It increases the strength of the wall by creating composite behavior between the two shells.

Using SCIPs as the floors and roofs on 3D printed SCIPs walls offers floors and roofs of insulated concrete, and avoids mixing of less than compatible materials and not having to construct the floors and roofs by framing them of conventional materials, such as wood and steel.

The 3D printed shells may be made of any appropriate durable and/or cementing material, including concrete or adobe with additives such as Portland cement, fly ash, fibers, etc., and the blend of aggregates may also be varied, with the result that the strength and structural behavior of the shells and the integrated walls may now offer greater design flexibility.

The interstitial space between the two 3D printed concrete shells may be varied, allowing for the thickness of the insulation to be varied to meet environmental demands of the local climate.

The use of SCIPs as floors and roofs with the SCIPs walls, permits better compatibility of materials and also mitigates against risks of fires, termites, wind, and earthquakes; benefits not previously available with 3D printed walls and conventionally framed floors and roofs.

The use of SCIPs as floors and roofs with SCIPs walls also presents the possibility of multi-story buildings, which have yet to be accomplished with 3D printed walls and floors and roofs made of conventional building materials.

Typically, thin concrete shells are 3D printed to a maximum predetermined thickness, typically three inches (75 mm) or less. The 3D printed shells are made parallel to one another, but with avoid or interstice, between them. The welded-wire truss of the SCIPs and the insulating core of the SCIPs are used to fill the interstitial space between the two concrete shells and to connect the two shells, structurally, to one another creating a new integrated wall system.

Using SCIPs of the present invention with 3D printing of the concrete shells enables one to construct floors and roofs on the integrated 3D printed walls. Using the same technique of integrating these two technologies may be used to construct both interior and exterior walls as well. As the interstitial space may be varied, and the thickness of these 3D printed shells may be varied, and the frequency and design of the welded-wire truss from the SCIPs may be varied in spacing, the entire integrated system may now offer far greater design flexibility.

The components of the structural panel 90, 120, 150, 180 are widely available, even in rural areas or foreign countries, which dramatically reduces the costs associated with the pre-fabricated structural panels. Particularly in third world countries, organic materials as described above which would otherwise be disposed of can be used in the construction of buildings and other structures. In addition to being able to create the panel 90, 120, 150, 180, it is desirable to provide flexibility in the process, tools, equipment and machines used to create the panel 90, 120, 150, 180. Flexibility is desirable in terms of truss design, mesh design, erection/installation, variation in the composition of the cementitious skins 106, 132, 162, 184 and the addition to the panel of miscellaneous components to enhance the application of the panel.

For example, one factor in the panel design that a user may desire to accommodate is the design of the truss which may involve a range of truss depths, weights or gauges of the trusses and a range of dimensions in the center to center spacing of the trusses. Another factor desirable design flexibility is a range of filler sizes and materials, a range of weights or shapes of the filler elements, and a range of dimensions in the centering or alignment of the filler elements within the core space of the panel. Still another factor is a range of mesh density dimensions (i.e., the center to center spacing of the longitudinal and/or transversal wires in the mesh) as well as a range of weights, or gauges, of the mesh and a multiplicity of layers of mesh on one, or both, faces of the panel.

The user may also need to accommodate a variety of erection/installation methods where the breadth of such erection and installation includes use as air-placed, cast-in-place, pre-cast, tilt-up, and hand applied cementitious skins. Another desirable accommodation is the available breadth of compositions of cementitious skins where such compositions include a variety of aggregates, fiber reinforcement, and a variety of add mixtures to alter the performance of the cementitious skins. Naturally, the user may need to add miscellaneous components to the panel to enhance the application of the panel, such as anchoring plugs or lathing members to facilitate attachment of surface treatment sheet goods.

FIGS. 13-18 illustrate a wheeled cart 190 and a press 102, in the form of a mechanical press 200, where the cart 190 can be quickly and easily adjusted to allow for the fabrication of panels 90, 120, 150, 180 of varying designs, specifications and components.

The carts 190 are generally manufactured from common light steel shapes (angles, tubes, etc.) and are typically ten feet long but can be linked together to create a twenty foot cart for pressing longer panels 90, 120, 150, 180. Any number of carts 190 may be employed which allows for staging of the panel stacks for faster throughput.

The cart 190 includes at least two pairs of laterally adjustable side arms 192 between which a plurality of filler members 94, 124, 154 with a plurality of trusses 70 are aligned in an alternating, interdigitating, sequence to form a stack to be pressed to form a panel core 92, 122, 152, 182. Each side arm 192 includes a vertical member 194 and an angled bracing member 196 to brace the vertical member 194 that are connected to an inverted U-shaped base member 198. Each base member 198 slidingly engages a rail bar 202 shaped to receive the base member 198, the rail being disposed on a base 204 of the cart 190. Each pair of side arms 192 spaced apart from each other shares a common rail bar 202. The side arms 192 slide along the rail 202 and the relative distance between the side arms 192 can be adjusted. Each side arm 192 can be adjusted and locked in position using a keeper pin 206 inserted through one of the apertures 208 located on the base member 198 when the aperture 208 is aligned with one of a plurality of apertures 209 located along the length of the bar 202. The side arms 192 also include adjustable fingers 218 in the form of threaded shafts designed to screw in and out of apertures 220 located along the length of the vertical member 194 of the arm 192. Because each side arm 192 can be individually moved inwardly towards and outwardly away from the center of the cart 190, the change in truss depth and resultant thickness of the panels 90, 120, 150, 180 can be accommodated. Arrows 222 indicate the directions the side arm 192 is adjustable in. The adjustable fingers 218 of the side arms 192 allow the placement of the filler members 94, 124, 154 to be adjustable.

This apparatus is essentially made up of two parts: 1) the press 200 and, 2) the cart 190. The press 200 is a simple, manually operated lever-type device, which uses its own weight in the compression pressing arm 212 plus the body weight of the operator, if needed, to compress a panel stack in the cart 190 formed by filler members 94, 124, 154 and trusses 70, 78.

A first truss 70, 78 is placed along the top of the base 204 of the cart 190 between the side arms 192. The relative distance between the side arms 192 can be adjusted to accommodate a filler member 94, 124, 154 that is then placed down on top of the first truss 70, 78 and a second truss 70, 78 is placed on top of the filler member 94, 124, 154. A second filler member 94, 124, 154 can then be placed on top of the second truss 70, 78 and the stacking continued until a desired number of trusses 70, 78 and fillers 94, 124, 154 form a stack of a desired height, and ultimately, a panel 90, 120, 150, 180 of a desired length after the stack is pressed. The adjustable side arms 192 allow for various widths of panels 90, 120, 150, 180 to be manufactured and the registration changed to allow for the adjusting the position of the filler member 94, 124, 154 (e.g., foam, bio-mass, wattle) in the cart 190 so that the panel core 92, 122, 152, 182 is centered or eccentric (e.g., off-centered), as required since each side arm 192 can be individually adjusted in incremental lengths (due to the number and spacing of apertures 208 on the base member 198 and the apertures on the rail 202) towards or away from the center of the cart 190.

Once the stack is the desired height, the cart(s) 190 are placed in the press 200 where manual force is employed to compress the stack so as to bring the stack into final height dimension. This results in the core material 94, 124, 154 being compressed and the trusses 70, 78 being pressed into the core material 94, 124, 154. The press 200 includes two vertical poles 210 bolted to the ground, a U-shaped pressing arm 212 pivotally connected to the poles 210, and a pressing bar 214 connected to the pressing arm 212. When the stack is aligned with the press 200, a free-standing elongated plate (not shown) is placed on top of the stack to distribute the force of the pressing bar 214 when the pressing bar 214 is brought down on top of the stack by the pressing arm 212 being moved downwards towards the stack. A plurality of apertures 216 located along the vertical poles 210 allows the height of the pressing arm 212 and pressing bar 214 to be adjusted. The elongated plate is locked into place at the correct final dimension of the pressed stack. Once the elongated plate is locked in place, the cart 190 may be removed from the press 200.

Two ten-foot-long presses 200 may be arranged side by side in order to allow for each press 200 to be operated independently in pressing panels 10, 40 up to ten feet in length, as well as being operated in concert to press panels 90, 120, 150, 180 over ten feet in length.

The side arms 192 are removable so as to allow free access to the trusses 70, 78 during the panel fabrication process. The same cart 190 can be used to produce panels 90, 120, 150, 180 of various designs, specifications and components and thereby allowing the panels to be an "engineered" product as opposed to being produced on a machine that can only make identical panels.

In order to make cores 92, 122 with voids 134, the foam filler 94, 124, is cut in a manner that when the two pieces are pulled apart, "split", and off-set by one-half of a cut, the two pieces now form the voids 134. The adjustable fingers 218 apply pressure to hold the two pieces of foam filler 94, 124 to be held in contact with each other while the panel 90, 120 is being pressed and the face mesh 104 is applied. The fingers 218 also allow the core 92, 122 to be centric or eccentric, thereby accommodating the need for different thicknesses of cementitious skins 106, 132 on the two faces of the panels 90, 120. Were it not for the fingers 218, the core pieces 94, 124 would move away from each other during pressing. Additionally, the adjustable nature of the fingers 218 allows the core 92, 122 to be moved to accommodate dissimilar thicknesses of cementitious skins 106, 132. In the alternative, lathing members 118 could be used instead of the fingers 218 as lathing members with legs of varying lengths would provide the same function of aligning the foam filler 94, 124 in relation to the truss cords.

The press 200 described above is an advance over prior presses. The press 200 is an entirely manually operated press. This allows for two additional advantages over prior presses in that: 1) it reduces the cost of the machine which reduced the cost-of-entry threshold (this is of significant importance to inner-city redevelopment work and to developing nation work); 2) it increases the number of persons that can be productively employed (this is of value in developing nations and in inner-city redevelopment where an overabundance of low-skilled or un-skilled workers is prevalent).

While this press machine 200 can be mounted on a towable trailer type of platform, it can also work on a floor-type condition. This is because the flow can be non-linear and the typical width of a towable trailer will reduce the effectiveness of the non-linear movement.

As outlined above, in the pressing process, the trusses 70, 78 and core materials 94, 124, 154 are stacked in an alternating, interdigitating manner, starting and ending the stacking process with a truss 70, 78. The stack is built in the cart 190, typically with the front arms 192 removed for improved access, and with the back arms 192 of the cart holding the back layer of face mesh 104. The face mesh 104 is hung on the fingers 218 of the back arms 192 first and then the trusses 70, 78 and core materials 94, 124, 154 are stacked against the face mesh 104. Once the desired height of the stack is achieved, the front arms 192 and face mesh 104 are put in place.

With the cart 190 now loaded with the trusses 70, 78 and core material 94, 124, 154, stacked in an interdigitating manner, with a truss 70, 78 on the bottom and top of the stack, and with the two sheets of face mesh 104 in place, hanging on the fingers 218 of the cart arms 192 and between the cart arms 192 and the stack, the cart 190 is now ready to be placed in the press 200. In the press 200, the stack will be compressed to bury the trusses 70, 78 slightly into the core materials 94, 124, 154. The purpose here is to put the faces of the core material 94, 124, 154 into general contact with each other. This allows for the cementitious skin 106, 132, 162, 184 to be kept only at the face surfaces of the panel 90, 120, 150, 180, when applied, rather than flowing through the panel at each truss 70, 78, as would happen if the panel 70, 78 were left in the loose-stacked configuration, prior to compression.

The compression of the stack also allows for the natural elasticity of the core material 94, 124, 154 to press back against each truss 70, 78 and thereby result in a lightly tensioned and more manageable panel 90, 120, 150, 180. If the face mesh 104 were affixed to the trusses 70, 78 in the loose-stack condition, the panel 90, 120, 150, 180 would be overly flexible, unwieldy, and would also risk allowing the core material 94, 124, 154 to fall out during handling.

The cart 190 also has the compression bar 214 which fits on the top of the stack and can be held in place with keeper pins (not shown), either at the ends or across the cart arms 192. This compression bar 214 allows the cart 190 to be removed from the press 200 while keeping the stack in compression, thereby permitting the attachment of the face mesh 104 to be done outside of the press 200, freeing up the press 200 for another cart 190 to be pressed.

This creates the non-linear work flow and allows for multiple carts 190 to be employed. Carts 190 can be in one area, being filled with stacks of trusses, 70, 78, core materials 94, 124, 154, and sheets of face mesh 104. When ready with their stacks, the carts 190 are moved into the press 200 to have the stack compressed and the cart compression bar 214 pinned in place. With the compression bar 214 in place, the cart 190 can be removed from the press 200 and located to another area. In this area, the face mesh 104 can be affixed to the trusses 70, 78, leaving the press 200 free to compress other carts 190 with their respective stacks. Once the face mesh 104 is attached to the trusses 70, 78, the panel 90, 120, 150, 180 can be removed from the cart 190, and the cart 190 returned to the stacking area, ready for the cycle to be repeated.

This use of a cart 190 in a non-linear flow allows for multiple carts 190 to be employed. The use of multiple carts 190 has several benefits: a) work output can be increased by adding more carts 190 rather than an entire apparatus, b) the tasks requiring the longest time, stacking and attaching face mesh 104, can be performed without involving the press 200 or without interfering with other task or even more of the same tasks, being done simultaneously, c) task specialization can be developed, with workers specializing in stacking, pressing, face mesh attachment, etc., or team work flow may be followed, with a worker team stacking the cart 190, taking the cart 190 to the press 200 and compressing the stack, then the same team taking the cart 190 out of the press 200 and attaching the face mesh 104 and producing the completed panel 90, 120, 150, 180. These benefits result in cost savings and better utilization of labor.

Because the carts 190 can be hooked together, the standard 10' cart length can readily be used to create combinations of extended carts 190 in order to produce longer panels. Multiple presses 200 can also be aligned so that such extended carts 190 can be pressed at once. It is also possible for such extended carts 190 to be pressed in stages with a single press 200 by advancing the extended cart 190 through the press 200.

The width of the panels 90, 120, 150, 180 is now a maximum of six feet. This is due to the general heights limits of a worker to reach the top of the stack and to the instability of the carts 190 as the carts 190 are loaded higher, and the height of the press arm 212 is increased, to accommodate the carts 190 and stacks. However, the increased width, over the previous four feet, is a great advantage in at least two areas of field application of the panels: 1) improved productivity due to the increased surface area of each panel 90, 120, 150, 180 and 2) decreased costs associated with joints in the field. All field joints must be covered with a piece of the same material as the face mesh 103, to avoid cracking in the cementitious skin 106, 132, 162, 184.

When used in constructing walls of a building, having panels six feet wide reduces the number of joints in the field, thereby improving field productivity and reducing joint mesh costs. When used to construct fences, because the standard height for a fence is six feet, the ability to produce six foot panels eliminates all longitudinal joints in the fence, thereby greatly improving productivity in the field and decreasing joint mesh costs.

The adjustable arms 192 and fingers 218 on the carts 190 offer the opportunity to produce panels 90, 120, 150, 180 of a wide variety of widths in a single apparatus and to locate the core material 94, 124, 154 in eccentric positions, relative to the face of the panel 90, 120, 150, 180.

The adjustable carts 190 now allow panels 90, 120, 150, 180 to be produced ranging in thickness from two inches to twelve inches or greater. This allows for the structural advantages of a deeper truss to be more readily available than previous machines.

Because carts 190 can be added, almost without limitation, productivity can be increased, again almost without limitation, simply by assigning more carts 190 and a worker or two. This is of great advantage since the tasks are unchanged and the cost of adding carts 190 is very small compared to adding an entire new manufacturing apparatus. This makes expansion lower cost and much lower risk. The risk is lower because the capital investment is lower and the learning curve is short. In the event of reduced demand or increased demand crews can be readily increased or decreased and little capital is idled or invested.

An additional embodiment of the invention, briefly discussed above, includes a method and apparatus that may be used in many locations where it is desirable that a pressing apparatus 230 be done hydraulically or pneumatically.

This press apparatus 230, similar to the press 200 described above, addresses this need by making the pressing function integrated into a cart 232, similar to the cart 190 described above, by the addition of a pneumatically or hydraulically operated pressing member 234 at the bottom of each cart 232 that is moved by a plurality of a pneumatically or hydraulically operated ram cylinders 236 (pneumatic/hydraulic lines not shown for clarity). This press bar 232 moves up, from the bottom of the stack, and compresses the stack against the compression bar 238 of the cart 232.

In this configuration the carts 232 do not need to be wheel-mounted because the carts 232 do not need to move into and out of the press 230. The carts 232 can now be floor-mounted 258. Multiple carts 232 can still be used and the carts 232 can be aligned so that longer panels 90, 120, 150, 180 can be produced through the use of two or more carts 232. The flow can still be non-linear because each cart 232 can be accessed and operated independently.

With these carts 2323 floor-mounted and with a moveable personnel platform available, these carts 232 are now designed to produce panels eight feet wide. The floor mounting overcomes the instability of having such a tall stack on a moveable cart 190, being moved into and out of the press 230 used with the immovable cart 232. The moveable personnel platform overcomes the difficulty of stacking trusses 70, 78 and core material 94, 124, 154 to eight foot heights as well as attaching the face mesh 104 to eight foot heights. The moveable personnel platforms are very simple and low cost and effectively address both of these problems.

Outside of the above described changes, this press apparatus 230 performs in a similar manner to the press 200 described above. The trusses 70, 78 and core material 94, 124, 154 are stacked in the cart 232 with the face mesh 104, the stack is compressed and the face mesh 104 is attached to the trusses 70, 78, resulting is a completed panel 90, 120, 150, 180. The advantages include relative low cost of entry threshold, readily increased output by adding relative low-cost carts, crew flexibility, etc.

Significant improvement in work output is achieved by producing eight foot panels. The panel produced by this embodiment is twice as wide as prior panels. This means that more work product is produced is the same number of production cycles, both in the making of the panels 90, 120, 150, 180 and in the installation of them in the field.

An improved panel production process addresses two problems not addressed by the previous apparatus': a) the desire to maximize field erection time and have the maximum practical size of panels, approximately twelve feet× forty eight feet (this size is about the largest size which can be practically handled due to transportation size limitations on most highways); and b) the desire to have the trusses 70, 78 oriented in either direction of the panel 90, 120, 150, 180, longitudinally or transversally (this allows for walls and floors/roofs to be built in large, twelve feet×forty eight feet, pieces while orienting the trusses 70, 78 in the direction appropriate to the structural loading on the panels 90, 120, 150, 180).

The press apparatus 200, 230 described above allows panels of eight feet by forty eight feet to be produced with four press apparatus' 200, 230 aligned. However, the trusses may only be aligned in the longitudinal direction, the forty eight feet direction. This is good for long span floors and roofs or for tall walls such as for industrial type buildings. However, there is a need for the production of walls of up to twelve foot heights but in long sections, such as the entire length of a house wall, in a single panel. This would allow for significant improvements in field productivity and allow for the benefits of these SCIP panels to be made available at the speed of pre-manufactured modular housing.

The press apparatus would allow for several panels of a twelve feet×eight feet size to be fabricated and several of these panels could then be pre-assembled into larger sections, this would be done with joints. The truss orientation would be the desired transversal direction, and the jointing, done in the plant, decreases costs over the time and materials to performing the jointing in the field.

In use, the panels 90, 120, 150, 180 of the present invention may be combined with a new approach to the design, fabrication and erection of panels that form structures. All conventional structural panels produced to date have been produced and then tested to determine structural performance. The results of this testing has been verified via third party observation and the results are published. The most common of these procedures is known in the industry as ICBO testing and Engineering Reports. While this procedure is valuable for what it does, it presents significant problems for the wide distribution and use of the panels. The testing performed and the published results are for a particular configuration of the panels. This has not been a significant issue for prior art panels, because the apparatus' employed to manufacture the panels were quite inflexible in their function; to make a thicker panel or a panel with a different truss spacing or face wire configuration would typically require a new apparatus built, designed for the specific new configuration of panel.

The panel fabrication apparatus of the present invention are very different from those of the prior art. These apparatus' can produce panels in a wide variety of thicknesses, typically two inches thick to twelve inches or more. Furthermore, these apparatus' allow for the weight (gauge) of the truss to be varied, the spacing of the truss to be varied, and the core material to vary in both composition and shape, and for the face mesh to vary in weight (gauge) and wire spacing. With just eighty-one variations of components, one thousand fifty-six different structural configurations of the panels can be produced. If a new apparatus was needed for each it is readily seen that this would be both costly and impractical. If separate testing of each configuration were needed, this too would be cost and practicality prohibitive.

Hence, a new approach to engineering is needed where an engineer determines the loads to be resisted and then applies a set of engineering principles to design a structure to resist the loads in question.

While conventional engineering addresses most of the engineering issues arising in the use of the panels they are typically not addresses as a whole. For example, engineering typically addresses thick members (three inches or greater) and addresses them as "beams", or horizontal members, and "columns", or vertical members. While the panels are used as both horizontal and vertical members, the panels are not thick by conventional definition since the cementitious skins of the present invention are routinely one inch to three inches thick. Conventional engineering addresses this as "thin shell" cementitious or concrete structures, but does not typically recognize them used as flat horizontal structures, typically only as arched shapes, and does not recognize them as vertical structures.

Conventional engineering addresses composite structures made of a combination of steel and concrete, the most common of which is a folded-plate steel sheet with concrete cast on top of it and used as a floor or roof structure. Conventional engineering also addresses trusses and wire trusses but does not address creating a composite structure made of two thin-shell concrete skins joined into a composite structure via a wire truss. Conventional engineering addresses the use of light-gauge wire reinforcing to create reinforced concrete structures, and typically refers to it as Ferro-cement construction. This type of construction is widely used in the world and is most commonly seen in constructing water reservoirs by using concrete reinforced with a light gauge wire mesh, "chicken wire". Conventional engineering also addresses the use of medium-gauge wire mesh with shotcrete, or air-placed concrete. However, conventional engineering does not address the use of light gauge wire mesh with shotcrete to construct reinforced concrete structures. Lastly, conventional engineering addresses sandwich panels, a panel with two structural skins and, typically, an insulating core. These are typically panels made by bonding the skins to the core with some type of adhesive.

In order to produce such a breadth of panel configurations, and because of the cost prohibitive nature of testing every permutation, an engineering approach of the present invention melds conventional engineering theories, principles and practices addressing reinforced concrete, thin-shell concrete, Ferro-cement, wire mesh reinforced shotcrete, wire trusses, composite structures, and sandwich panels in order to derive new theories, principles and practices that are applied to the panels of the present invention.

Figure 21:
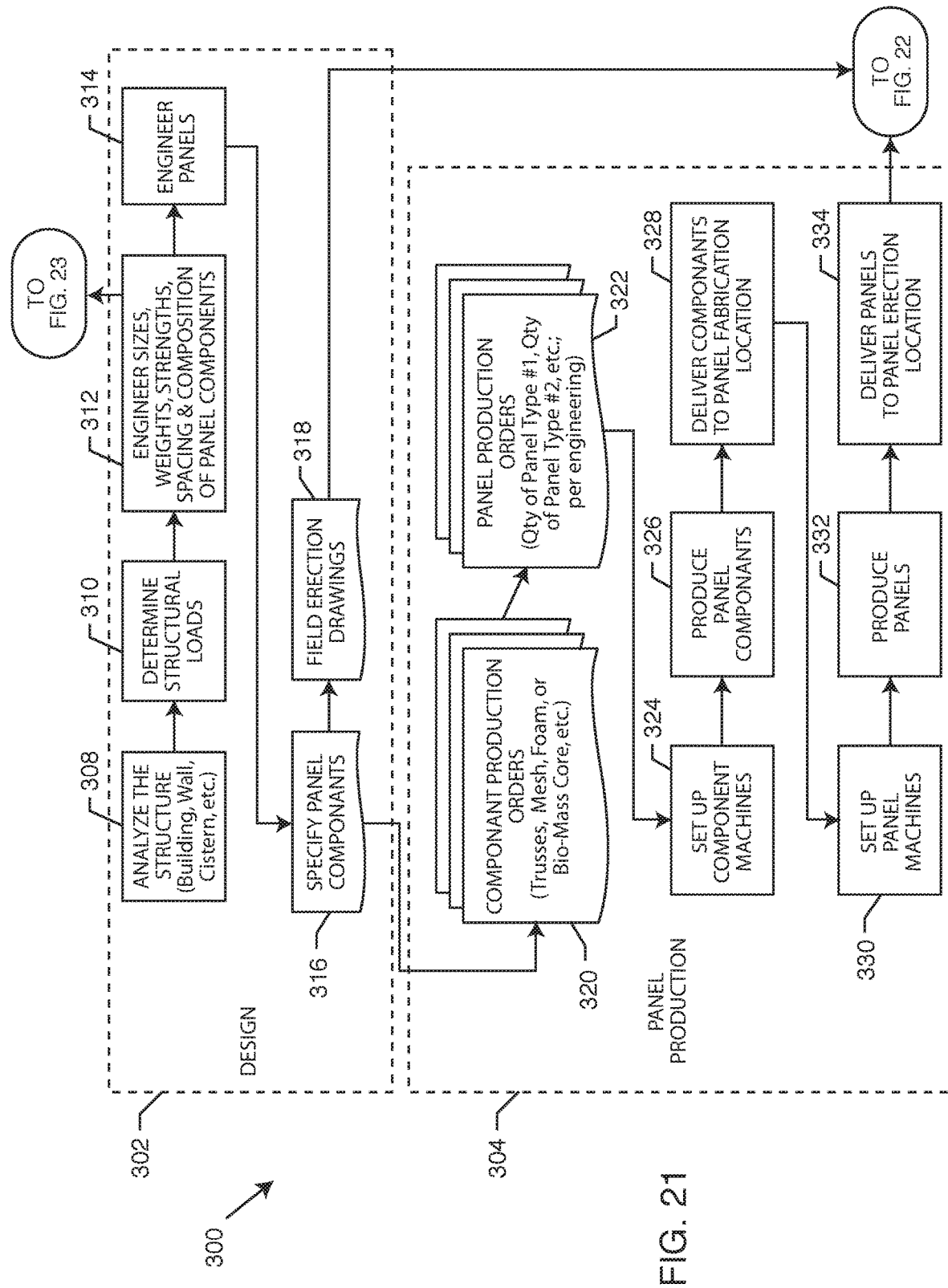
FIGS. 21-23 are flow charts of a process of designing, fabricating and erecting a structural panel.
Figure 22:
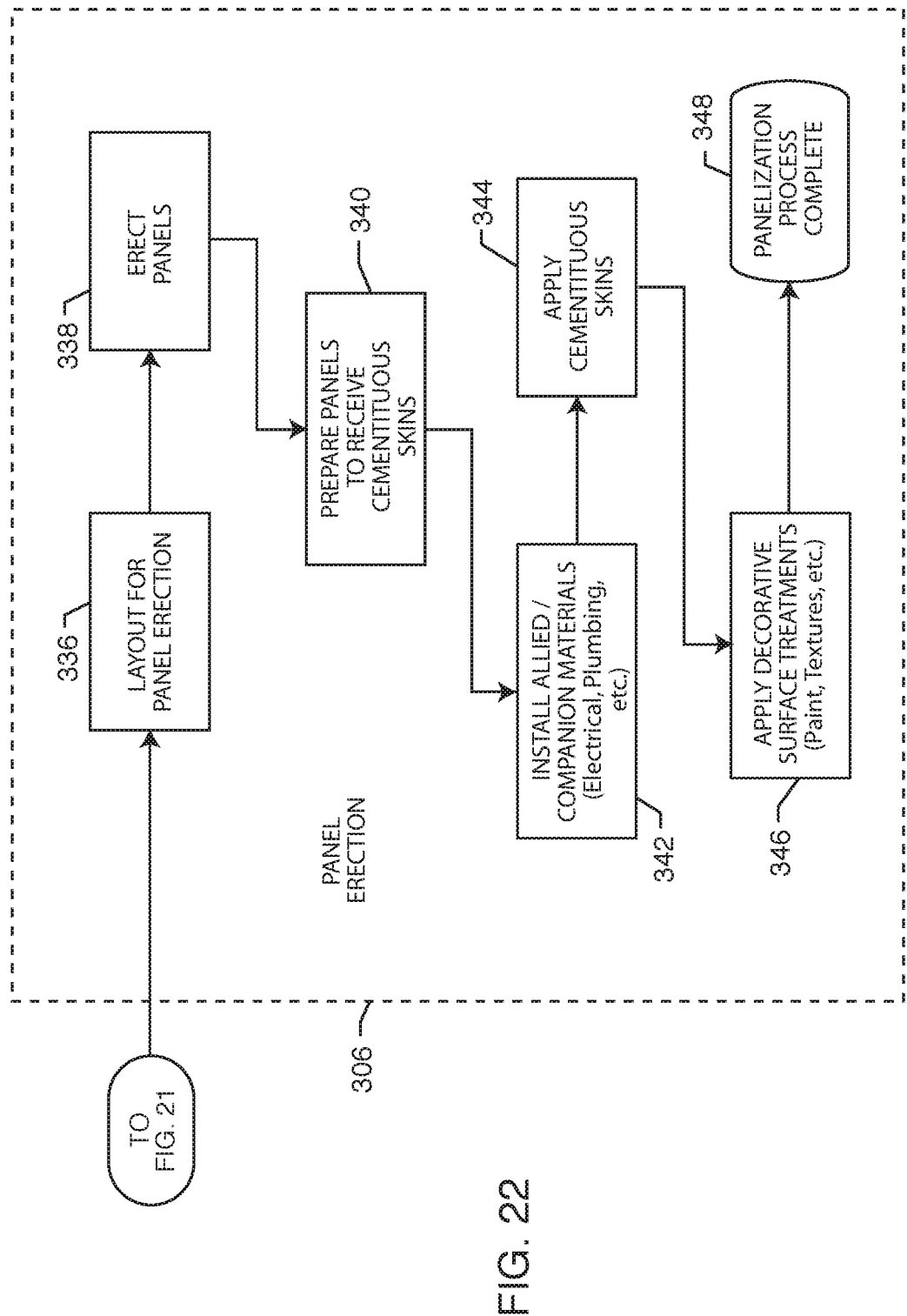
Figure 23:
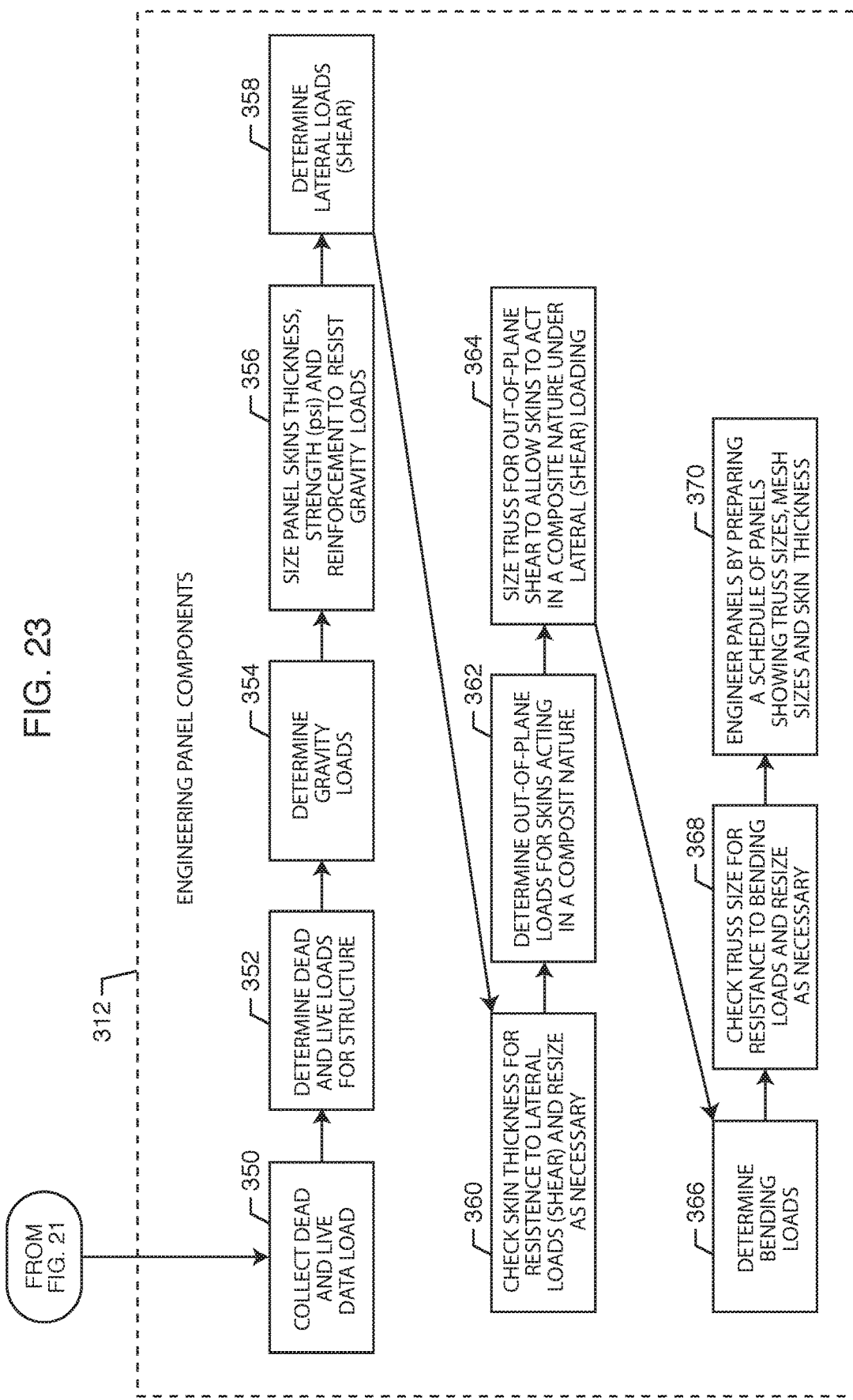

FIGS. 21-23 are flow charts of a structural panel process 300. The process is usually broken down into three portions: design 302, production 304, and erection 306. The first part of the design portion is analyzing the structure to be built (e.g., building, wall, cistern, etc.) 308. The next part is determining 310 the expected structural loads that will be placed upon the structure using standard engineering methods, practices and theories. Once the structural loads are determined, the sizes, weights, strengths, spacing and composition of various panel components can be determined 312 and a panel incorporating those components can be designed to resist the expected structural loads 314. The design can be accomplished through traditional hand calculation and/or employing computer assisted methods. The specification of the components 316 allows engineering (i.e., field erection) drawings to be created 318 and the production portion 304 of the process 300 to start.

The start of the production portion 304 involves ordering the components (e.g., trusses, mesh, foam or bio-mass core, etc.) 320 and the number of panels 322 that need to be produced to build the structure. For example, a particular truss may be selected from a group of trusses more or less equally suitable for the intended design but with wide variations in the gauges of wires employed and/or the depth, or dimensions, of the fabricated truss. The wire trusses generally have two substantially parallel rods interconnected by a wire bent in a zigzag configuration, as described above, but the wire may be configured (i.e., the dimensions and gauges of the truss wires varied) as needed by the structural load requirements of the panel. In another example, the spacing and gauge of the mesh wire, as well as the number of layers of mesh on one or both faces of the panel, can be varied as needed by the expected structural load.

In an additional example, the fillers 94, 124, 154 may be comprised of foamed plastic, biomass or other suitable material, such as foamed glass, lightweight concrete, foamed concrete, and other composite materials. The fillers 94, 124, 154 can be solid or have hollows or voids such as to facilitate passing electrical conductors, pipes, etc., through the core of the panel. Additionally, the fillers 94, 124, 154 may be routed, melted, or otherwise shaped to form voids that facilitate passing electrical conductors, pipes, etc., through the core of the panel. The fillers 94, 125, 154 can be shaped to accommodate the structural load requirements (e.g., angling the corners of the fillers; thereby increasing the depth of the cementitious skin 106, 132, 162, 184 at the immediate area surrounding the trusses where the fillers are adjacent so as to provide additional functionality such as additional resistance to loads placed upon the panels).

In addition to variation in the size and shape of fillers 94, 125, 154, the fillers 94, 125, 154 can be positioned within the panel core 92, 122, 152, 182 (centered, off-center with respect to the center of the panel core) as needed by the structural loads placed upon the panel 90, 120, 150, 180.

The components may be commercially available or specially ordered which requires machines to manufacture the components be set up 324, the components produced 326, and then delivered to the panel fabrication location 328. Once the components are at the panel fabrication location, the panel fabrication machines are set up 330 and the panels produced 332.

In one example, panels 90, 120, 150, 180 can be produced in a three-stage process. Hand-pushed carts 190 can be used as the common vehicle through all three stages and assembly tools can be pneumatic or manual upholstery clips "C" ring guns used to attach upholstery clips to the metal components of the panels 90, 120, 150, 180.

The cart 190 is sufficiently adjustable to accommodate the dimensions of the wide variation of components utilized in the fabrication of the panels. The ability of the various portions of the cart 190 to be modified/adjusted to allows the same cart 190 to produce differently engineered panels, thereby avoiding the cost of producing a new machine or remodeling an existing machine for each design of panel.

For example, the panels 90, 120, 150, 180 are assembled from pre-manufactured components of:

1) Filler members 94, 124, 154 including, without limitation, EPS foam blocks cut the size required for the panels 90, 120, 150, 180 or bio-mass tubes of the size required. Typically the foam blocks are six inches wide to accommodate the truss spacing at six inches on center which is the typical configuration;
2) Welded-wire warren trusses 70, 78 of the depth required. The typical configuration is three inches for interior, non-loaded bearing walls and five inches for exterior, load bearing walls and for short-span floors and roofs. Longer spans and heavier loads are accommodated with deeper trusses 1;
3) Welded wire face mesh 104 in the required wire gauge and spacing. The typical configuration is two inches by two inches, twelve gauge mesh for wall panels and one inch by one inch, sixteen gauge mesh for floor and roof panels. The tighter spacing on floors and roofs helps in holding the concrete skin during application in the field.

During the first stage, the panel components are stacked in the carts 190, ready for pressing in the second stage. As stated above, the carts 190 are typically ten feet long but can be linked together to create a twenty foot cart for pressing longer panels 90, 120, 150, 180. Any number of carts 190 may be employed which allows for staging of the panel stacks for faster throughput.

The carts 190 have adjustable side arms 192 which allow for various widths of panels 90, 120, 150, 180 to be manufactured and the registration changed to allow for the cores 92, 122, 152, 182 to be centered or eccentric (e.g., off-centered), as required.

During the second stage, the carts 190 are placed in the press where either manual force 200 or pneumatic or hydraulic pressure 230 devices are employed to compress the stacks in the carts 190 so as to bring the stack into final height dimension. The result is the core material 94, 124, 154 being compressed and the trusses 70, 78 being pressed into the core material 94, 124, 154. While in the press 200, 230, the top plate of the cart 190 is locked into place at the correct final dimension. Once the top plate is locked in place, the cart 190 may be removed from the press 200, 230 and moved to the third stage.

The press 200, 230 is made up of two ten foot long presses, arranged side by side. This allows for each press 200, 230 to be operated independently in pressing panels 90, 120, 150, 180 up to ten feet in length, as well as being operated in concert to press panels 90, 120, 150, 180 over ten feet in length.

During the third stage, the welded-wire face mesh 104 is applied and affixed with "C" rings 116. One or more layers of mesh 104 are overlaid on the opposing faces of the panel 90, 120, 150, 180 and attached to the trusses 70, 78, to hold the panel core together after the pressure placed on the panel 90, 120, 150, 180 by the press 200, 230 is released.

When the carts 190 arrive at the third stage, the side arms 192 are removed allowing free access to the truss cords. The mesh 104 is placed against the truss cords and affixed to them with the "C" rings 116. Once the "C" rings have been installed, the top plate can be released and the panel 90, 120, 150, 180 removed from the cart 190. The pressure of the core material pressing against the trusses 70, 78 and the face mesh 104 affixed to the truss cords results in a taut and easily handled panel 90, 120, 150, 180.

The empty cart 190 with its side arms 192 and top plate are returned to the first stage to repeat the cycle. The same cart 190 can be used to produce panels of various designs, specifications and components. To this end, the physical structure of the cart 190 itself is adjusted to accommodate a panel design different from the previous panel design; allowing changes in panel design to occur as part of normal operation of the cart and not requiring the cart to be remodeled or the fabrication of a new cart to accommodate the new panel design.

This cart 190 would be suitable for fabrication of panels in both fixed locations, as on a factory floor, as well as on a transportable surface, such as a trailer bed. Such a cart 190 could be readily installed on-site for temporary, project-specific, fabrication of panels.

Once the desired number of panels are produced, the panels are delivered to the panel erection location 334 where the third portion (i.e., the panel erection portion) 306 of the process 300 occurs.

During the panel erection portion 306, the panels are laid out 336 and erected 338 in the designed configuration. Once in position, the panels are prepared to receive a cementitious skin or coating 340. A variety of methods are used in the application of the cementitious skins 106, 132, 162, 184 including, without limitation, 3D printed, air-placed, cast-in-place, pre-cast, tilt-up, and hand applied techniques. The cementitious coating 106, 132, 162, 184 can vary in thickness and strength and composition as needed by the structural load requirements.

Allied or companion materials (e.g., electrical wiring/cabling, plumbing, etc.) are then installed 342 in the panels and the cementitious skin is applied 344 to the panels 90, 120, 150, 180. Once the cementitious skin is applied, the cementitious skins are finished with decorative surface treatments (e.g., paint, textures, etc.) 346 that are applied to the panels 90, 120, 150, 180 using a variety of processes and methods including, without limitation, form-finished, as-placed, trowel-finished, textured, painted, and all other generally available techniques for finishing concrete, decorative concrete and plaster.

The process is completed 348 when the structure (e.g., wall, building, etc.) is complete.

As outlined above, once the structural loads are determined, the sizes, weights, strengths, spacing and composition of various panel components can be engineered 312. As seen in FIG. 23, an engineering process 312 is employed which allows an engineer to analyze the loads on a structure and design a reinforced concrete structure to resist those loads that uses an insulated reinforcing cage. This allows the engineer greater flexibility in the design process that allows the engineer to affordably add concrete thickness and do so in unequal proportions (e.g. the top skin of a floor panels can be designed with a thicker skin to resist the compressive load on the floor while the underside skin can be much thinner) to provide protective cover for the mesh and truss steel on the underside, and allow the truss and mesh steel to handle the tensile loads. The engineer is also able to take into account the insulation properties of the panels without having to go through a separate design procedure and likely a separate building element to accomplish the insulation needs of the structure.

In the area of reinforced concrete engineering, conventional reinforced concrete is distinguished from concrete shells by two principal characteristics: a) the thickness of the concrete member, and b) the thickness, or diameter, of the reinforcing steel.

Conventional reinforced concrete is not thinner than three inches thick, ranging in thickness from three inches to members that are several feet thick. The typical minimum reinforcing steel diameter is one half inch, (known as #4 in the industry referring to the number of one eighths of an inch in diameter) and increasing in thickness up to two and one quarter inch diameter (#18).

In contrast, shells are thin members, starting at a minimum of one inch thick and ranging up to a few, say three to six, inches thick. Similarly, the reinforcing steel is typically quite thin, beginning with light gauge (e.g., 22 gauge) welded or woven wire meshes, ranging up to heavy gauge (e.g., 6 gauge) welded wire mesh and light rods (#2 and #3).

Conventional reinforced concrete members are commonly seen in construction, in the form of walls, floors, columns and beams. Shells are far less common in construction. The most common use of shells in construction is in large-span domes, such as sports arenas and stadiums and smaller span domes, such as salt storage domes. Shells are typically curved or folded. Even the definition in the Standard of the art, defines shells as "Three-dimensional spatial structures made up of one or more curved or folded plates whose thicknesses are small compared to their other dimensions. Thin shells are characterized by their three-dimensional load-carrying behavior, which is determined by their form, by the manner in which they are supported, and by the nature of the applied load". The idea of a flat plane, self-supporting, structure is novel. The present invention utilizes trusses to join two shells thereby allowing the two shells to act as a composite and thereby permit the structure to be a simple flat plan.

Shells are typically a single wythe, or layer, of concrete. This is the natural result of the nature of the shells behavior and the method of constructing it. In constructing a shell structure the formwork is erected, the reinforcing steel in laid out per the engineering of the structure, the concrete is poured, and when it is dried and has reached its' minimum required strength, the formwork is removed, leaving the completed shell structure in place. The completed shell is a complete, functioning structure. It does not need beams and columns to support it. It would be a complete waste of time and money to build another shell on top of the first one. It is a complete structure, by itself.

In the present invention, engineering and fabrication processes and technologies have been developed for constructing two shells that act together as one unit, a composite of two shells. This is of tremendous importance for concrete construction because of the engineering and physics of conventionally cast concrete. The forces or loads imposed on a concrete member, either beam or column, end up moving to the outer edges of the member, with little or no load in the center of the member. In traditional engineering terms this center is known as a "quiet zone" of the member, an area where there is little or no load or force. This is the reason that in conventional reinforced concrete the reinforcing steel is placed toward the edges of the members and there is no reinforcing in the center of the member. In contrast, it is of value to observe that in shells the reinforcing is in the center of the member.

Although the forces and, as a result, the reinforcing steel, is in the edges or perimeter of the conventional concrete member, the center is still filled with solid, although un-reinforced, concrete. This is because of two reasons: a) the nature of the process of constructing the concrete member, and b) the need to transfer the forces from one side of the member to the other. Conventional concrete structures are constructed by erecting a formwork, placing the reinforcing steel and filling the formwork with plastic concrete. This results in the center of the member being filled with concrete. This results in a significant problem; the concrete in the center of the member is very heavy and adds "dead weight" to the member.

If a user were to place the rebar and pour a layer of concrete, then, place a void-causing structure (e.g., a layer of plastic foam) on the first layer of concrete, followed by filling the balance of the formwork with concrete, while the dead weight would be eliminated, a second problem would be created. The upper layer of concrete would be isolated from the lower layer of concrete and the forces on the member must move through the center of the member to the outer edges where they collect. While the center is quiet as far as the collection of forces is concerned, the outer layers must be somehow connected in order to "share" their loads. Otherwise, there are two structures, not one.

The present invention solves both of these problems in that it creates the dead-weight-mitigating void in the center of the member and also allows the two resulting layers, or shells, to act as one, or as a composite, via the trusses that pass through the core, joining the two skins into a composite shell structure.

However, to design such a structure a process for engineering the trusses and the shells, both the shell reinforcing as well as the shell concrete, is needed. Such a process is described below in both a word description as well as the language of mathematics to describe the process. This process is essential for practical use of the process and methodology of constructing composite shell structures. For without the engineering process to permit design of a composite shell structure the ability to construct a composite shell structure is very limited, in its practicability. Without being able to analyze the loads on a structure and then design and engineer a composite shell structure to resist such loads, no one would have the confidence to employ composite shell structures, except in only the lightest of load conditions, where experienced judgment could readily and intuitively determine that the composite shell structure could obviously resist the light loads anticipated.

With reference to FIG. 23, the engineering process 312 begins by going through a normal, conventional, process of analyzing the loads on the structure and collecting both dead data loads and live data loads 350; a process well-known and daily-practiced in the art. From there we can commence designing the composite shell structure (CSS) to resist these loads after determining the lead and love loads for the structure 352.

The first step is to determine the Gravity Loading of the structure 354 and design the composite shell structure (CSS) to resist these loads 356 in terms of several factors such as cementitious skin thickness, strength and reinforcement to resist gravity loads. Thinking of the vertical load imposed on a vertical wall can readily imagine this loading; the force of gravity pulling down on whatever is bearing on the wall, plus the weight of the wall, itself. This is a conventional process with three exceptions: a) the load is shared in two skins, rather than one thick member, b) broad and narrow buckling must be address, and c) eccentric loading on the shells must be examined.

Figure 24:
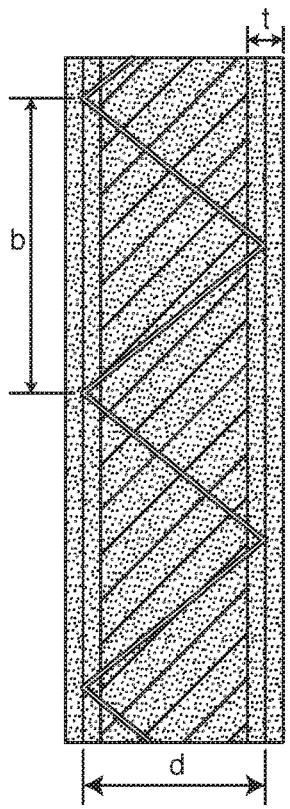
FIG. 24 illustrates a cross-section of a panel embodying a composite shell structure of the present invention that shows the physical dimensions used in calculations such as thickness of the shell, pitch of the truss, and depth of the truss.
Figure 25:
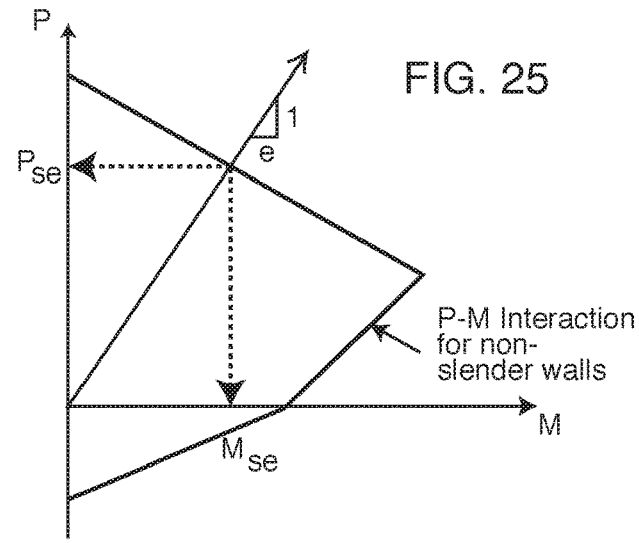
FIG. 25 is a Force-Moment (P-M) curve.
Figure 26:
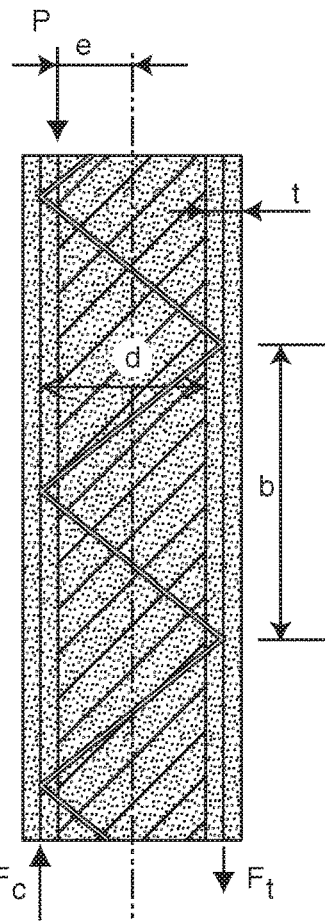
FIGS. 26 and 27 illustrate cross-sections of a non-slender wall panel of the present invention with the tensile and compressive forces shown acting on the panels.
Figure 27:
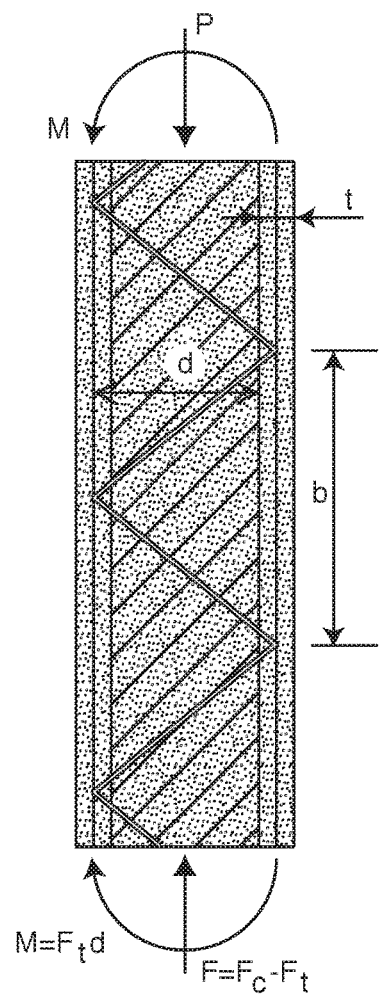

To engage in a discussion on engineering of CSS it is well to define some terms. FIG. 24 shows a CSS with mathematical designations for some of the aspects being used: "t" for the thickness of the shell, "b" for the pitch of the truss, and "d" for the depth of the truss. FIG. 25 illustrates a P-M (Force-Moment) interaction curve and conventional engineering language symbols applied to a CSS.

Two shells are designed are first using existing, well-known, and daily-practiced engineering processes. The only change is to divide the load by half since two members (i.e., the two shells) will share the load. Each shell will carry half of the load. This differs from the conventional single member, for this example, a solid concrete wall.

Figure 28:
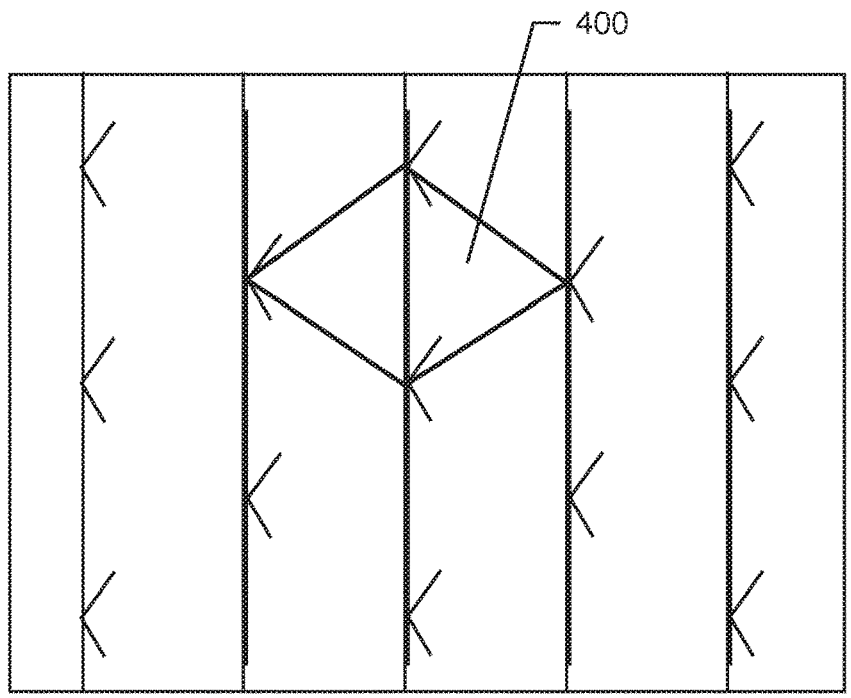
FIGS. 28 and 29 are, respectively, side elevation and cross-sectional elevation views of a panel embodying the present invention showing broad and narrow buckling of the shell.
Figure 29:
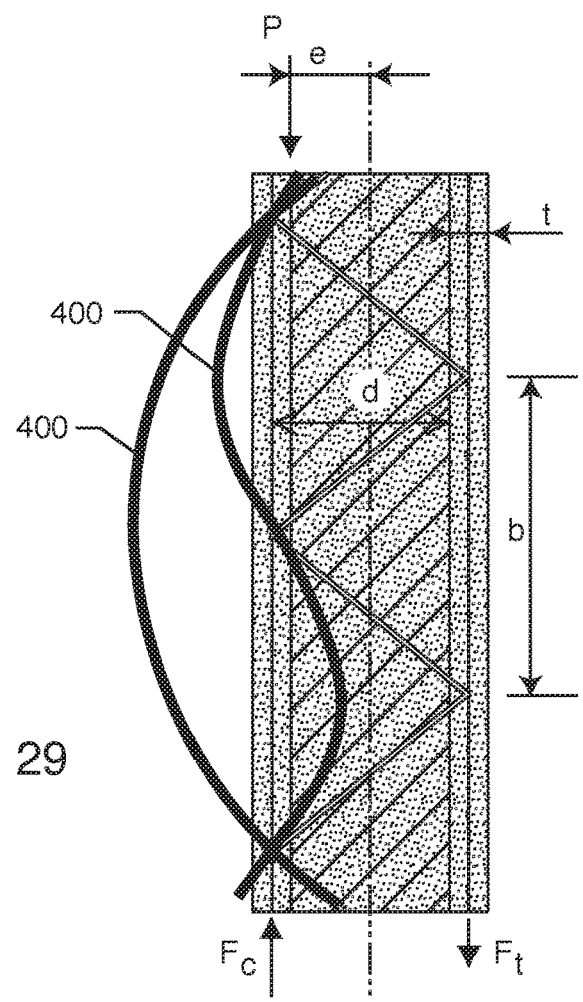

Next, broad and narrow local buckling are examined and the CSS is engineered to resist this local buckling force by designing the correct use of trusses. This occurs in the present invention because the shell is unsupported by the trusses in the zone 400 of FIG. 28 and could buckle either broadly 402 or narrowly 404 in this area. The present invention allows for the designer to examine trusses of differing depths, a variety of gauges, and a breadth of on-center spacing.

The following mathematical formula have been developed, written in conventional and known Engineering Mathematics Language to describe the process of the engineering of this local bucking effect in CSS.

$$k_s = \frac{1}{\frac{2}{k_d} + \frac{s^3}{Ebt^3}}$$

Lastly, eccentric loading of the skins is examined and the two shells engineered to resist an eccentric load if it exists. If the CSS is eccentrically loaded one skin will experience a tensile force (Ft), while the other will experience a compressive force (Fc).

$$F_t = \rho t f_y$$

$$F_c = \min\left(\frac{\pi^2 E t^3}{12 b^2} + \frac{k_s b}{\pi^2}, (1-\rho)(0.85 f_c' t) + \rho t f_y\right)$$

The following mathematical formulae have been developed, written in conventional and known Engineering Mathematics Language to describe the process of the engineering of these two forces in CSS.

Figure 30:
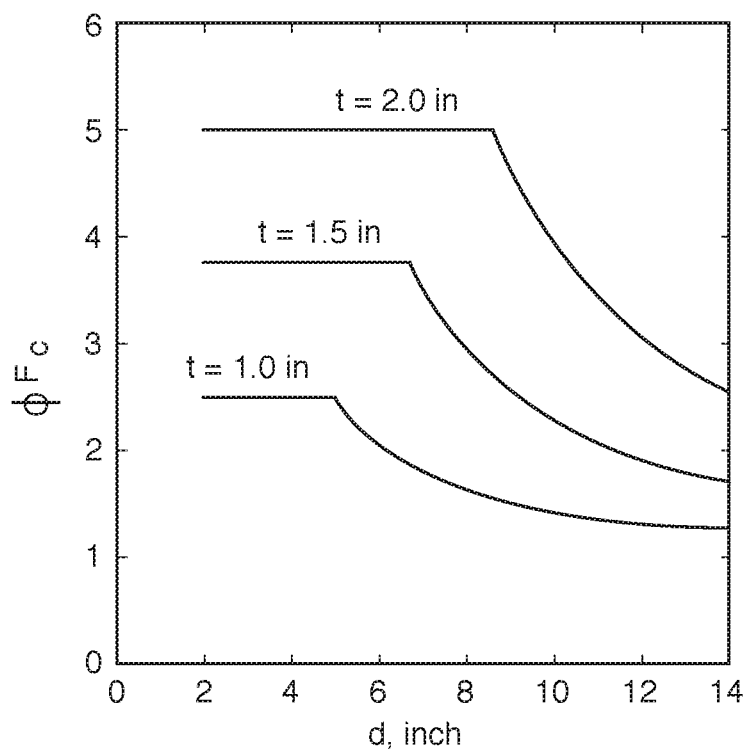
FIGS. 30 and 31 are graphs illustrating the results of applications of various formulae and the effect of variations in depth and gauge of trusses and thicknesses of the shells in terms of buckling capacity.
Figure 31:
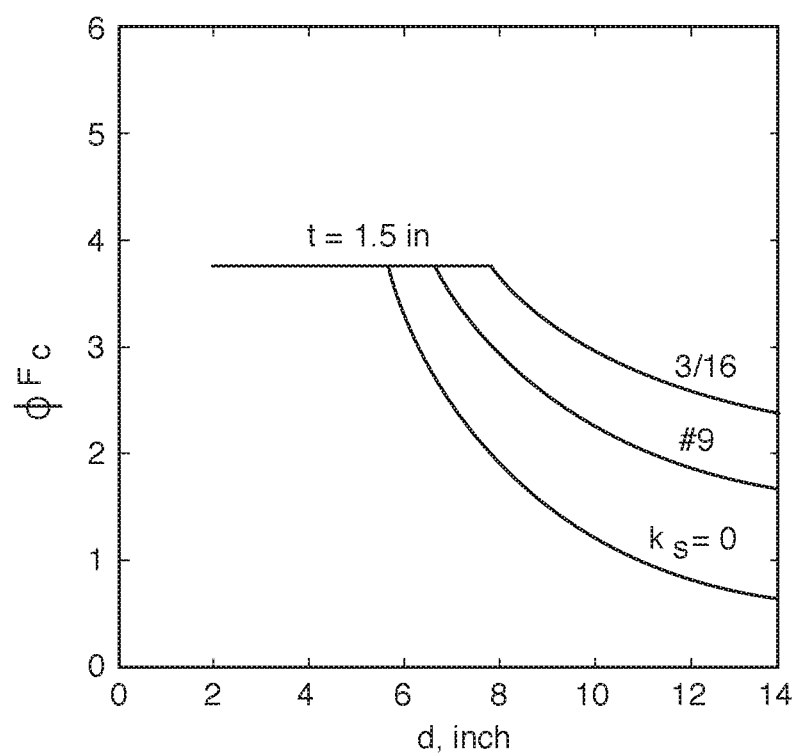

The graphs depicted in FIGS. 30 and 31 show the results of the application of the formulae and the effect of variations in depth and gauge of trusses and thickness of the shells in terms of shell buckling capacity.

The P-M (Force/Moment) interaction curve is a known and commonly used tool in design of concrete structures. It allows a designer to quickly determine if the design is safe by plotting design results and seeing if the results fall within the bounds of the P-M curve. By applying the above formulae, a PM interaction curve for gravity loading of a non-slender walled CSS is derived, as shown in FIGS. 32 and 33.

As seen in FIGS. 34 and 35, in slender walls (i.e., walls that are tall), there is an issue of global buckling, known as Euler buckling. This is the standard buckling issue faced in conventional design of slender concrete columns and walls, contrasted with the previously treated local buckling which is unique to CSS. This global buckling effect is shown diagrammatically in FIG. 35 and illustrated in a P-M interaction curve for this effect, as seen in FIG. 34.

The following mathematical formulae have been developed, written in conventional and known Engineering Mathematics Language to describe the process of the engineering of this global buckling effect and allowing a designer to test his proposed solution against the P-M interaction curve.

$$P_{crg} = \frac{\pi EI_{eff}}{h^2}$$

$$M_c = \delta_{ns} P_u \cdot e$$

$$\delta_{ns} = \frac{1}{1 - \varphi \frac{P_u}{P_{crg}}} > 1.0$$

Lateral loads (shear) are determined 358. Skin thickness is checked for resistance to the lateral loads (shear) and the skins are resized as necessary 360.

Out-of-Plane loads are determined for skins acting in a composite nature 362. Out-of-Plane Force is the force perpendicular to the face of the CSS or out of the plane of the CSS. An easily identified example is a floor, where the plane of the floor is horizontal yet as someone walks on the floor, that person imposes a vertical load on the floor, or a load in a direction out of the horizontal plane of the floor. Similar examples are roofs, retaining walls with soils pressing against them and walls with winds pressing on them. Each of these structures in these examples is receiving loads in a direction out of the plane, or perpendicular to the plane, of the structure. The trusses principally resist this loading.

All prior art of panels were extremely limited in their capacity to address this loading. All prior art panels have only been able to use a single truss, with few variations, to address this loading. The current invention allows for the use of single or multiple trusses, immediately contiguous to each other, as well as trusses of different structural configurations. All prior art has employed trusses more or less in the configuration of a "warren truss" design (e.g., truss 70 of FIG. 1). However, it is of great value to a designer to be able to employ a variety of truss designs to meet the loading on the CSS. A commonly available and known form of truss is the "ladder truss" (e.g., truss 78 of FIG. 2). This form of truss has some advantages, the foremost being that because the web member (stud) is perpendicular to the cords members and is relatively short, it can better handle certain out-of-place loads. Conversely, it very poorly handles the loads discussed above. No prior art has been able to use the two truss designs to compliment each other. This is a significant improvement in the current invention. Therefore, it is important to size the truss for out-of-plane shear to allow skins to act in a composite nature under lateral (shear) loading 364.

FIGS. 36-39 illustrate possible combinations of truss designs, based on warren and ladder trusses (e.g., trusses 70, 78). While other truss designs could also be well employed, these are the currently most widely available and common. With the present invention, the designer can now examine the use of single trusses or the use of a combination of trusses, and a variety of configurations, to resist the expected loads.

The out-of-plane force can produce a shear failure in the member. The following mathematical formulae have been developed, written in conventional and known Engineering Mathematics Language to describe the process of engineering of this shear effect and allowing a designer determine which possible combination of truss designs best suits the purpose. Common to all of these combinations is: (Vn) Nominal Shear, (Vc) Shear of the Concrete, (Vs) Shear of the Steel, (Db) Diameter of the web or stud of the truss, (l) length of the truss combination, and (s) on-center spacing of the truss combination. Where the ladder truss is used, (Ps) is the force on the stud, "the rungs" on the ladder truss.

For the truss 70 of FIG. 36, a simple warren truss, the following mathematical formulae have been developed, written in conventional and known Engineering Mathematics Language to describe the process of the engineering of this shear effect in CSS.

$$V_n = V_c + V_s$$

$$V_c = 0$$

$$V_s = \frac{\pi^3 dl E_s D_b^4}{4s(b^2 + 4d^2)^{\frac{3}{2}}}$$

For the truss combination of FIGS. 37 and 38, a warren truss (FIG. 1) in conjunction with a ladder truss (FIG. 2), the following mathematical formulae have been developed, written in conventional and known Engineering Mathematics Language to describe the process of the engineering of this shear effect in CSS. For the truss of FIG. 37, included in the formulae is a check for buckling in either web since there are two trusses of different configurations. In the formula for (Pstud), the second component of the formula checks for early failure of the shell. The designer needs to ensure that the shell will not fail before the truss does or the truss will not have filled its role in the CSS.

$$V_n = V_c + V_s$$

$$V_c = 0$$

$$V_s = \frac{l}{s} \min\left(P_{stud}, \frac{\pi D_b^2}{4} f_y \sin\alpha\right)$$

$$P_{stud} = \min\left(\frac{\pi^3 E_s D_s^4}{16(b^2 + 4d^2)}, tb\sqrt{f_c'}, \frac{bt^2}{2s}\sqrt{f_c'}\right)$$

For the truss combination of FIG. 39, two warren trusses (FIG. 1), with the apices of their webs opposite each other, in conjunction with a ladder truss (FIG. 2), the following mathematical formulae have been developed, written in conventional and known Engineering Mathematics Language to describe the process of the engineering of this shear effect in CSS.

Next, the design and engineering process for Deflection (i.e., bending loads) are addressed. Bending loads must be determined 366 and so shear deflection, flexural deflection and total deflection (the sum of the first two) need to be examined. The building code imposes limits on deflection that a designer must conform to. The designer must also consider the use of the structure and determine if the designed-for deflection is acceptable. Unlike conventional reinforced concrete design processes, where only flexural deflection is considered, the design process for CSS includes in the design process and examination of shear deflection. Because of the nature of CSS both flexural deflection and shear deflection must be considered to determine which controls. The following mathematical formulae have been developed, written in conventional and known Engineering Mathematics Language to describe the process of the engineering of these deflections effects in CSS.

$$\Delta_{Shear} = 2\left[\left[\sum_{k=1}^{N_{half\_span}}\left[\frac{0.5f_{diag_k}\left(\frac{D^2+b_L^2}{D}\right)}{E_sA_{diag}}\right]\right] + \left[\sum_{k=1}^{N_{half\_span}}\left[\frac{0.5f_{stud_k}D}{E_sA_{stud}}\right]\right]\right]$$

$$\Delta_{Flexure} = \frac{5}{384}\frac{\frac{p_u}{b_L}L_t^4}{EI_{eff}}$$

Truss size is checked for resistance to the bending loads and the truss is resized as necessary 368.

An examination of In-Plane Loading must be included in the design process. Currently, In-Plane Loading is done employing conventional design and engineering processes. The only change is to divide the load by the number 2 since two members, the two shells, will share it. Each shell will carry half of the load. This differs from the conventional single member, for example, a solid concrete wall. The diagrams in FIGS. 40 and 41 describe this conventionally performed analysis. FIG. 40 illustrates squat walls (shear controlled) where H/L>3.0. FIG. 41 illustrates tall walls (flexure controlled) where H/L<1.5 (may need boundary elements). The following mathematical formulae have been developed, written in conventional and known Engineering Mathematics Language to describe the process of the engineering of these loadings to allow for the unique arrangement of the components in a CSS. For this process, Vn is the nominal shear strength, Vs is the steel contribution and Vc is the concrete contribution (in two formulas below), depending on shear or flexure being the controlling element.

$$V_c = 2\sqrt{f_c'}\,bd \qquad V_s = \frac{A_v f_y d}{s}$$

$$V_n = V_c + V_s \qquad V_c = 2\left(1 + \frac{N_u}{2000A_g}\right)\sqrt{f_c'}\,bd$$

Panels can now be engineered by preparing a schedule of panels showing truss sizes, mesh sizes, and skin thicknesses 370.

Based on the foregoing, the present invention provides a significant improvement in the panel erection process that allows panels to be assembled in such a manner that panels of up to twelve feet by forty eight feet, or the maximum size transportable over the highways can be transported out to the construction site and entire structures (e.g., buildings, walls, etc.) erected in single pieces. This is accomplished either by making the panels in a single piece through the use of multiple presses at once, or by making several panels and then connecting them together, in the plant. The result is a significant reduction in field erection labor and time.

With the use of high fly ash content mix and small dry-mix shotcrete equipment, plastering skills are employed that eliminate the scratch coat process in applying the cementitious skins and apply full thickness skins in a single pass. For example, in a two pass process, a one half inch thick "scratch" coat is applied with a three day wait for the coat to dry. A second one half inch "brown" coat is applied with another wait of seven days for the second coat to dry. This dried "brown" coat can then receive the finish coat. The two pass process can be reduced to the single pass process.

With the use of dry-mix gunnite in smaller equipment, called "refractory guns", which were originally designed to be used in the highly confined space of a boiler or smoke stack interior, decorative concrete techniques are able to be used that were previously unavailable. The use of this type of equipment on panels allows for the combination of plastering and decorative concrete finishing techniques to be applied to the panels. This same result can be accomplished by employing smaller wet-mix equipment.

The new engineering processes and applied theories allows for columns and beams to be built into the panels by replacing the core material in the process described above with reinforcing bars in the void created. The shotcrete process then creates shot-in-place columns and beams that can work integrally with the structural behavior of the panels. This is a significant improvement of employing the panels as only in-fill panels where a post-and-beam system of construction is employed.

From the above-described engineering process and combined practices, theories, along with the manuals and tables, described, flows the ability to generate software which will allow for the application of these engineering advances to projects with the benefits of computer support and assistance. Software takes the manual methods and written supporting documents and provides a tool to rapidly apply this innovative engineering material to projects through the use of computers.

The use of computers in architectural design is very common, even the standard in the industry. However, there are no standard or recognized symbols that represent SCIPs in general for use with neither the software, nor implementations of SCIPs of the present invention in particular. While architectural software is common, the details used are often generated by manufacturers for use with such software to facilitate the representation of the manufacturers product in drawings produced with architectural software. A set of details, in a digital format, have been developed that are compatible with the most common architectural software products, and address the use of SCIPs in general, and SCIPs of the present invention, in particular.

Conventional SCIP panels have a solid core material. This creates a problem for embedding electrical conduits and conductors and mechanical/plumbing pipes in the panels. The most common methods for overcoming this is creating separate utility chases, surface mounting or furring over utilities, or melting the core (typically plastic) with a torch or chemicals (acetone, for example). Each of these solutions creates extra work steps and extra costs.

As outlined above, foam can be cut into curvilinear shapes to form voids 134. This provides inherent strength improvement in the outer edge of the curve, the surface closest to the face of the panel. This is important because the longer, relatively thin sections, results in a section of foam that is highly subject to breakage in handling, fabrication, erection, and in application of the concrete skins. Conversely, the curvilinear shape allows for enjoyment of a much shorter section of the thinnest foam, the inherent strength of a curve shape vs. flat shape, and still maintaining the advantages of a chase through which to pass utilities (wires and pipes) and the cost savings of having the voids be the result of offsetting, or staggering, the cut shape which is cut from a section of solid foam can be thinner than would otherwise have been used to fill the same core space.

One of the inherent weaknesses in the conventional concrete panel product is the relative long length of the truss web wires compared to their diameter. This results in the tendency for the web wires to buckle under load. Cutting the foam in shapes described above show a method of allowing the cementitious skin to further penetrate the panel core at the truss and thereby provide additional support to the truss web wire. This results in an effective shortening of the total length of the truss web wire length and thereby increasing the load supported before unacceptable buckling occurs.

A common problem with the conventional panels is the need to place structural concrete on a "blind" or inaccessible face of the panels. Examples are swimming pools, retaining walls, or walls constructed close to other structures. In each case, one side of the panel is so close to another structure or to the earth, that there is not enough space to work between the panel and the structure or earth to apply the concrete skin.

Two solutions that have been commonly used are 1) pre-casting or pre-applying the concrete on one side of the panels and then putting the panels in place and finally, finishing the remaining face, and 2) utilizing the earth or existing structure as a form and pouring a highly viscous concrete mix into the void between the panel core and the earth/existing structure. Both solutions have inherent problems. With the pre-casting solution, the weight of the panels and the sealing of joint on the blind face is a problem. With the viscous mix there is an issue of soil contamination as the mix is poured against soil and there is the problem of bonding to the existing structure when it is used as the form.

In accordance with an embodiment of the present invention, a fabric material is used to create a formwork. This solves all of the above problems of weight, joints, contamination and bonding. The fabric could be of any material, natural or man-made or recycled materials that would be strong enough to resist the liquid head pressure and the impact load of the poured concrete. The fabric would also need to be of a tight enough weave to retain the concrete while in its' fluid state.

With the use of a fabric form, as with any form, the form must allow for the concrete to flow across the face of the structure and fill the voids, leaving a solid surface and solid wythe of concrete and allow the concrete to fill in around and solidly against the reinforcement and leave sufficient coverage on the reinforcement to meet the specifications. To accomplish this, a spacer is used that will attach to the truss and mesh of the panels and to the fabric.

A continuous spacer could be stitching, a strip of fabric, plastic or metal, or other material that would hold the fabric form at a desired distance from the reinforcement members to provide the needed coverage and be strong enough to withstand the pressure of the falling concrete and the liquid pressure of the fresh concrete. The spacer needs to also have voids, holes, or interruptions that allow the concrete to flow through the spacer so that each spacer does not result in creating a cold joint.

Similar to the above continuous spacer, spot or button spacers need to meet all of the same spacing and strength requirements but by their very nature, being discontinuous pieces, inherently allow the concrete to flow past them.

Cast-in-place concrete structures are widely used and have some advantages over shotcrete structures. For example, in very repetitive work the reuse of the forms allows for significant savings of time and cost. The use of form liners also permits architectural finishes otherwise difficult or more expensive to obtain. Pre-casting concrete, whether cast on site such as in a tilt-up structure or cast in a plant and transported to the site and installed have cost and time saving opportunities associated with them as well.

Both cast-in-place and pre-cast concrete have three aspects of disadvantage where our panelized reinforcement can change these aspects to add to their other advantages: a) the placement of the reinforcing is slow and costly, b) the finished structure is un-insulated, and c) the completed structure carries more concrete volume and weight than is structurally necessary.

By employing panelized reinforcement of the present invention, the reinforcement is placed in large panels, rather than one piece at a time, thereby saving time and money. The core of panels of the present invention creates an insulation in the concrete structure and an isolated thermal flywheel, resulting in even better thermal performance. The core also allows for less concrete to be used at the center of the member, where the structural loads are lowest. This results in less weight and less concrete cost.

In order for the panelized reinforcement to be used, a method for holding the panel at the correct distance from the forms is needed so that the concrete can flow by and result in the required coverage over the reinforcement. Such a devise could be of any material that would resist the chemical nature of the concrete and have a small enough profile or edge at the face of the concrete that it does not detract from the appearance of the concrete. Plastic is commonly used as a reinforcement spacer and could readily be molded into a shape to work with a panelized reinforcement.

Spacers can be in the form of continuous strips that could be affixed to the panels and the panels with the spacers in place would then be place in the formwork. A typical sequence would be to set one side of the formwork, then set the panelized reinforcement in place, and, last, put the second face of the formwork in place. The spacers could also be in the form of strips that could be slid into place between the panelized reinforcement and the formwork. The formwork and both faces are erected. The panelized reinforcement is then placed between the two form faces. Lastly, the strip spacers are slid in place and hold the panelized reinforcement in proper alignment between the forms. The spacers may be attached to the panels and the entire assembly of panel with spacers slid into the forms.

Employing spacers that are not continuous does not allow them to be slid into place but does offers the advantage of having less interference with the flow of concrete as it is being cast and opportunities for locating the spacer to better accommodate the final finished surface. This could be especially valuable with a form liner finish as the spacers could be located in areas of the least visual impact.

Various tools and equipment may be used during the fabrication of structures 500 formed from panels of the present invention. The tools and equipment can include a mixture of hand-operated and automated. For example, metal ties 116, in the form of "C" rings, that are manually positioned may be replaced by a wire tying machines to substitute for "C" rings 116. The wire tying tool is used to take a spool of wire and quickly wrap the wire around reinforcing rods of the truss to hold the rods in place. This tool is used to reduce the mouth size to be used on the wire reinforcement instead of on the larger diameter rods.

Figure 42:
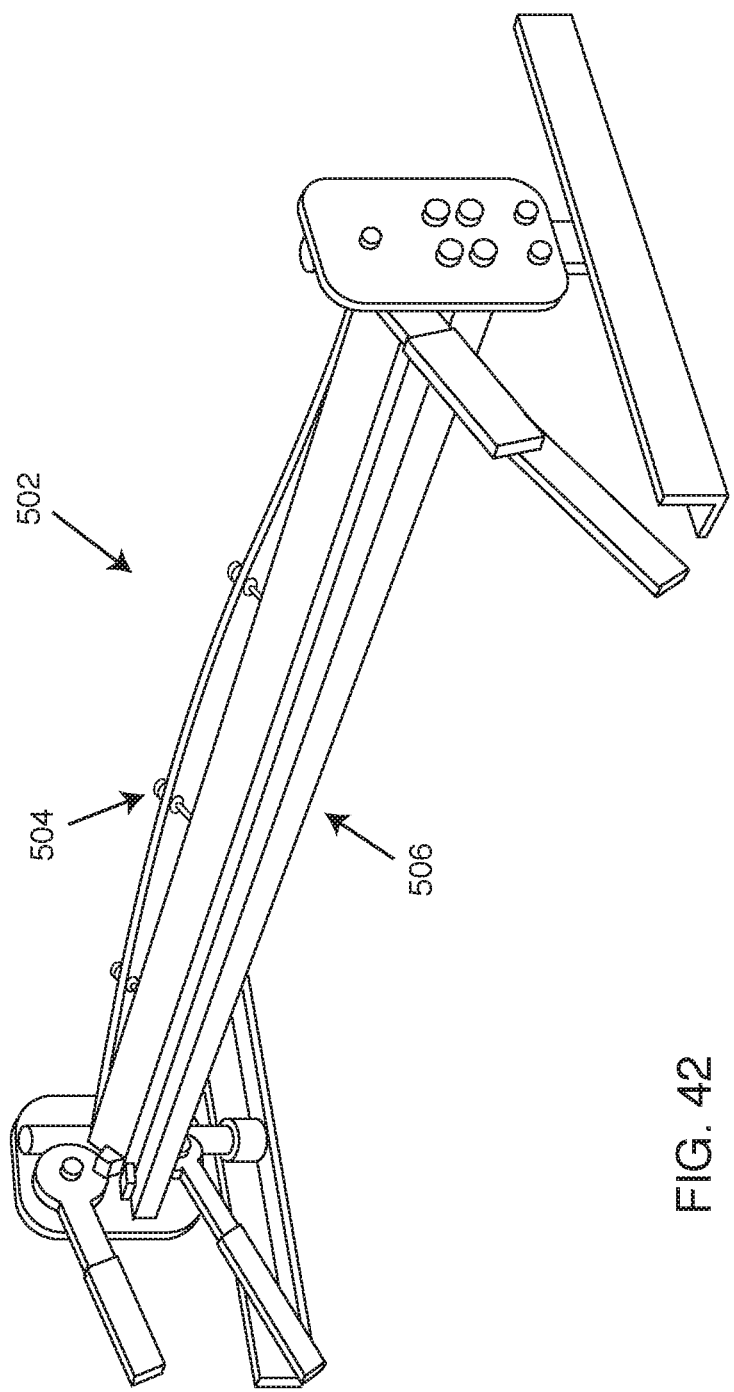
FIG. 42 illustrates a machine used for bending metal mesh for panels embodying the present invention.

Break machines used to bend sheet metal are widely use in the fabrication of sheet metal products. However, these machines are designed for flat sheets of metal, of a homogenous thickness. A break machine 502 of the present invention, as seen in FIG. 42, has been modified by widening the opening 504 next to a bending/cutting blade 506 to accommodate the irregular thickness of a welded-wire mesh 104. This is an important improvement to facilitate shapes of mesh fabric to cover the corner joints created by the intersection of two panels.

A machine (not shown) may be employed that facilitates the stuffing of wattles (i.e., tube-shaped bags) with various materials, as described above. The overall process is somewhat like stuffing sausages. The bags can be made of a wide variety of materials suitable to hold the stuffing material and resist the fabrication pressure and the concrete skin application and environment. The stuffing material can also vary widely, as described above.

In general, shotcrete work is performed in open environments on large structures and in thick applications (eight inches or thicker). In the instant application, the less common close quarters shotcrete equipment and tools, typically used inside boilers and smoke stacks, are applied in a manner that allows thin (one inch to five inches) cementitious skins to be applied in building applications.

Various tools are used during construction of a structure 500 formed from panels 90, 120, 150, 180 of the present invention. As seen in FIGS. 43-53, a brace stick 510 is used for bracing a panel 90, 120, 150, 180 that is being erected to form part of the structure 500. The nature of both the panels 90, 120, 150, 180 and construction necessitates a means of aligning and truing the panels 90, 120, 150, 180. In order to achieve good results the panels 90, 120, 150, 180 typically need to be put in a plumb and true alignment and held in that position while the cementitious skin 106, 132, 162, 184 is applied and dries. The common method of bracing and truing the panels 90, 120, 150, 180 has been to use wood framing lumber combined with stakes, nails and wire. However, this is cumbersome, not easily changed, and its one-time use of materials is wasteful and out of harmony with the panels' nature.

Figure 51:
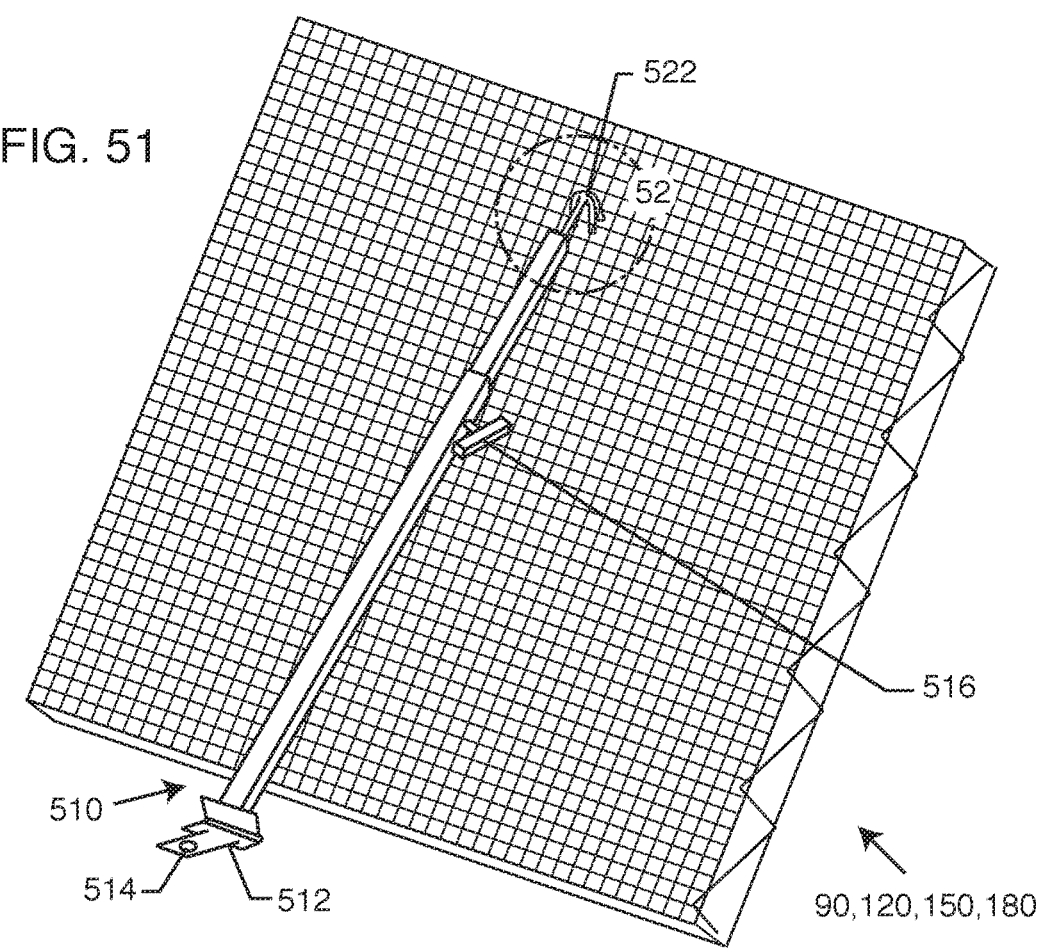
FIG. 51 illustrates the brace stick of FIGS. 43-50 holding a panel embodying the present invention at an angle.
Figure 52:
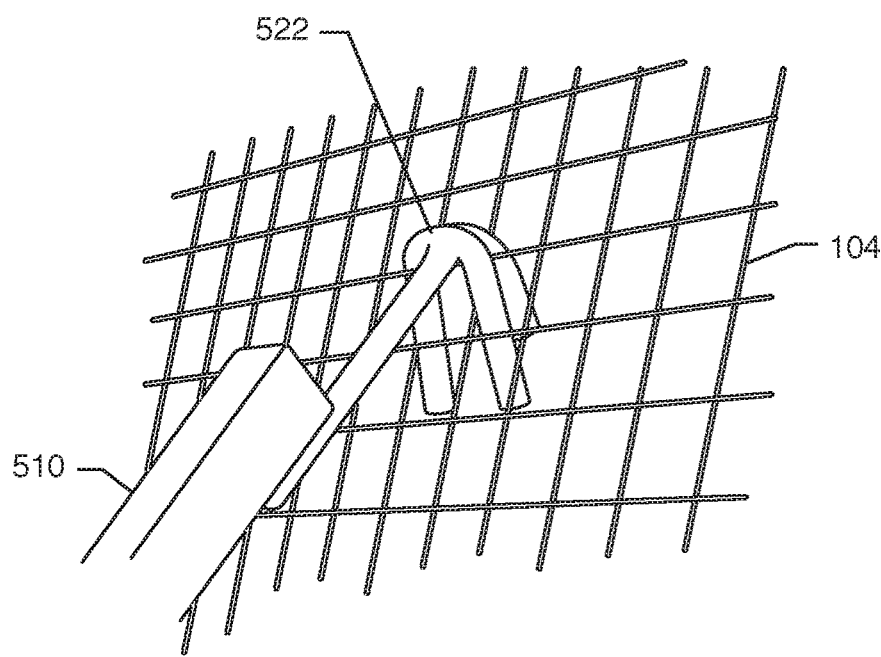
FIG. 52 illustrates an enlarged view of the brace stick of FIG. 51 engaging the wire mesh of the panel.
Figure 53:
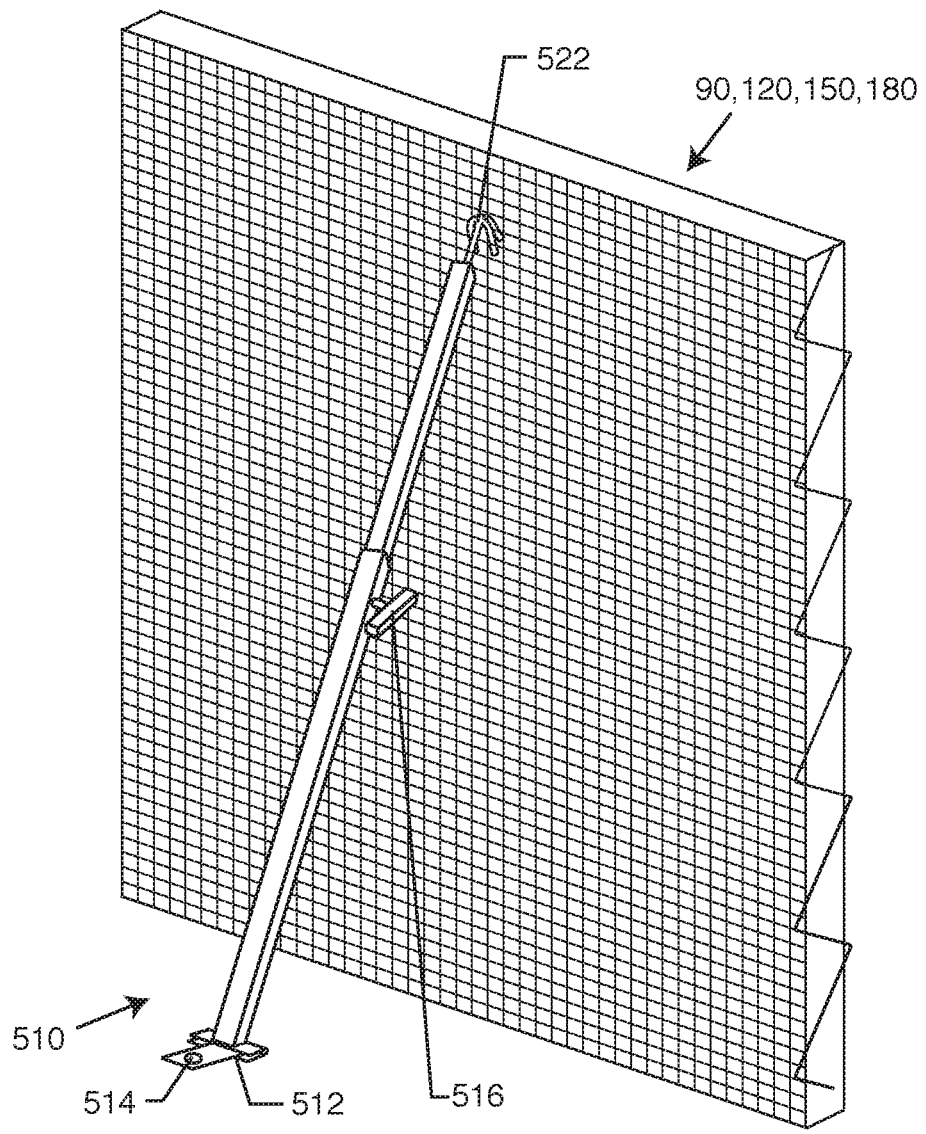
FIG. 53 illustrates the brace stick of FIG. 51 holding up a panel embodying the present invention in a generally vertical position.

The brace or brace stick 510 has been developed which resolves all of the above problems and provides additional benefits, as described below. The brace stick 510 includes a hinged bottom plate 512 (FIGS. 49-50) with a hole 514 to receive a common round construction stake for anchoring the brace 510 at the bottom of the brace 510. A hand screw locking mechanism 516 (FIGS. 47-48) in the middle of the brace 510 allows the length of the brace 510 to be adjusted and easily re-adjusted in terms of lengthening or shortening the brace 510. Turning the hand screw 516 in one direction telescopically moves each section 518, 520 of the brace 510 apart from each other while turning the hand screw 516 in the opposite direction telescopically moves each section 518, 520 of the brace 510 closer together. As seen in FIGS. 51 and 52, a claw 522 is positioned at the top (FIGS. 45-46) of the section 520 of the brace 510 and is designed to grab the truss 70, 78 and face mesh 104 of the panels 90, 120, 150, 180 allowing for the panels 90, 120, 150, 180 to be aligned and plumbed. The brace stick 510 is fabricated from steel tubing 518 and steel rod 520 and are, as a result, re-useable and very durable.

The panels 90, 120, 150, 180 must be braced and aligned when used a floors and roofs. This alignment and bracing is commonly performed with wood framing lumber, wire and nails. This presents the same problems described above with the brace sticks 510.

A brace beam (not shown) has been developed that works in conjunction with the brace sticks 510 to provide adjustable and re-useable braces for roofs and floors. The beam has rods welded to it that fit into open tops (not shown) of the brace sticks 510. This allows for the beams to be easily lifted to the ceiling line without the use of scaffolding.

Setting the corners of a structure 500 is so vital that there are even ceremonies to commemorate it. Masons have traditionally employed "corner poles" to assist in laying masonry units true to line and frame construction typically begins at a corner where a corner is set, aligned, plumbed and braced, to serve as a guide for the remainder of the structure to follow. In keeping with this traditional, time tested method of employing devises and methods for establishing true corners for a structure, a corner alignment pole 530, as seen in FIGS. 54-62, has been designed that meets the unique needs of the panelized method of construction, as outlined above.

Figure 66:
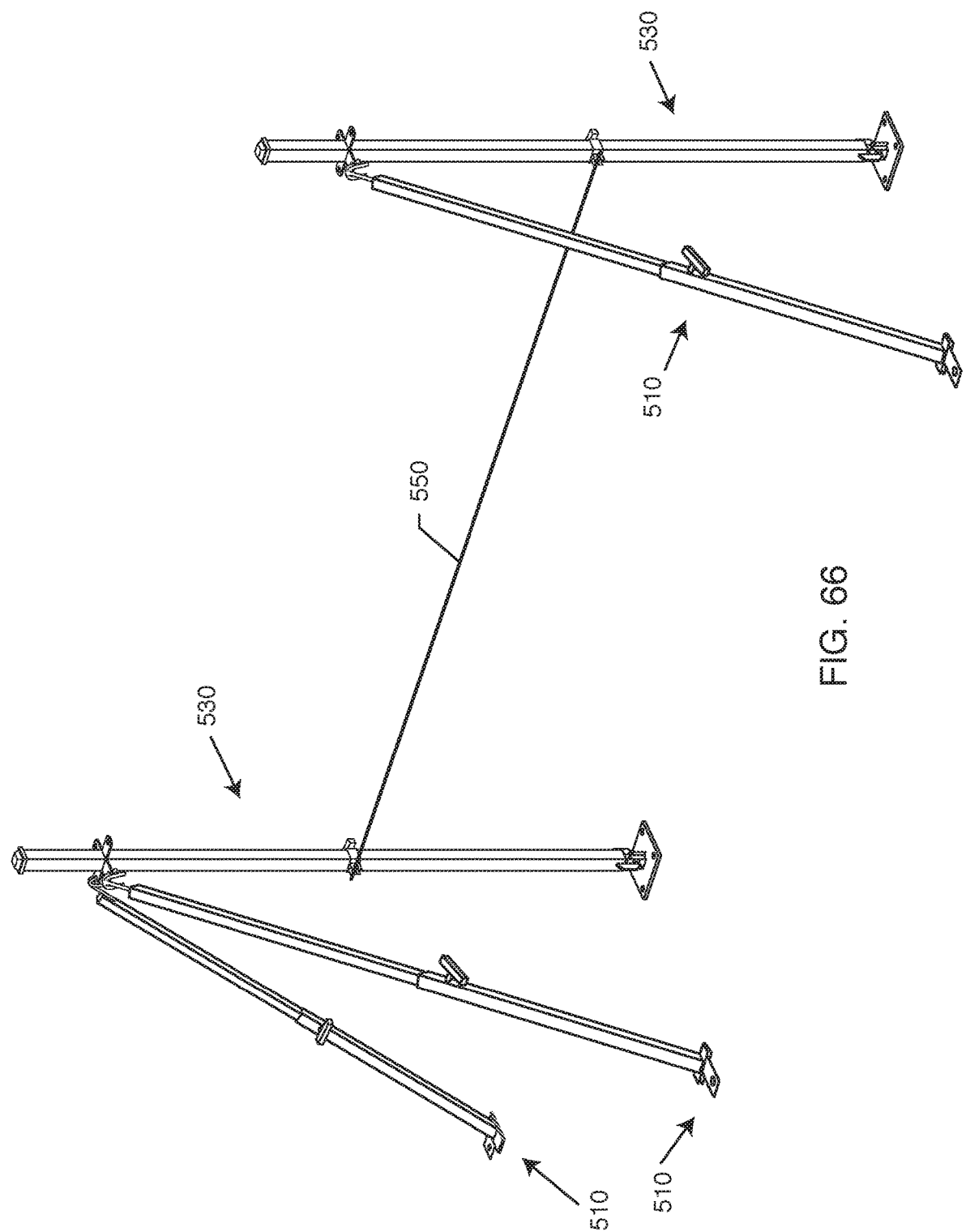
FIG. 66 is a perspective view of a number of brace sticks engaging corner alignment poles with a guide wire strung between the corner alignment poles.
Figure 67:
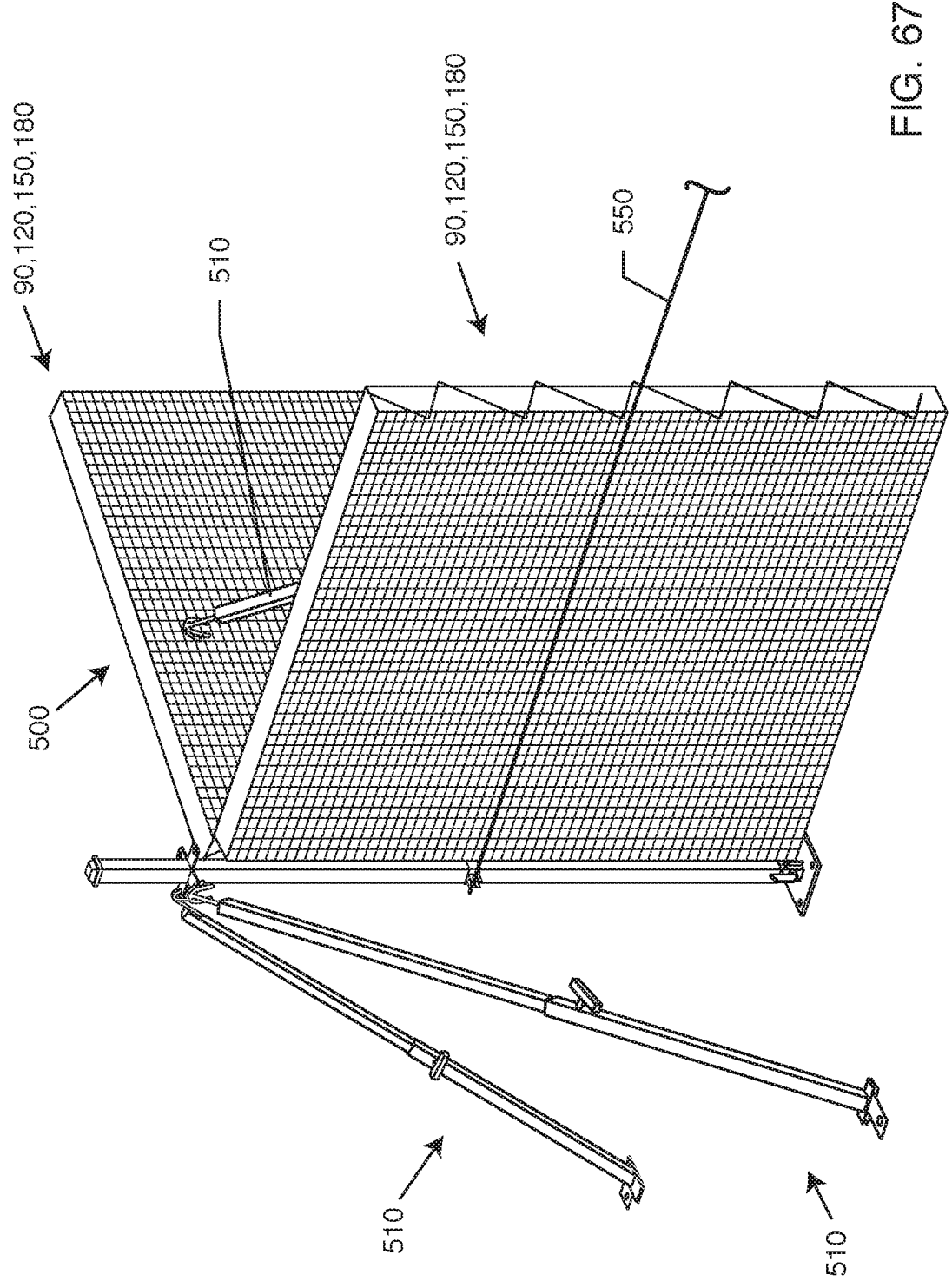
FIG. 67 is a perspective view of a number of brace sticks engaging a corner alignment pole at the intersection of two panels embodying the present invention with a guide wire being used to align the panels.

As seen in FIGS. 66 and 67, the structure 500 is aligned using the brace sticks 510 and corner poles 530. Each corner pole 530 has a bottom plate 532 set on a "U-joint" type device 534 (FIGS. 58-59) allowing the bottom of the pole 530 to accommodate the irregularities of the ground on a construction site. Base plates 532 of the corner poles 530 have holes 536 (FIGS. 55, 58, 59) at the corners to receive commonly available steel stakes for anchoring. The claws 522 of the above described brace sticks 510 fit into holes 538 located on tabs 540 (FIGS. 55, 60) on the corner poles 530 allowing the corner poles 530 to be aligned vertically (FIGS. 63-65). Hand-screw adjustable collars 542 have holes 544 that are designed to receive the same common round construction stakes. Turning the hand screw of the collar 542 in one direction loosens the grip of the collar 542 about a pole section 546 of the corner pole 530 while turning the hand screw in the opposite direction tightens the grip of the collar 542 about the pole section 546. These stakes have nail holes in them which allow guide wires 550 to be tied to the stakes. The tension screws of the collars 542 allow the guide wires 550 to be raised or lowered, moved in and out and then locked in place with the tension that is applied when the screw of the collar 542 is extended.

In plastering work and in shotcrete work, achieving a true, flat surface is highly desirable and at the same time, highly difficult to accomplish. To facilitate this goal, screeds (not shown) have been developed and used. This is a straight rod or guide that is used to guide the plasterer and his rodding tool to cut the plaster or shotcrete to straight and flat lines. In shotcrete, the standard is to use fine wires, pulled taught, and to cut the shotcrete to the wires. Because of the nature of the panels, with the structure of trusses and mesh, we have an opportunity to create screeds that are specifically designed to work with the panels.

Since the panels 90, 120, 150, 180 are made of steel wire trusses 70, 78 and wire mesh 104, a screed (not shown) made of ferrous metal and magnets will allow the screeds to be attached to the metal trusses and mesh. By regulating the spacing of the magnets the force of attraction can be adjusted to provide attraction strong enough to securely hold the screed in place, yet permit ready removal, for re-location and re-use. It is also important that the dimensions of the magnets and screed be carefully coordinated to avoid shunting the magnetic field. A small gap must be maintained between the edge of the magnet and the side of the screed and the spacing between magnets in the screed needs to be adjusted for correct attraction.

Another style of screed is one that has fingers or grooves to take hold of the trusses and mesh wires of the panels. Two iterations of this style are where the clip-on aspect is integral with the screed and the other is where the clip-on aspect is a detachable piece which is left in the cementitious skin after the screed is removed.

The use of a permanent plastic screed offers the advantage of being installed in the plant as the panel is being fabricated. This saves the time and labor in the field to install a screed.

The use of wire as a screed is common in the shotcrete trade. Our improvement is to have a method of attachment that allows the wire to be attached to the truss and face wires and hold the screed wires at specific distances from the face mesh of the panels. These attachment devises are envisioned in two styles, removable and left-in-place.

While rigid screeds are common in the plastering trades, such screeds are typically rectilinear in cross section. This results in difficulty in removing the screeds because of the suction/friction/bonding between the cementitious skin material and the sides of the screed. Thus, screeds in the form of pipes/tubes are utilized in lieu of rectilinear shapes. The use of half sections is also employed. Handles on the screeds are fabricated to facilitate handling and removal. Attachment can be either wire ties or fabricated clip-type devices.

The use of composite materials allows for the strengths of several materials to combine into a single new composite material in a synergistic manner. The panels are inherently a composite material, combining the attributes of the wire trusses, the wire mesh, the insulating/isolating core, and the cementitious skin to create and insulated concrete structure. However, the use of composites within the component parts of the panels can bring additional benefits as follows:

A. Glass Fibers/Plastic Fibers

Glass fibers have properties valuable to concrete construction; they are highly resistant to the chemicals in concrete, they have great tensile and elastic strength properties. They are relatively inexpensive and easy to fabricate, package, transport and employ in concrete construction. The physical properties of glass fibers allow them to serve well in concrete to provide additional tensile and flexural strength which will result in less cracking in concrete and better performance under load.

Glass fibers are used in the concrete/cementitious skins of the panels which results in the ability to apply the skins with improved finished surfaces because of the reduced cracking. The density of fibers used in the mix can be increased and replace part or all of the wire mesh face wire. The fiber-rich cementitious skins could span from truss to truss. Lastly, the welded wire trusses may be replaced with glass fiber rich cementitious material.

B. Metal Fibers

The above advantages of glass fibers/plastic fibers are also available with steel fibers. All of the above can be performed with steel fibers with the advantage that some parties may not be familiar or comfortable with the performance of glass fibers/plastic fibers but would find steel fibers an easier step to take from steel reinforcing bars.

C. Fly Ash

Fly ash from coal burning is known to improve the quality of cementitious end products. It is customarily added in percentages of 10%-20%.

The addition of 40%-50% fly ash finds tremendous benefits in both shotcrete and plaster applications in terms of improved workability, improved pumpability, reduced cracking and a more durable and water resistant surface. Benefits are also derived from combining the advantages of fly ash with fibers.

D. Recycled/Reclaimed Materials

Recycled/reclaimed materials may be used in the skins (where at least 50% of the skin is a recycled/reclaimed product, including fly ash, reclaimed aggregate, including crushed concrete, crushed glass, shredded metal and plastic, etc.), cores (where at least 50% is a recycled/reclaimed product such as recycled foamed plastic, shredded paper, shredded cloth, etc.), and wires (where at least 50% of the wire content is recycled such as automobiles shredded and recycled into wire).

The cores 92, 122, 152, 182 of the panels are typically foamed plastic, but does not necessarily need to be limited to this material. The needed properties of the core are: a) relative light weight, such that the weight of the core does not make the panel so heavy as to be unwieldy during erection. However, weight is of lesser importance with our improved capacity to fabricate larger panels which justifies the use of a lightweight crane during erection; b) sufficient rigidity to resist the impact force of the shotcrete and the pressure of pressing the panel to apply the face mesh; c) sufficiently insulating so as to isolate the two cementitious skins from each other to permit the thermal flywheel performance of the panel to function adequately. Foam for the cores 92, 122, 152, 182 may come in a variety of colors including, without limitation, pink, green or the like. Virgin foam may be used to manufacture the cores of the panels of the present invention as well as high-recycled content foam. Additional materials are described below:

A. Bio-Mass Wattles

A structure or form commonly known as a wattle offers the above described properties. As outlined above, a wattle is a mass of material packed into a mesh tube so as to create a continuous, "sausage-like" structure where the mesh tube is the "skin" of the "sausage" and the packed material is the "stuffing" of the "sausage".

This structure can readily be created by stuffing the mesh tube with bio-mass such as chopped yard waste, leaves, straw, etc. The mesh tube can be created of a wide variety of materials as long as the material can be formed into the desired continuous "tube" shape and can permit the escape of trapped air resulting from the "stuffing" process. Examples of such materials could be geo-textiles, hemp and jute meshes commonly used in horticultural practices, and adaptive re-use of such things as nylon stockings, linens, and other cloth.

B. Wattles of Other Materials

Besides the above-described use of bio-mass in the wattles, there exists the opportunity of recycling other materials and employing them in the fabrication of wattles which could then be used to fabricate the panels. Some of these materials are:

1. Cloth Rags

While the rags industry typically recycles cloth into rags for such purposes as cleaning and the like, there are remnants from both the source and from the making of rags which are unsuitable for use as rags. These could readily be employed as the stuffing in a wattle.

2. Plastic Bags

The recycling of plastic shopping sack is increasing in popularity. The recycling of these and other plastic bags, such as dry cleaning bags presents an opportunity to recycle these materials into wattles for use in panels.

3. Paper

The recycling of paper is common. However, there are many types of paper that do not lend themselves to recycling into paper, such as "glossy" finished colored paper. These papers, as well as commonly recycled paper, could readily be shredded and used as wattle stuffing.

C. Soy-Based Foam

Advances in foam technologies and focus on more environmentally friendly practices, have produced soy-based foam. Such foams are even more harmonious in their nature with the panels than are the plastic foams.

D. Cloth

The forming of cloth into cores can be accomplished by mixing the cloth with a variety of binders to create shapes suitable for use as panel cores.

E. Papercrete

If shredded paper is mixed with small amounts of cement and sufficient water and then blended, the resultant mass is fairly light weight and can be cast in shapes. This allows cores to be created from this mix of paper, water and cement and provides another use of paper that is otherwise not recyclable.

Composite (e.g., graphite, fiberglass, etc.) trusses 70, 78 and mesh 104 may also be used. These composite materials can offer greater strength, greater resistance to physical and chemical environments that would quickly destroy steel. A single simple example is houses built in marine environments. The salt air quickly attacks steel. This results in a need for greater cost to increase the concrete cover over the concrete reinforcement steel. The replacement of steel concrete reinforcement with composite concrete reinforcement that is highly resistant to salt would result in cost savings by reducing the protective concrete cover thickness.

Because panel fabrication equipment of the present invention is so simple and transportable, all of the equipment can be shipped inside a few ocean-going containers. This presents an opportunity to use the containers at the receiving location to construct a factory employing the shipping containers. The containers can be arranged in two parallel rows, set at least twenty feet apart. Between these two containers, a concrete slab is poured, creating the factory floor. The two rows of containers create the two long walls of the factory which are also secure storage areas, at the same time. The panel fabrication equipment is then set up on the factory slab and the first panels, the "shake-down" production, are used to construct the other walls and the roof of the new factory. The result is the fastest built, lowest cost factory available, resulting from the adaptive re-use of the shipping containers. An alternative roof structure could be in the form of a large tent structure comprised of a fabric material.

A fast growing product in the marketplace is the insulating concrete form (ICF). It is a foam block that is stacked in a similar manner to conventional masonry blocks, and then the block cells are filled with reinforced concrete. ICF's are typically designed for use as load-bearing exterior walls. Consequently they are not made in thin modules for use in interior walls. Also, they are not used for floors and walls while panels of the present invention can be used for floors and walls to put insulating concrete interior partitions as well as floors and roofs on the ICF exterior walls.

The method, tools, practices to be able to put all of the panels and other materials, such a plumbing and electrical fixtures and parts, as well at needed tools and instructions, in containers and ship to a site. The panels could be bundled into acceptable sizes so that they could be shipped "bare". When the containers/bundles arrive at the site, everything needed to complete the house is included.

This method would be especially valuable for application at remote sites. An example would be worker camp housing at a remote mine location, say in a developing nation. At such a site, running to the lumber yard or hardware store is simply not possible. Such a project can also be severely delayed, or even stopped, by a single vital tool or part or material, missing. The costs and time in shipping it in can be disastrous to keeping to a production schedule. This house-in-a-box concept would allow for the advantages of modularization, the shipping of finished units, in that all of the parts are present, to combine with the cost savings of shipping the unit in a "collapsed" state.

The method, tools, systems, and equipment to employ the use of bio-mass wattles, along with other methods, tools, systems, and equipment of the present invention, permit houses to be built from fields of weeds, etc. Very often the first work done on a site is the "clearing and grubbing" of the vegetation from a building site. This bio-mass material is usually a disposal expense item. Now, this bio-mass becomes a valuable building material in the "grow-a-house" concept. This can especially be valuable at remote sites and developing nations where naturally occurring vegetation is plentiful while plastic can be very difficult and costly to obtain.

The nature of the panels and fabrication methods of the present invention allows panels to be fabricated with integral structures, such a piping/tubing which can be employed to gain solar heat. This heat can then be utilized for space heating and domestic water heating, etc.

The nature of the panels and fabrication methods of the present invention also allows panels to be fabricated with Heating/Ventilating/Air Conditioning (HVAC) ducts incorporated in the panels. This reduces field labor and material costs. One of these methods is the use of the utility chases in the "standard" foam core. HVAC air can be blown into the entire panel and exhaust registers can be located at any desired location, since the entire panel is filled with conditioned air. Another example is to replace a section of foam core with a specific purposed duct to carry HVAC air.

The cost common foundation material is concrete. It is so ubiquitous that some may not even be aware of any alternative. However, locations or conditions that do not readily permit concrete foundations can often be resolved with the use of helical screws, placed in the earth and attached to the structure. This is a common method of construction in cross-county utility towers. Because the panels can span comparatively wide spaces, these earth screws can be employed as foundations in a building.

Various components may be made of materials that include, without limitation, the following:

A. Welded Wire Trusses

Warren trusses fabricated from cold-drawn ASTM A 82 wire. Galvanizing to be either mill galvanizing (0.10 oz. psf), typical for interior conditions, or, hot dipped (1.5 oz. psf), for exterior conditions. Wire may be specified to be Stainless Steel conforming to ASTM A580, Type 304, where superior corrosion resistance is required. Wire gauge to be selected from manufacturer's standard. Depths of trusses (out-to-out dimension of longitudinal cord wires) to be selected from 2" to 18", in one inch increments. Wire to have maximum available recycled content. Recycled material content percentages are to be submitted upon request.

B. Welded Wire Face Mesh

Face mesh fabricated from bright drawn mild steel conforming to ASTM A853-93. Standard galvanizing is hot dipped in excess of ASTM A641-92 Class 3. Wire may also be specified to be Stainless Steel conforming to ASTM A580, Type 304, where superior corrosion resistance is required. Face wire mesh can be selected from manufacturer's standard of one inch by one inch, 16 gauge, two inch by two inch, 14 or 12.5 gauge. Mesh may be applied in multiple layers, if required. Other mesh weights are available on special order. Wire to have maximum available recycled content. Recycled material content percentages are to be submitted upon request.

C. Fasteners

"C"-rings as manufactured by Stanley Spenax, No. 516G100 or 115G110 or equal.

D. EPS Foam Core

EPS foam core is to be expanded polystyrene with approximate density of 1 pound per cubic foot. Use of regrind is to be the maximum possible in manufacturing process while still maintaining a board sufficiently sound and stable to permit cutting to required shapes to facilitate fabrication of SCIPs and application of cementitious skins.

E. Welded Wire Joint Mesh

Joint mesh is to be used to cover all panel joints in widths to result in minimum lap of 4", or as determined by engineering.

Face mesh fabricated from bright drawn mild steel conforming to ASTM A853-93. Standard galvanizing is hot dipped in excess of ASTM A641-92 Class 3. Wire may also be specified to be Stainless Steel conforming to ASTM A580, Type 304, where superior corrosion resistance is required. Face wire mesh can be selected from manufacturer's standard of one inch by one inch, 16 gauge, two inch by two inch, 14 or 12.5 gauge.

F. Cementitious Skins

Cementitious skins will be applied employing project appropriate methods selected from industry standard methods of hand applied plaster, gun applied plaster, wet-mix shotcrete or dry-mix shotcrete, or 3D printed skins. Choice of methods will be determined by both applicators expertise and final use of the SCIPs.

Cementitious skins may be applied using a concentrate mix that includes a minimum 40% concentration of fly ash plus polypropylene fibers resulting in denser, more crack resistant skins.

3D printing may be used to create thin concrete shells, maximum of 3" (75 mm) thick, in lieu of conventional methods of application such as hand-troweling, pneumatically placed plaster, shotcreting, and forming and casting. This 3D technology allows for the use of computer-controlled machines to apply the mortar to the SCIPs, creating the two concrete shells. This offers the benefits of reduced labor and higher volume output.

G. Curing Compound

Water curing applied by hand spraying or continuous misting after the cementitious skins have reached their final set, is the preferred method of curing. Water curing should be continued for a minimum of 72 hours, depending upon environmental conditions at the project site. If the use of curing compounds is desired, care should be exercised to ensure that the curing compound is fully compatible with the cementitious concentrate and will not interfere with the finish treatment, color coat, or veneer (tile, stone, etc.).

Various finishes may be used including, but not limited to, exterior stucco, elastomeric paint, decorative concrete, etc.

The above-described embodiments of the present invention are illustrative only and not limiting. It will thus be apparent to those skilled in the art that various changes and modifications may be made without departing from this invention in its broader aspects.

What is claimed is:

1. A process for manufacturing a structural panel, comprising the steps of:
    creating a panel core, comprising the steps of:
        aligning a plurality of fillers with a plurality of masonry reinforcement trusses in an alternating sequence, wherein the masonry reinforcement trusses comprise two parallel rods interconnected by a wire bent around the rods in a zigzag configuration;
        pressing the aligned trusses and fillers;
        overlying wire mesh over opposing first and second side surfaces of the pressed trusses and fillers; and
        attaching the wire mesh to the trusses; and
    3D printing a first thin shell of a durable material directly onto the first side surface of the panel core, and 3D printing a second thin shell of a durable material directly onto the second side surface of the panel core.

2. The method of claim 1, including determining structural loads to be placed upon the structural panel.

3. The method of claim 2, wherein the determining step includes collecting load data and selecting physical characteristics of the panels.

4. The method of claim 2, wherein the determining step includes determining longitudinal, shear and bending loads upon the structural panel.

5. The method of claim 2, including sizing the components of the panel to meet the loads to be placed thereon.

6. The method of claim 2, selecting thickness of each shell to meet the structural loads to be placed thereon.

7. The method of claim 1, wherein the shells are up to three inches in thickness.

8. The method of claim 7, wherein the shell on one side of the panel is thicker than the shell on the opposite side of the panel.

9. The method of claim 1, wherein the 3D printing step comprises coating each side of the panel core with the durable material using 3D printing equipment.

10. The method of claim 1, wherein the shells are comprised of cementitious material.

11. The method of claim 1, wherein the 3D printing step includes varying of thickness of at least one of the shells.

12. The method of claim 1, including imbedding a commercially available lathing member within the panel.

13. The method of claim 1, wherein the fillers are comprised of solid foamed material filler.

14. The method of claim 1, wherein the fillers are comprised of stabilized organic material fillers.

15. The method of claim 1, wherein the fillers are comprised of wattles containing filler material.

16. The method of claim 1, wherein the fillers are comprised of a bio-mass.

17. The method of claim 1, wherein the fillers are comprised of cloth.

18. The method of claim 1, including combining a plurality of panels to form a structure.

19. The method of claim 1, wherein the zigzag configuration of the wires comprises approximately 30-degree bends.

20. The method of claim 1, wherein bailing wire is tied to the connection points of the wire mesh and trusses to hold the panel core together.

21. The method of claim 1, wherein upholstery clamps are clamped to the connection points of the wire mesh and trusses to hold the panel core together.

22. The method of claim 1, including removing the fillers after applying the shells.

23. The method of claim 1, including shaping each shell to center reinforcement in the shell.

24. The method of claim 1, wherein the durable material is 3D printed directly onto the wire mesh on the first and second sides of the core panel.

\* \* \* \* \*